United States Patent [19]

Kirii

[11] Patent Number: 5,540,073

[45] Date of Patent: Jul. 30, 1996

[54] METHOD AND APPARATUS FOR ADJUSTING PRESS OPERATING CONDITIONS DEPENDING UPON DIES USED

[75] Inventor: Kazunari Kirii, Aichi-ken, Japan

[73] Assignee: Toyota Jidosha Kabushiki Kaisha, Toyota, Japan

[21] Appl. No.: 352,819

[22] Filed: Dec. 1, 1994

Related U.S. Application Data

[63] Continuation of Ser. No. 43,822, Apr. 7, 1993, Pat. No. 5,419,169.

[30] Foreign Application Priority Data

| Apr. 7, 1992 | [JP] | Japan | 4-114004 |
| Apr. 7, 1992 | [JP] | Japan | 4-114005 |
| Apr. 7, 1992 | [JP] | Japan | 4-114006 |
| Mar. 1, 1993 | [JP] | Japan | 5-066042 |

[51] Int. Cl.$^6$ ............................ B21D 24/14
[52] U.S. Cl. .................. 72/15.1; 72/350; 72/30.1
[58] Field of Search ................. 72/7, 15.1, 20, 72/21, 31.01, 350, 351, 453.13; 364/476

[56] References Cited

U.S. PATENT DOCUMENTS

| 3,727,442 | 4/1973 | Ridgway et al. ............... 72/7 |
| 3,809,488 | 5/1974 | Sonderegger . |
| 4,283,929 | 8/1981 | Heiberger . |
| 4,488,237 | 12/1984 | Aronson et al. . |
| 4,592,220 | 6/1986 | Martinez et al. . |
| 4,621,517 | 11/1986 | Hatanaka et al. . |
| 4,745,792 | 5/1988 | Story et al. . |
| 4,909,061 | 3/1990 | Reitter et al. ............... 72/351 |
| 4,945,742 | 8/1990 | Schoch . |
| 5,138,857 | 8/1992 | Siegert . |
| 5,140,834 | 8/1992 | Kashiwagi et al. . |
| 5,255,552 | 10/1993 | Bielfeldt .................... 72/351 |

FOREIGN PATENT DOCUMENTS

| 0467297 | 1/1992 | European Pat. Off. . |
| 0566308 | 10/1993 | European Pat. Off. . |
| 59-212199 | 12/1984 | Japan . |
| 60-261700 | 12/1985 | Japan . |
| 62-20711 | 2/1987 | Japan . |
| 16820 | 1/1988 | Japan . |
| 160721 | 4/1989 | Japan . |
| 99730 | 4/1991 | Japan ................. 72/31 |
| 324245 | 5/1991 | Japan . |

OTHER PUBLICATIONS

Patent Abstracts of Japan, vol. 12 No. 218 (M–711) 6/1088 re: JP-A-63 016820
Patent Abstracts of Japan, vol. 14 No. 315 (M–995) [4285] Jul. 1990 re: JP-A-02 106308.
Patent Abstracts of Japan, vol. 16 No. 557 (M–1340) Nov. 1992 re: JP-A-04 212826.

*Primary Examiner*—Lowell A. Larson
*Attorney, Agent, or Firm*—Cushman Darby & Cushman, L.L.P.

[57] ABSTRACT

Method and apparatus applicable to a press using a die set including a lower and an upper die which are removably installed movably towards and away from each other to perform a pressing operation under the adjusted operating conditions. A memory is provided to store machine information relating to the press and necessary to determine optimum values for the operating conditions. Die set information relating to the die set and necessary to determine the optimum values are received through a data input device. A calculating device calculates the optimum values, based on the machine information and the die set information, and an adjusting device automatically adjusts the operating conditions according to the calculated optimum values.

46 Claims, 57 Drawing Sheets

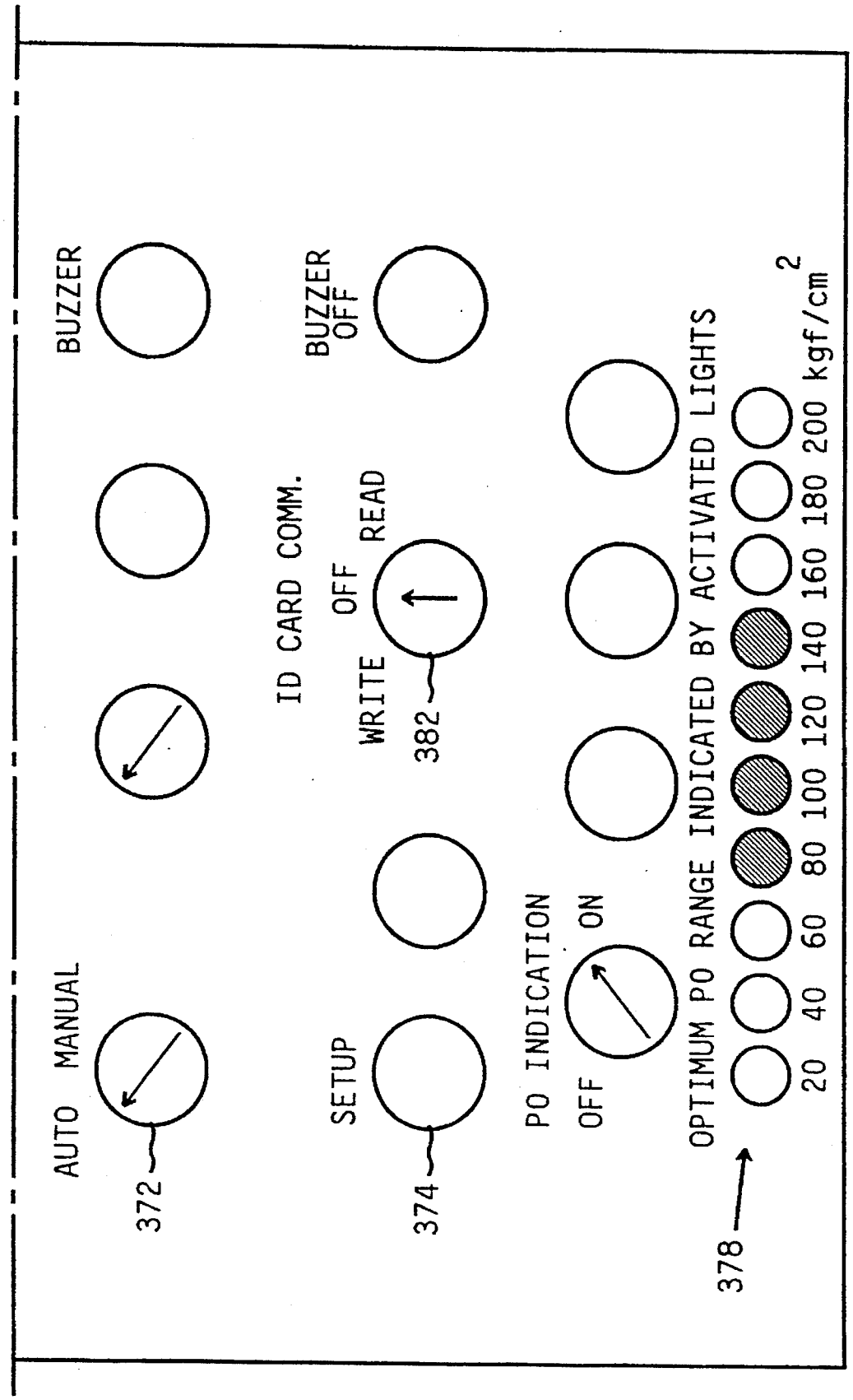

METHOD AND APPARATUS FOR ADJUSTING PRESS OPERATING CONDITIONS DEPENDING UPON DIES USED

This is a continuation of application Ser. No. 08/043,822, filed Apr. 7, 1993, now U.S. Pat. No. 5,419,169.

BACKGROUND OF THE INVENTION

1. Field of the Invention

The present invention relates in general to a pressing machine, and more particularly to a method and an apparatus for adjusting the operating conditions of a press on the basis of information of the machine and the dies used.

2. Discussion of the Prior Art

There has been widely used a press wherein a pressing operation such as a drawing operation is effected such that upper and lower dies removably installed on the machine are moved towards and away from each other. On some pressing machines of this type, the operating conditions may be changed or adjusted depending upon the specific set of dies used. In a single-action press constructed as shown in FIGS. 1 and 2, for example, a drawing operation on a workpiece or blank in the form of a metal strip or sheet is performed by an upper die 18 and a lower punch 12 while the blank is held by means of a pressure ring 30 in cooperation with the upper die 18. In this type of press, pressure control valves 46 and 84, a servomotor 60 and other components are provided to adjust the operating conditions such as the pneumatic pressures Pa and Pb of pneumatic cushioning cylinder 42 and counterbalancing cylinder 80, and distance h associated with a die-height adjusting mechanism 52. The pressure Pa of the cushioning cylinder 42 influences the holding force to be applied to the pressure ring 30, and the distance h influences the pressing force to be applied to the blank.

In a double-action press as shown in FIGS. 12–14, the holding force is applied to the blank through a pressure ring 156 attached to an outer slide 160, and the pressing force is applied to the blank through a punch 162 fixed to an inner slide 164 and a lower die 152 disposed on a bolster 154. In this double-action press, too, the operating conditions such as a pneumatic pressure Pe of a cylinder 184 which influences the holding force must be suitably adjusted so as to avoid the cracking and wrinkling of a product formed from the blank. The operating conditions to be adjusted also include a distance ha associated with a die-height adjusting mechanism 172.

The holding force and the pressing force which assure an adequate pressing operation without cracking and/or wrinkling of the products obtained differ depending upon the specific machine and the specific die set used on the machine. More specifically, the weights of the upper die 18, 162 and the pressure ring 30, 156 which cooperate with the lower die 12, 152 to constitute a die set vary from one die set to another. Therefore, it is necessary to suitably adjust the pressure Pa, Pe and the distance h, ha, for example, depending upon the specific die set. Further, the pressure-receiving areas of the cylinders 42, 184, and the sliding resistance and rigidity values of the machine components differ from one machine to another. Therefore, the operating conditions such as the optimum pressure Pa, Pe and distance h, ha for assuring an adequate pressing operation are generally determined or established by a trial-and-error procedure, namely, by performing test operations on the press to be used for production.

If the optimum pneumatic pressure Pa, Pe and distance h, ha for example are determined beforehand for different die sets during test operations on trial or test presses used for testing the individual die sets, the above-indicated trial-and-error procedure on the production press can be eliminated. As indicated above, however, the individual production presses have different operating characteristics, such as different pressure receiving areas of the cushioning cylinder 42, and different sliding resistance and rigidity values of the various components. Thus, the adjustment of the operating conditions according to the known or predetermined optimum values is not practically satisfactory for the individual pressing machines in general.

Further, the adjustment of the operating conditions according to the predetermined optimum values is likely to cause cracking and/or wrinkling of the product obtained by a pressing operation. This drawback is considered to arise from factors which relate to the properties of the blank such as elongation and surface roughness, and an amount of a lubricating oil deposited on the surface of the blank. Namely, even if the pressing operation is performed with the same blank holding force, the sliding resistance between the blank and the dies may fluctuate due to different properties of the individual blanks, which lead to different tensile forces acting on the different blanks during a drawing operation, for example. Although the material and thickness of the blank are taken into account when the optimum holding force is determined for each die set, the chemical composition and the thickness of the blank in the form of a metal strip prepared by rolling generally vary within certain ranges of tolerances. Further, a variation in the amount of deposition of the lubricating oil on the surface of the blanks is inevitable. Thus, there exist various fluctuating factors relating to the manufacturing process of the blanks, which cause different physical properties of the blanks.

The above analysis may suggest a necessity of determining the optimum pneumatic pressure Pa of the cushioning pneumatic cylinder 42, for example, by a trial-and-error procedure. In this respect, the relationship between the optimum pressure Pa and the optimum holding force on one machine is usually different from that on another machine. This means, the same amount of adjustment of the pneumatic pressure Pa is not necessarily adequate or sufficient to remove the same degree of cracking or wrinkling of the product. Accordingly, the adjustment is troublesome and time-consuming even for an experienced or skilled user or operator of the pressing machine. This is particularly so, on the double-action press in which the two or more cylinders 184 are used to adjust the blank holding force.

As described above, the known pressing machines require cumbersome and time-consuming trial-and-error procedure and a high level of skill for adjusting the operating conditions such as the pneumatic pressure Pa depending upon the specific die set, and are not capable of producing desired articles of manufacture with highly consistent quality.

A further study of the pressing operations on the pressing machines as described above suggests a problem that the blanks or products formed from the blanks are likely to easily crack or suffer from similar defects after a relatively long continuous pressing job in which a-given pressing cycle is repeated on a large number of blanks which are successively loaded on the machine. This problem is considered to occur due to a rise in the temperature of the die set by heat generated due to sliding resistance of the blank which is moved between and in contact with the lower and upper dies in the process of a pressing operation such as a drawing operation. The temperature of the die set rises as the number of the pressing cycles performed increases. As the temperature of the die set rises, the property of the oil lubricating the die set, characteristics of the die set and the friction characteristics of the blanks tend to vary, while the volatility of the lubricating oil increases. Consequently, the sliding resistance of the blanks with respect to the die set increases, causing an increase in the tensile force acting on the blanks during the drawing operation, and leading to easy occurrence of cracking or other defects of the formed products. The increase in the sliding resistance also accelerates the wearing of the die set, and shortens the life of the die set.

An analysis of the relationship between a sliding resistance of a blank or workpiece and the amount of heat generated by the sliding resistance indicates that an amount of heat Qo generated by a grinding operation is expressed by the following equation (a):

$$Qo = Ft \cdot (Va \pm Vb) \cdot \tau \quad (a)$$

where,

Ft: tangential grinding resistance $\tau$: grinding time

Va: peripheral speed of a grinding wheel

Vb: speed of movement of a workpiece to be ground

In view of the above, the tangential sliding resistance in the case of a drawing operation performed on a blank on a press can be expressed as $(\mu+r) \cdot F(t)$, where $\mu$ represents a sliding resistance determined by the surface roughness of the die set and the blank and the lubricating condition, and r represents a resistance to a bend-back action of the blank due to a bead in the blank holding portion (pressure ring) of the die set, while f(t) represents a surface pressure of the blank holding portion. Hence, an amount of heat Qs generated in the blank holding portion is expressed by the following equation (b):

$$Qs = (\mu+r) \cdot f(t) \cdot W \cdot w \quad (b)$$

where,

W: amount of tangential movement of the blank w: width of the blank $$W = a(\mu+r) \cdot \int f(t) dt \quad (c)$$

Therefore, the amount of heat Qs generated by the sliding resistance of the blank with respect to the die set is expressed by the following equation (d):

$$Qs = (\mu+r)^2 \cdot f(t) \cdot \int f(t) dt \cdot w \quad (d)$$

On the other hand, the tensile force Te acting on the blank during the drawing operation is expressed by the following equation (e):

$$Te(\mu+r) \cdot f(t) \quad (e)$$

The above equation (e) indicates that the tensile force Te increases with an increase in the sliding resistance $\mu$ due to the temperature rise of the die set and the change in the lubricating condition of the blank, even if the surface pressure f(t) is held constant. Thus, the product formed from the blank tends to crack as the temperature of the die rises.

It will be apparent from the above equation (d) that the amount of heat Qs also increases with an increase in the sliding resistance $\mu$. Accordingly, there exists a vicious circle in which the temperature of the die set further rises, which in turn causes a further increase in the sliding resistance $\mu$.

SUMMARY OF THE INVENTION

It is therefore a first object of the present invention to provide a method of automatically adjusting the operating conditions of a pressing machine depending upon a specific set of dies.

It is a second object of the invention to provide an apparatus capable of practicing the method indicated above.

It is a third object of this invention to provide a method which permits automatic adjustment of the operating conditions of a pressing machine, in a reduced length of time with a minimum work load on the machine user or operator.

It is a fourth object of the invention to provide an apparatus capable of practicing the method indicated just above.

It is a fifth object of the invention to provide a method of adjusting a holding force to be applied to a blank during a pressing operation on a pressing machine, which method permits easy or fast adjustment of a fluid pressure in a fluid-actuated cylinder provided to produce the holding force.

It is a sixth object of the invention to provide an apparatus capable of practicing the method indicated just above.

It is a seventh object of this invention to provide a method of adjusting the holding force to be applied to the blank under a pressing operation, so as to prevent cracking or other defects of the products formed from the blanks, even after the pressing cycle has been repeated a large number of times.

It is an eighth object of the present invention to provide an apparatus capable of practicing the method indicated just above.

The above first object may be achieved according to one aspect of the present invention, which provides a method of adjusting operating conditions of a pressing machine, depending upon a die set used which includes a lower and an upper die that are removably installed on the machine and movable towards and away from each other to perform a pressing operation on a blank under the adjusted operating conditions, the method comprising the steps of: (a) storing machine information which relate to the pressing machine and which are necessary to determine optimum values for the operating conditions; (b) receiving die set information which relate to the die set and which are necessary to determine the optimum values for the operating conditions; (c) calculating the v optimum values of the operating conditions, on the basis of the machine information and the die set information; and (d) automatically adjusting the operating conditions according to the calculated optimum values.

The second object indicated above can be achieved according to a second aspect of this invention, which provides an apparatus for adjusting operating conditions of a pressing machine, depending upon a die set used which includes a lower and an upper die that are removably installed on the machine and movable towards and away from each other to perform a pressing operation on a blank under the adjusted operating conditions, the apparatus comprising: (i) machine data memory means for storing machine information which relate to the pressing machine (10, 150)

and which are necessary to determine optimum values for the operating conditions; (ii) data input means for receiving die set information which relate to the die set and which are necessary to determine the optimum values for the operating conditions; (iii) calculating means for calculating the optimum values of the operating conditions, on the basis of the machine information stored in the memory means and the die set information received through the data input means; and (iv) adjusting means for automatically adjusting the operating conditions according to the calculated optimum values.

According to the method and apparatus of the first and second aspects of the present invention described above, the optimum values for the operating conditions of the pressing machine are calculated by suitable calculating means, on the basis of the machine information stored in suitable memory means and the die set information received through suitable data input means. Described more specifically, the optimum operating conditions such as an optimum operating pressure of a pneumatic cylinder which assures an optimum holding force to be applied to the blank are obtained on the basis of the die set information such as data indicative of the weight of the die set, and data indicative of the optimum holding force and an optimum pressing force which permit an adequate pressing operation on the blank, and on the basis of the machine information such as data indicative of effective weights of components of the machine which reflect influences of sliding resistances of the components, and data indicative of effective pressure-receiving areas of cylinders which reflect influences of fluid leakage of the cylinders. The actual operating conditions of the machine are adjusted by appropriate adjusting means, according to the calculated optimum values. The adjusting means may be either automatically operated under the control of suitable control means in response to the output of the calculating means, or manually operated by the user or operator of the machine, according to the calculated optimum values indicated on suitable indicator or display-means.

Thus, the present method and apparatus permit automatic calculation of the optimum values for the operating conditions of a specific pressing machine having particular operating characteristics, when used in combination with a specific die set having particular weight and particular optimum pressing force. In other words, the operating conditions of the specific pressing machine can be suitably adjusted according to the calculated optimum values, depending upon the particular specifications of the machine such as the rigidity and sliding resistance values of the machine components and the pressure-receiving areas of the cylinders, and the particular specifications of the die set used on the machine. Accordingly, the present method and apparatus eliminate or minimize the conventional cumbersome adjustment of the machine by the machine operator by a trial-and-error procedure, and significantly reduce the operator's work load, while assuring improved consistency in quality of the products manufactured.

The above third object may be achieved according to a third aspect of this invention, which provides a method of adjusting operating conditions of a pressing machine, for each of a plurality of die sets which are selectively used on the machine, each die set including a lower and an upper die that are removably installed on the machine and movable towards and away from each other to perform a pressing operation on a blank under the adjusted operating conditions, the method comprising the steps of: (a) determining optimum values for the operating conditions of the machine for a die set used on the machine, and adjusting the operating conditions to the determined optimum values; (b) storing in memory means press operation data indicative of at least one of the optimum values of the operating conditions, in relation to the die set used on the machine; and (c) establishing each of the above-indicated at least one of the optimum values, according to the press operation data stored in the memory means, without determining the at least one of the optimum values, when the die set once used on the machine is used again on the machine.

The above fourth object may be achieved according to a fourth aspect of this invention, which provides an apparatus for adjusting operating conditions of a pressing machine, for each of a plurality of die sets which are selectively used on the machine, each die set including a lower and an upper die that are removably installed on the machine and movable towards and away from each other to perform a pressing operation on a blank under the adjusted operating conditions, the apparatus comprising: (i) adjusting means for determining the optimum values for the operating conditions of the machine for a die set used on the machine, and adjusting the operating conditions to the determined optimum values; (ii) memory means for storing press operation data indicative of at least one of the optimum values of the operating conditions, in relation to the die set used on the machine; and (iii) reproducing means for establishing each of the above-indicated at least one of the optimum values, according to the press operation data stored in the memory means, without operation of the adjusting means, when the die set once used on the machine is used again on the machine.

According to the method and apparatus of the third and fourth aspects of the present invention described above, the optimum values of the operating conditions of the pressing machine are first determined for a die set used on the machine, so as to satisfy requirements of a product to be manufactured from the blank by the pressing operation, and the operating conditions are then adjusted to the determined optimum values. For each die set used on the same machine, the press operation data indicative of at least one of the determined optimum values of the machine operating conditions are stored in suitable memory means, for subsequent use of the press operation data as discussed below. The determination of the optimum values and the adjustment of the operating conditions to the optimum values may be effected by a trial-and-error procedure in which the machine is test operated to find out and establish the optimum operating conditions. Alternatively, the optimum values of the operating conditions for a pressing operation using each die set may be determined by calculation on the basis of die set information relating to the die set to be used on the machine, with the specifications and operating characteristics of the machine taken into consideration. The actual operating conditions of the machine are adjusted to the determined optimum values. In another alternative method, the optimum values are determined by calculation on the basis of not only the die set information, but also machine information which relate to the pressing machine and which are necessary to determine the optimum values of the operating conditions.

The memory means for storing the press operation data may be provided on the machine or on each die set. In the former case, a set of press operation data is stored for each of the die sets available on the machine. In the latter case, a set of press operation data is stored for each pressing machine on which the die set in question is available. Further, the memory means may be provided in a control system adapted to control two or more pressing machines. In this case, a set of press operation data is stored for each combination of the die set and the machine.

Since the press operation data indicative of the optimum value or values of the operating conditions of the machine in question are stored in the memory means, in relation to the die set to be used, it is not necessary to perform the trial-and-error procedure or effect the calculation to determine the optimum operating conditions, i.e., optimum values to which the operating conditions are adjusted, when the desired pressing operation is performed on the same machine using the same die set. That is, suitably actuators to adjust the relevant operating conditions of the machine are simply operated so that the optimum values of the operating conditions once determined for the die set are reproduced or re-established. Accordingly, the operator's work load in setting up the machine for a particular pressing job is significantly reduced, and the production efficiency of the machine is improved.

The apparatus according to the fourth aspect of the present invention may further comprise data input means for receiving die set information which relate to the die set and which are necessary to determine optimum values of the operating conditions. In this instance, the adjusting means may determine at least one of the optimum values of the operating conditions, on the basis of the die set information, without the trial-and-error procedure involving a test operation on the press, whereby the operator's work load is considerably reduced, and the quality of the product formed by the pressing operation is stabilized.

The fifth object indicated above may be achieved according to a fifth aspect of the present invention, which provides a method of adjusting a holding force to be applied to a blank during a pressing operation on a pressing machine wherein the holding force is produced by force applying means which includes a fluid-actuated cylinder, the method comprising the steps of: (a) determining a desired adjusting amount for changing the holding force; (b) calculating an optimum value of a fluid pressure of the fluid-actuated cylinder of the force applying means, according to a predetermined relationship between the holding force and the fluid pressure, the relationship being formulated so that the calculated optimum value of the fluid pressure corresponds to the holding force as changed by the desired adjusting amount; and (c) adjusting the fluid pressure of the fluid-actuated cylinder to the calculated optimum value thereof.

The sixth object indicated above may be achieved according to a sixth aspect of this invention, which provides an apparatus for adjusting a holding force to be applied to a blank during a pressing operation on a pressing machine wherein the holding force is produced by a force applying means which includes a fluid-actuated cylinder, the apparatus comprising: (i) operator-controlled manual adjusting means for manually specifying a desired adjusting amount for changing the holding force; (ii) calculating means for calculating an optimum value of a fluid pressure of the fluid-actuated cylinder of the force applying means, according to a predetermined relationship between the holding force and the fluid pressure, the relationship being formulated so that the calculated optimum value of the fluid pressure corresponds to the holding force as changed by the desired adjusting amount specified by the manual adjusting means; and (iii) pressure adjusting means for adjusting the fluid pressure of the fluid-actuated cylinder to the optimum value thereof as calculated by the calculating means.

In the method and apparatus according to the fifth and sixth aspect of the present invention described above, the adjusting amount for changing the holding force is determined, and entered or specified through the operator-controlled manual adjusting means. Then, the optimum value of the fluid pressure of the fluid-actuated cylinder is calculated by the calculating means, according to a predetermined relationship between the holding force and the fluid pressure, so that the calculated optimum value of the fluid pressure corresponds to the holding force as changed by the determined adjusting amount. Then, the fluid pressure of the fluid-actuated cylinder is adjusted by the pressure adjusting means, to the optimum value calculated by the calculating means. According to this arrangement, the holding force produced by the force applying means and applied to the blank is changed by the determined amount manually entered through the operator-controlled manual adjusting means.

The relationship used to calculate the optimum value of the fluid pressure is predetermined for each of the pressing machines having different specifications or operating characteristics such as different sliding resistance values of the machine components and the fluid leakage of the cylinder. In other words, the relationship uses parameters which change with the machine specifications and characteristics, such as an pressure-receiving area of the fluid-actuated cylinder which reflects the influences of the sliding resistance values and the fluid leakage. Therefore, the fluid pressure of the fluid-actuated cylinder can be suitably adjusted by suitably determining the adjusting amount of the holding force itself, so that the actual holding force assures a pressing operation without cracking or wrinkling of the product formed from the blank.

Where two or more fluid-actuated cylinders are used to apply the holding force to the blank, the adjustment of the fluid pressure of each of these cylinders can be effected based on the same adjusting amount specified by the manual adjusting means and the specific effective pressure-receiving area of each cylinder, which are used as the parameters for calculating the optimum value of the fluid pressure of each cylinder.

According to the method and apparatus described just above, the optimum holding force itself may be changed by means of the manual adjusting means, to adjust the optimum fluid pressure so that the fluid pressure permits the adjustment of the actual holding force to the changed optimum holding force. Namely, the optimum fluid pressure itself is not directly changed, but the adjusting amount of the holding force is suitably changed by the operator, while the operator observes the quality of the products in terms of the cracking and wrinkling. The present arrangement permits fast and accurate adjustment of the pneumatic pressure, without influences due a difference in the specifications and characteristics of the individual pressing machines. Although the amount of adjustment of the fluid pressure required to eliminate a given degree of cracking or wrinkling of the product differs from one machine to another, the required adjusting amount of the holding force is substantially the same for the different machines of the press. Therefore, the present arrangement assures relatively easy and fast adjustment of the holding force by the operator's determination of the adjusting amount based on the experience and knowledge associated with the adjusting amount in relation to the amount of reduction in the degree of cracking and wrinkling of the product.

Since the influences of the machine specifications on the holding force are eliminated according to the present arrangement, the adjusting amount to be entered through the operator-controlled manual adjusting device may be determined on the basis of the characteristics of the blanks as measured or visually observed.

Further, the present arrangement is effective when the force applying means uses two or more fluid-actuated cylinders. That is, the present arrangement which uses the adjusting amount for changing the holding force permits simultaneous adjustment of the fluid pressures for all the cylinders based on the same adjusting amount, and significantly reduces the adjusting time required for all the cylinders, as compared with the time required to adjust the pressures of the individual cylinders.

The seventh object may be achieved according to a seventh aspect of this invention, which provides a method of automatically adjusting a holding force to be applied to blanks during a pressing job on a pressing machine, comprising the steps of: (a) counting the number of pressing cycles which have been performed on successive blanks; and (b) adjusting the holding force such that the holding force decreases with an increase in the counted number of the pressing cycles performed.

The eighth object may be achieved according to an eighth aspect of the present invention, which provides an apparatus for automatically adjusting a holding force to be applied to blanks during a pressing job on a pressing machine, comprising: (i) adjusting means for adjusting the holding force; (ii) counting means for counting the number of pressing cycles which have been performed on successive blanks; and (iii) control means for controlling the adjusting means such that the holding force adjusted by the adjusting means decreases with an increase in the number of the pressing cycles counted by the counting means.

The method and apparatus according to the seventh and eighth aspects of the present invention described above are adapted such that the holding force is controlled so as to decrease with an increase in the counted number of the pressing cycles which have been performed so far, that is, with an increase in the sliding resistance $\mu$ of the blanks with respect to the die set, as the temperature of the die set rises. The holding force is adjusted by suitable adjusting means, which is controlled by suitable control means so that the adjusted holding force decreases as the pressing job progresses, namely, with an increase in the number of the pressing cycles counted by suitable counting means. Therefore, the tensile force Te acting on the blanks is kept at a suitably controlled value irrespective of an increase in the sliding resistance $\mu$. It will be understood from the above equation (e) that since the tensile force Te acting on the blank under a drawing or pressing operation is proportional to the holding force being applied to the blank, the increase in the tensile force Te is restricted or prevented by decreasing the holding force as the sliding resistance $\mu$ is increased according to a rise in the temperature of the die set. Thus, the present arrangement is effective to avoid cracking of the products formed from the blanks, and early wearing of the die set. As the holding force is decreased as described above, the amount of heat Qs generated during the pressing job is reduced as is apparent from the above equation (d), whereby the rise of the die set temperature and the increase in the sliding resistance $\mu$ are restricted. As a result, the temperature of the die set at which the amount of the generated heat Qs is counterbalanced by the amount of heat radiated is lowered, and the influences by the generated heat are minimized throughout the pressing job.

Preferably, the holding force is adjusted so as to increase with an increase in the non-operation time of the pressing machine during which the pressing job is interrupted. This arrangement for adjusting the holding force depending upon the non-operation time of the machine as well as the counted number of the pressing cycles is effective to prevent a drawback which is encountered when the pressing job once interrupted after a large number of pressing cycles is resumed. More particularly, the holding force is gradually decreased until the pressing job is interrupted. During the interruption or the non-operation time of the pressing machine, the temperature of the die set is lowered due to the heat radiation as a function of the non-operation time, and the sliding resistance $\mu$ is reduced due to a change in the lubricating condition during the interruption. If the pressing job were resumed with the decreased holding force, a sufficient tensile force Te would not act on the blanks, and the products obtained tend to have wrinkles. Thus, it is necessary to increase the holding force as a function of the non-operation time, for thereby increasing the tensile force Te with a decrease in the sliding resistance $\mu$ due to the temperature drop of the die set during the interruption of the pressing job. The present arrangement is therefore effective to avoid wrinkles or other defects of the products even when the products are obtained after a long period of interruption of the pressing job.

The seventh object may also be achieved according to a ninth aspect of this invention, which provides a method of automatically adjusting a holding force to be applied to blanks during a pressing job on a pressing machine which has a die set including a lower and an upper die and a pressure ring, the method comprising the steps of: (a) determining a temperature of a blank holding portion of the die set; and (b) adjusting the holding force such that the holding force decreases with an increase in the determined temperature of the blank holding portion.

The eighth object may also be achieved according to a tenth aspect of this invention, which provides an apparatus for automatically adjusting a holding force to be applied to blanks during a pressing job on a pressing machine which has a die set including a lower and an upper die and a pressure ring, the apparatus comprising: (i) temperature determining means for determining a temperature of a blank holding portion of the die set; (ii) adjusting means for adjusting the holding force; and (iii) control means for controlling the adjusting means such that the holding force adjusted by the adjusting means decreases with an increase in the temperature of the blank holding portion determined by the temperature determining means.

To control the holding force, the above arrangement relies on the temperature of the blank holding portion of the die set directly determined or measured by suitable means, rather than the number of the pressing cycles and the non-operation time. The temperature of the blank holding portion may be determined by detecting the temperature of the products, for example. The present arrangement assures an adequate adjustment of the holding force, depending upon a change in the temperature of the die set which occurs for any reasons including an increase in the number of the pressing cycles or an interruption of the pressing job. As in the above arrangements according to the seventh and eighth aspects of the invention, the holding force is decreased with an increase in the sliding resistance $\mu$ as a result of a rise of the die set temperature, and is increased with a decrease in the sliding resistance $\mu$ as a result of a drop of the temperature. Thus, the present arrangement assures an optimum tensile force Te acting on the blanks, prevents wrinkling and cracking of the products formed from the blanks, and avoids early wearing of the die set, irrespective of a change in the sliding resistance $\mu$ due to a change in the die set temperature.

BRIEF DESCRIPTION OF THE DRAWINGS

The above and optional objects, features and advantages of this invention will become more apparent by reading the following detailed description of presently preferred embodiments of the invention, when considered in connection with the accompanying drawing, in which:

FIGS. 23A and 23B are views showing an operator's control panel used in a third embodiment of this invention;

DETAILED DESCRIPTION OF THE PREFERRED EMBODIMENTS

Figure 1:
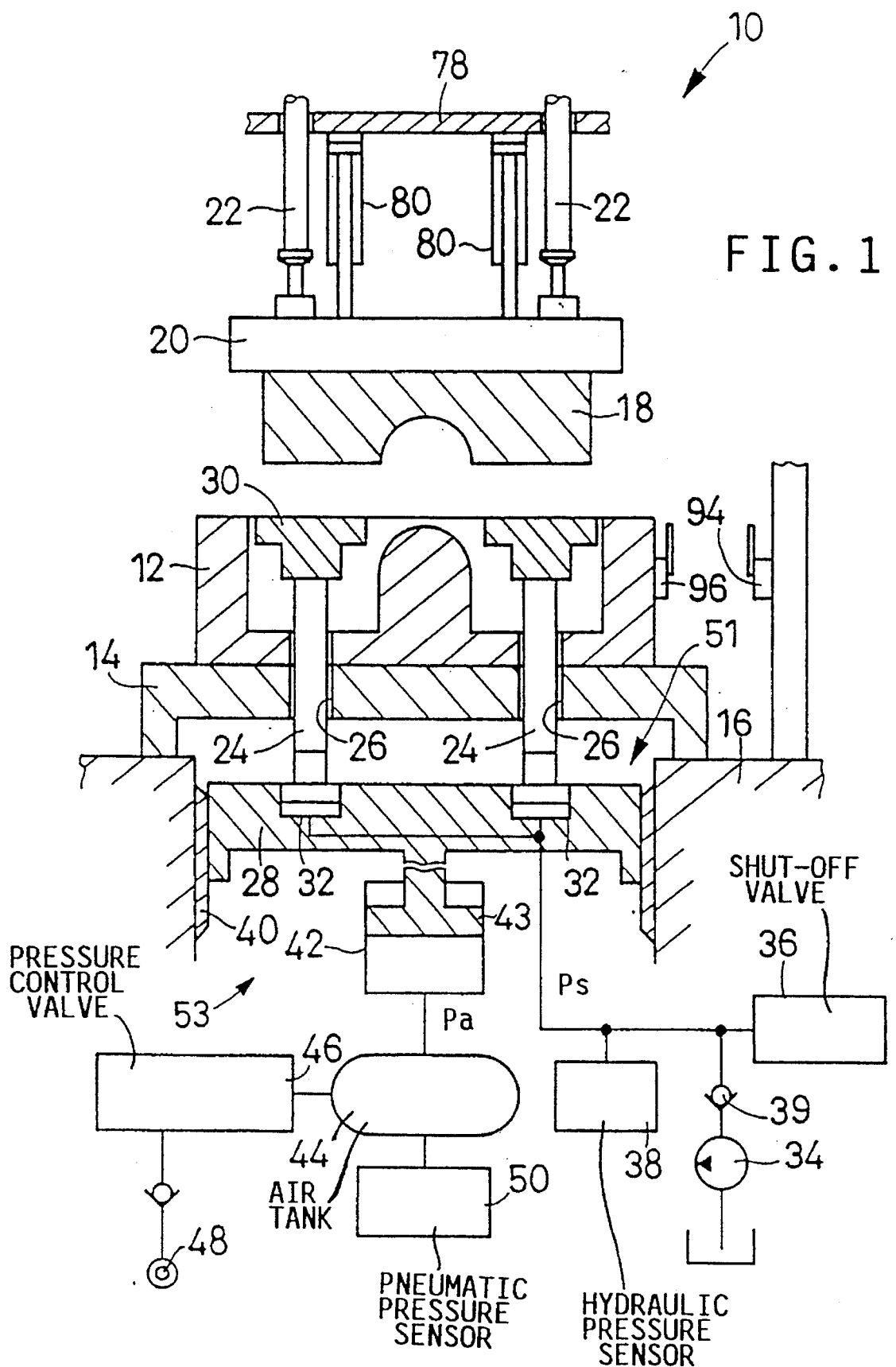
FIG. 1 is a schematic elevational view partly in cross section of an example of a single-action press whose operating conditions may be automatically adjusted by an apparatus according to the principle of the present invention.

Referring first to FIG. 1, one example of a single-action press is shown generally at 10. The press 10 is capable of effecting a drawing operation to produce a formed outer panel used for a motor vehicle. The press 10 has a bolster 14 disposed on a press bed 16, which in turn rests on a base of the press. The bolster 14 supports a lower die in the form of a punch 12 disposed thereon. The press 10 further has a movable main slide 20 which carries an upper die 18 fixed thereto. The main slide 20 is moved in the vertical direction by four plungers 22. The bolster 14 has a multiplicity of through-holes 26 through which respective cushion pins 24 extend. Located below the bolster 14 is a cushion pad 28 for supporting the cushion pins 24. The cushion pins 24 also extend through the punch 12, to support at their upper ends a pressure member in the form of a pressure ring 30 disposed around a working portion of the punch 12. The number n and positions of the cushion pins 24 are suitably determined depending upon the size and shape of the pressure ring 30, for example.

The punch 12, upper die 18 and pressure ring 30 constitute a die set which is removably installed on the press 10. In operation of the press, a blank or workpiece is drawn by the punch 12 and the upper die 18, while the blank is held at its peripheral portion under a suitably adjusted holding pressure applied through the die 18 and pressure ring 30.

The cushion pad 28 incorporates a multiplicity of hydraulic cylinders 32 corresponding to the cushion pins 24 which extend through the respective through-holes 26 formed through the bolster 14. The lower ends of the cushion pins 24 are held in abutting contact with the pistons of the respective hydraulic cylinders 32. The pressure chambers of these cylinders 32 communicate with each other and are supplied with a pressurized working fluid delivered from an electrically operated hydraulic pump 34. Hydraulic pressure Ps within the pressure chambers of the cylinders 32 is regulated by opening and closing a solenoid-operated shut-off valve 36. The hydraulic pressure Ps is detected by a hydraulic pressure sensor 38, and adjusted so as to apply a holding force Fs to the pressure ring 30, with the force Fs substantially evenly distributed to the individual cushion pins 24. The cushion pins 24, cushion pad 28 and hydraulic cylinders 32 constitute a cushioning device 51 for even distribution of the holding force Fs on the pressure ring 30.

The cushion pad 28 is guided by a guide 40 to be moved up and down in the longitudinal direction of the cushion pins 24. The cushion pad 28 is biased in the upward direction by a fluid-actuated cylinder in the form of a pneumatic cylinder 42, whose pressure chamber communicates with an air tank 44. The pressure chamber is partly defined by a piston 43 which is connected-to the underside of the cushion pad 28. The air tank 44 is connected to an air source 48 (provided in a plant in which the press 10 is installed), via a solenoid-operated pressure control valve 46. Pneumatic pressure Pa within the air tank 44 and the fluid chamber of the pneumatic cylinder 42 is suitably adjusted by controlling the pressure control valve 46. The pneumatic pressure Pa is detected by a pneumatic pressure sensor 50. This pneumatic pressure Pa is one of the operating conditions of the press 10, which is adjusted depending upon the required holding force Fs to be applied to the pressure ring 30.

The pneumatic cylinder 42 and air tank 44 cooperate with the cushion pins 24 and the cushion pad 28 to constitute a fore applying device 53 for applying the holding force Fs to the pressure ring 30, while the press is in a drawing operation on the blank in the form of a metal strip or sheet. Described more particularly, a force acting on the blank under drawing is applied to the cushion pad 28 via the pressure ring 30 and the cushion pins 24, whereby the cushion pad 28 is lowered, forcing down the piston 43 of the pneumatic cylinder 42. As a result, the holding force Fs corresponding to the pneumatic pressure Pa in the cylinder 42 is applied to the pressure ring 30 through the cushion pad 28 and the cushion pins 24. Although only one pneumatic cylinder 42 is shown in FIG. 1, two or more pneumatic cylinders 42 may be used as needed. In this case, all the pneumatic cylinders are connected to the common air tank 44.

Figure 2:
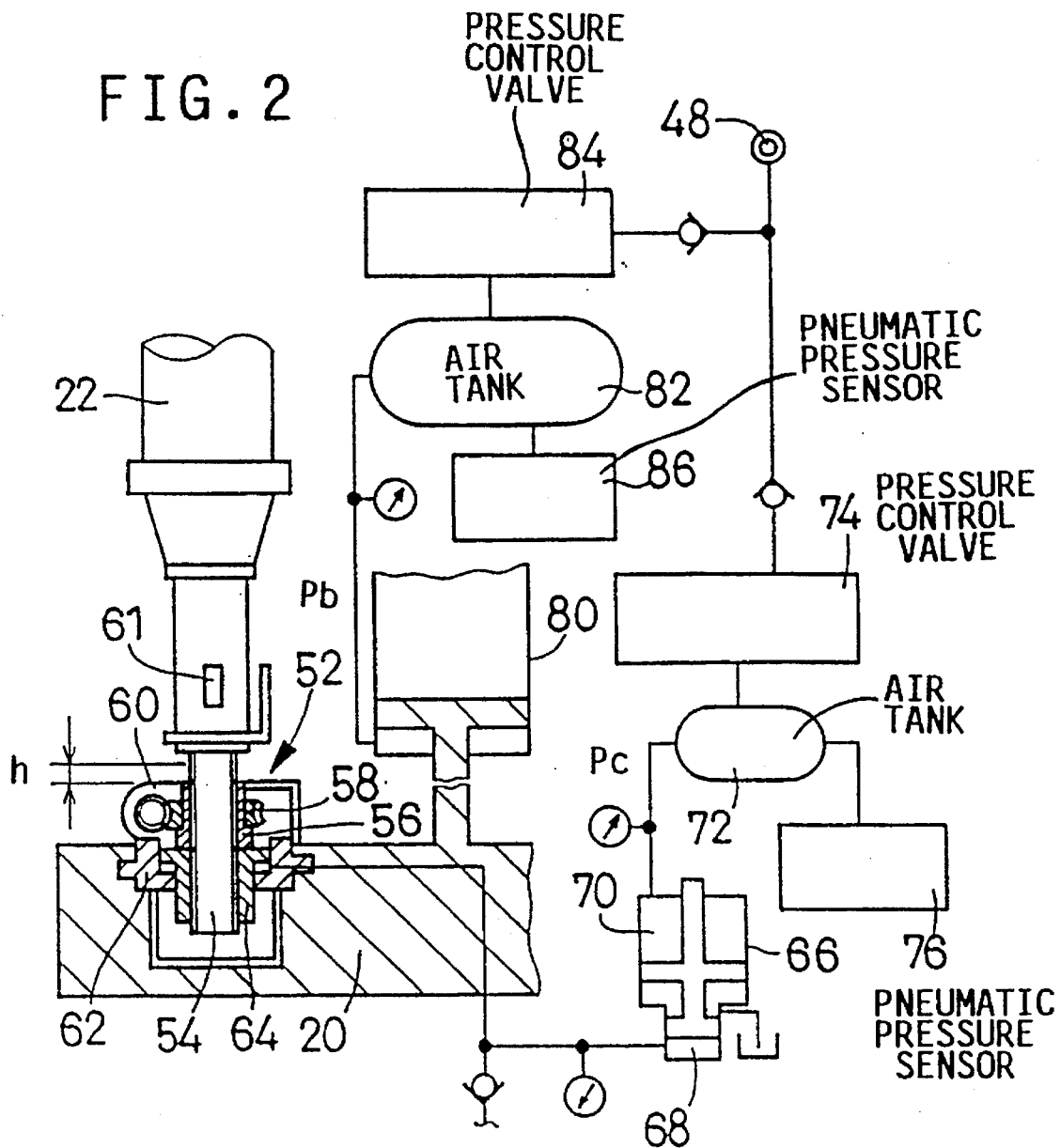
FIG. 2 is a schematic view showing a die-height adjusting mechanism, a counterbalancing pneumatic cylinder, and the related components of the press of FIG. 1.

As shown in FIG. 2, each of the four plungers 22 is connected to the main slide 20 via a die-height adjusting mechanism indicated generally at 52 in the figure. The die-height adjusting mechanism 52 engages a threaded shaft 54 formed integrally with the corresponding plunger 22. The mechanism 52 includes a nut 56 engaging the threaded shaft 54, a worm wheel 58 fixed to the nut 56, and a servomotor 60 for rotating a worm which meshes with the worm wheel 58. The servomotor 60 is bidirectionally operated to rotate the worm wheel 58 and the nut 56 clockwise or counter-clockwise, for thereby adjusting the height or the vertical position of the die-height adjusting mechanism 52 relative to the threaded shaft 54, that is, a distance h between the plunger 22 and the main slide 20, more precisely, between the lower end of the plunger 22 and the upper end of the mechanism 52. The distance h is detected by a rotary encoder 59 (FIG. 3) attached to the servomotor 60.

Figure 3:
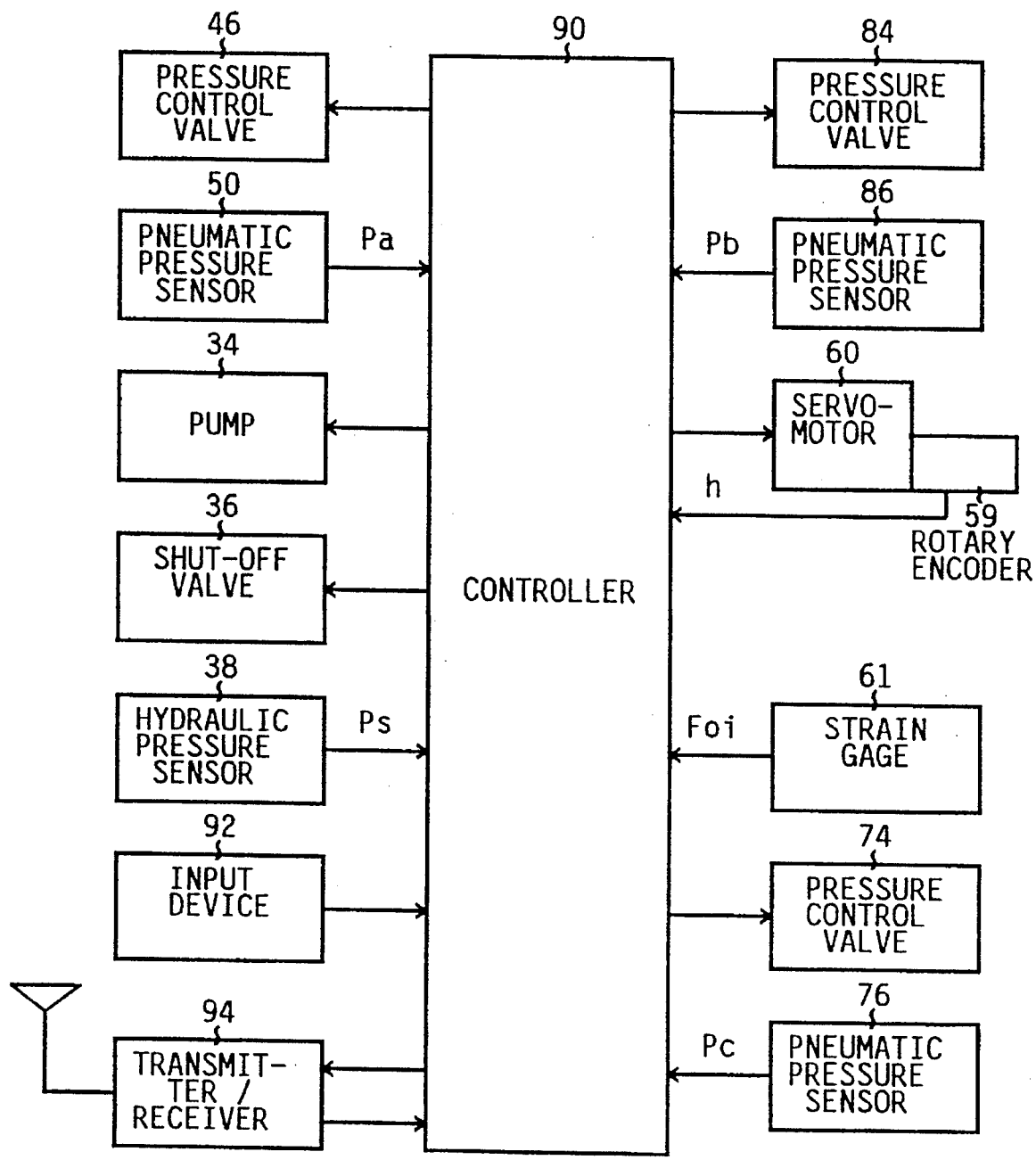
FIG. 3 is a block diagram indicating a control system for the press of FIG. 1, which is used according to a first embodiment of the present invention.

It will be understood that the main slide 20 is lowered away from the plunger 20 as the distance h increases, and that the position of the main slide 20 when the press 10 is at rest, namely, the upper stroke end of the main slide 20 is shifted toward the punch 12. Accordingly, a pressing force Fp which acts on the blank when the plunger 22 is at its lower stroke end can be adjusted by changing the distance h. In other words, the distance h is adjusted for each of the four plungers 22, depending upon the desired pressing force Fp, by suitably operating the servomotor 60. The distance h is also one of the operating conditions of the press 10, which is adjusted depending upon the desired pressing force Fp. As shown in FIGS. 2 and 3, each plunger 22 is provided with a strain gage 61. This gage 61 is adapted to detect a load Foi (i=1, 2, 3, 4) which acts on the corresponding plunger 22. In practice, the load Foi represented by the output of the strain gage 61 is converted into a load value which is expected to act on a portion of the main slide 20 at which the appropriate plunger 22 is connected. This load value can be calculated, for example, according to a predetermined relationship between the output (load Foi) of the strain gage 61 and the pressing force Fp measured by a load measuring apparatus 100 shown in FIG. 6. The predetermined relationship is represented by a data map stored in a controller 90 (FIG. 3), which will be described.

The main slide 20 incorporates an overload-protective hydraulic cylinder 62 which has a piston 64 connected to the die-height adjusting mechanism 52, and a housing fixed to the main slide 20. The pressure chamber of the hydraulic cylinder 62 is filled with a working fluid and communicates with an oil chamber 68 of a cylinder 66. The cylinder 66 also has an air chamber 70 which communicates with an air tank 72 connected to the above-indicated air source 48 through another solenoid-operated pressure control valve 74. Pneumatic pressure Pc within the air chamber 70 and air tank 72 is adjusted by means of the pressure control valve 74. The pneumatic pressure Pc is detected by a pneumatic pressure sensor 76, and is adjusted depending upon the pressing capacity of the press 10. That is, the pneumatic pressure Pc is determined so that when an excessive load acts on the overload-protective hydraulic cylinder 62, the piston of the cylinder 66 is moved towards the air chamber 70, so as to permit movements of the adjusting mechanism 52 and the main slide 20 towards each other, for thereby protecting the press 10 and the dies 12, 18 against damage due to an overload. The hydraulic cylinder 62, cylinder 66, air tank 72 and the related components are provided for each of the four plungers 22 associated with the respective mechanisms 52, and the pneumatic pressure Pc in each of the four air tanks 72 is suitably controlled.

The main slide 20 is also connected to four counterbalancing pneumatic cylinders 80 attached to a frame 78 (indicated at the top of FIG. 1) of the press 10. Each pneumatic cylinder 80 has a pressure chamber communicating with an air tank 82, which is also connected to the air source 48 via a solenoid-operated pressure control valve 84. By controlling the valve 84, pneumatic pressure Pb within the pressure chamber of the cylinder 80 and the air tank 82 can be regulated. The pressure Pb is detected by a pneumatic pressure sensor 86, and is one of the operating conditions of the press 10, which is adjusted so that the total weight of the main slide 20 and the upper die 18 does not influence the pressing force Fp, that is, so that the force corresponding to the pressure Pb in the four cylinders 80 counterbalances the total weight of the main slide 20 and upper die 18. The pressure chambers of the four counterbalancing pneumatic cylinders 80 communicate with the common air tank 82.

The press 10 uses a controller 90 as shown in FIG. 3. The controller 90 is adapted to receive output signals of the pneumatic pressure sensors 50, 86, 76, hydraulic pressure sensor 38, rotary encoder 59 and strain gages 61, which are indicative of the pneumatic pressures Pa, Pb, Pc, hydraulic pressure Ps, distance h and pressing force Foi, respectively. The controller 90 is constituted by a microcomputer, which incorporates a central processing unit (CPU), a random-access memory (RAM), a read-only memory (ROM), an input/output interface circuit, and an analog-digital (A/D) converter. The CPU operates to process various signals according to control programs stored in the ROM, while utilizing a temporary data storage function of the RAM, so as to control the pressure control valves 46, 84, 74 and shut-off valve 36, and apply drive signals to the pump 34 and servomotor 60. Although FIG. 3 shows only one piece or unit, for the servomotor 60, strain gage 61, pressure control valve 74 and pneumatic pressure sensor 76, the controller 90 is operated to control all of the four pieces provided on the press 10, as described above with respect to the above-indicated four components. The controller 90 is also adapted to receive data from a data input device 92 in the form of a keyboard or personal computer, for example, and is connected to a transmitter/receiver (transceiver) 94. The data received from the data input device include information ("machine information") indicative of the specifications of the press 10. The controller 90 also receive from the transmitter/receiver 94 data indicative of the specifications of the die set 12, 18, 30. To this end, each punch 12 carries data storage medium in the form of an ID card 96 attached thereto, as shown in FIG. 1. The ID card 96 stores the information ("die set information") indicative of the specifications of the die set 12, 18, 30 and has a built-in battery and a data transmitting function. The transmitter/receiver 94 is disposed so as to face the ID card 96, as also shown in FIG. 1, and transmits a signal to the ID card 96, to request transmission of the appropriate information on the die set. The transmitter/receiver 94 which receives the information from the ID card 96 transmits the information to the controller 90.

Figure 5:
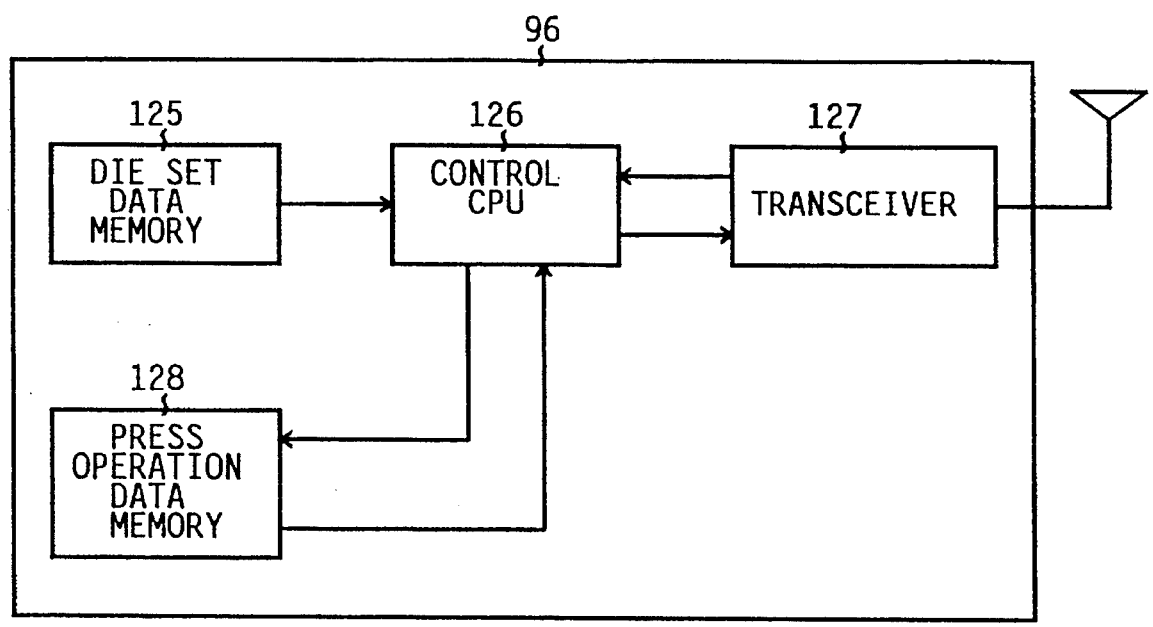
FIG. 5 is a block diagram for explaining the functions of an ID card attached to a punch 12 installed on the press of FIG. 1.

As shown in the functional block diagram of FIG. 5, the ID card 96 includes a die set data memory 125 which stores the die set information, a control CPU 126, a transceiver 127, and a press operation data memory 128 which stores data indicative of the operating conditions of the press 10. The control CPU 126 is adapted to receive the information from the data memories 125, 128 and transmit the received information to the transmitter/receiver 94, via the transceiver 127. The control CPU is also adapted to receive information from the transceiver/transmitter 94 via the transceiver 127 and store the received information in the data memory 128. The transmitter/receiver 94 and the ID card 96 function as data input means for receiving the appropriate die set information.

The data indicative of the specifications of the press 10 and the die set 12, 18, 30 are necessary to determine the pneumatic pressure values Pa, Pb, hydraulic pressure Ps, and distance h, which are optimum for effecting a drawing operation under the best conditions. The data received by the controller 90 include the following information, for example. It is noted that the information on the die set also includes data indicative of the specific die set used, which differs depending on the product to be obtained, a model of a car for which a part produced by the press is used, a type of press on which the die set is used, and a process in which the product is obtained from the blank.

MACHINE INFORMATION o Weight Wa of the cushion pad 28 o Average weight Wp of the cushion pins 24 o Weight Ws of main slide o Pressure-receiving area Aa of the pneumatic cylinder 42 o Total pressure-receiving area Ab of the four pneumatic cylinders 80 o Average pressure-receiving area As of the hydraulic cylinders 32 o Modulus K of elasticity of volume of the working fluid used for the hydraulic cylinder 32 o Mean travel Xav of the pistons of the hydraulic cylinders 32 o Total volume V of the fluid in the hydraulic circuit of the hydraulic cylinders 32 o Provisional h-Fpi characteristic relationship (Fpi=a·h)

DIE SET INFORMATION o Weight Wr of the pressure ring 30 o Weight Wu of the upper die 18 o Optimum holding force Fso o Optimum pressing force Fpoi of each cushion pin 24 o Number n of the cushion pins 24

Figure 6:
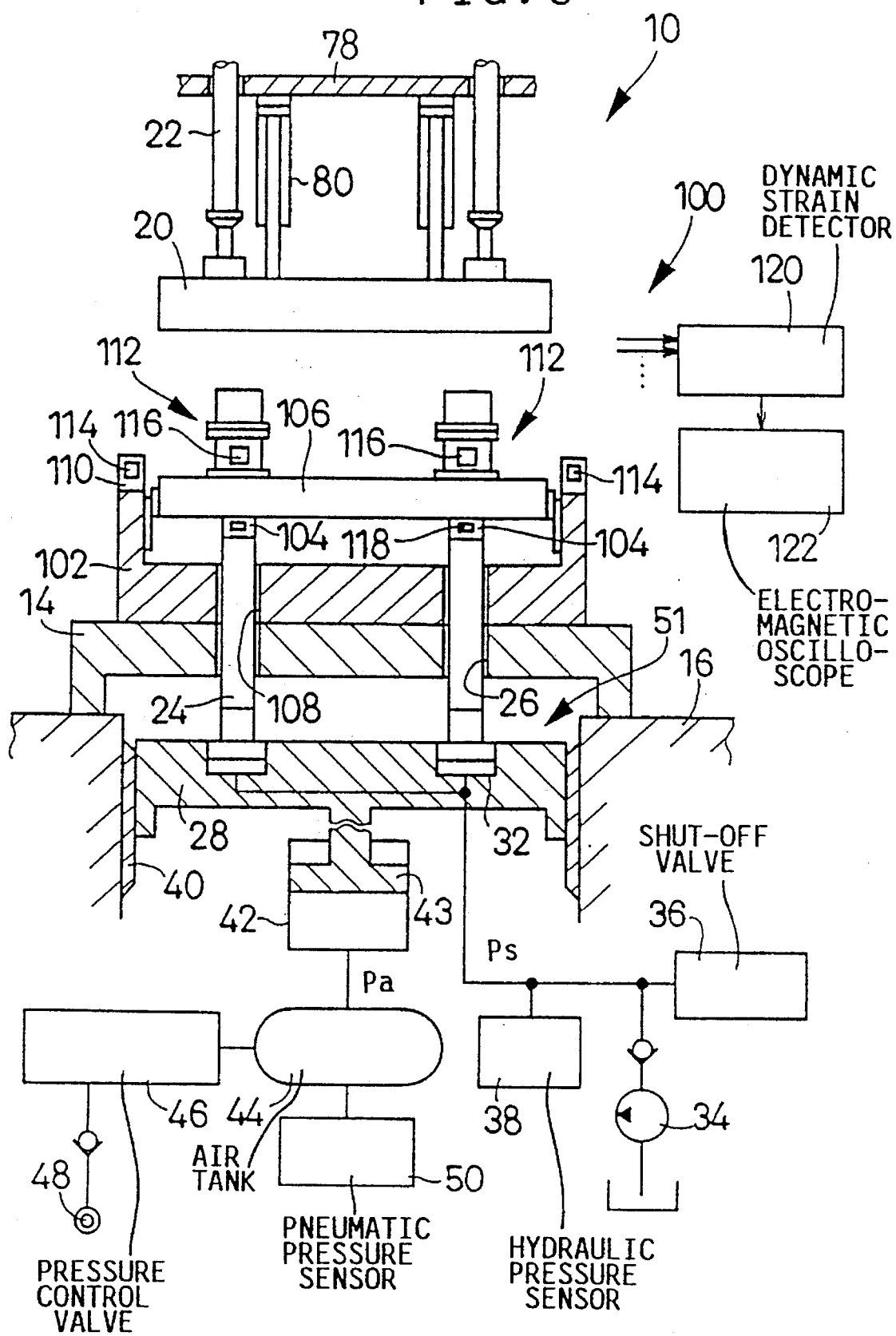
FIG. 6 is a schematic view of the press of FIG. 1 as equipped with an apparatus for measuring the holding force expected to act on the pressure ring, which holding force is used to obtain information on the press.

The weight Wa of the cushion pad 28 is the actual weight of the pad 28 minus the sliding resistance applied to the pad 28. This weight value Wa can be obtained by a load measuring apparatus 100 installed on the press 10, as shown in FIG. 6. Described in detail, the weight value Wa is obtained from a Fs-Pa relationship, which is obtained by measuring the holding force Fs while the pneumatic pressure Pa is changed.

As shown in FIG. 6, the load measuring apparatus 100 is installed on the press 10, without the punch 12, upper die 18 and pressure ring 30 installed on the press 10. The apparatus 100 has a positioning member 102 of rectangular box construction fixed on the bolster 14, and a measuring member 106 accommodated within the positioning member 102. The measuring member 106 is movable in the vertical direction, and has a plurality of sensing pins 104 protruding from the underside thereof. The sensing pins 104 correspond to the cushion pins 24. The positioning member 102 has a plurality of apertures 108 through which the respective cushion pins 24 extend. The measuring member 106 rests on the cushion pins 24 extending through the through-holes 26 and the apertures 108, such that the sensing pins 104 are held in abutting contact with the corresponding upper ends of the cushion pins 24. The positioning member 102 also has four sensing posts 110 projecting upwards at the four corners of the rectangular box. On the other hand, the measuring member 106 has four sensing elements 112 projecting upwards from the upper surface, near the four corner portions of an area in which a drawing operation is effected. The four sensing posts 110 and the four sensing elements 112 are provided with respective sets of strain gages 114, 116. Suitably selected ones of the sensing pins 104 indicated above are provided with respective sets of strain gages 118. The strain gages 114, 116, 118 are connected to a dynamic strain detector 120, which is connected to an electromagnetic oscilloscope 122, so that waveforms of loads detected by the strain gages 114, 116, 118 are recorded on a photosensitive recording medium by the oscilloscope 122. The dynamic strain detector 20 has a function of an amplifier, and is capable of 1adjusting a zero point thereof. The oscilloscope 122 is capable of recording, with high response, the load values which vary as the main slide 20 is moved up and down. The positioning member 102 and the measuring member 106 are designed to have higher rigidity than the punch 12 and upper die 18 which are used for an actual drawing operation.

The strain gages 114, 116, 118 function as means for detecting the holding force and pressing force which are expected to act on the pressure ring 30 and the blank, respectively. Each set of strain gages 114, 116, 118 consists of four strain gages attached to each sensing post 110, sensing element 112 or sensing pin 104, at respective four side surface portions of the latter. The four strain gages of each set are connected to each other so as to form a bridge circuit. The strain gages 114 are provided for measuring the holding force associated with the outer slide of a double-action press. The strain gages 116 are provided for measuring the pressing force associated with the inner slide of the double-action press, and the pressing and holding forces on the single-action press 10. The strain gages 118 are provided for measuring the load values which act on the individual cushion pins 24 of the cushioning device 51.

To measure the holding force and the pressing force which are expected to be generated on the single-action press 10, the positioning member 102 and the measuring member 106 are installed on the press 10, without the punch 12, pressure ring 30 and upper die 18 installed on the press 10. For the measurement, the main slide 20 is lowered to its lower stroke end. During this downward movement of the main slide 20, the lower surface of the main slide 20 is brought into contact with the sensing elements 112 on the measuring member 106, whereby the measuring member 106 is lowered against the biasing force of the pneumatic cylinder 42. The loads acting on the four sensing elements 112 during this downward movement of the measuring member 106 are detected by the strain gages 116. Before the main slide 20 has reached its lower stroke end, the measuring member 106 comes into abutting contact with the positioning member 102. At this time, the loads detected by the strain gages 116 suddenly rise, due to rigidity of the structure of the press 10. The heights of the sensing elements 112 from the upper surface of the measuring member 106 are determined or adjusted so that the measuring member 106 abuts on the positioning member 102 shortly before the main slide 20 has reached the lower stroke end.

Figure 7:
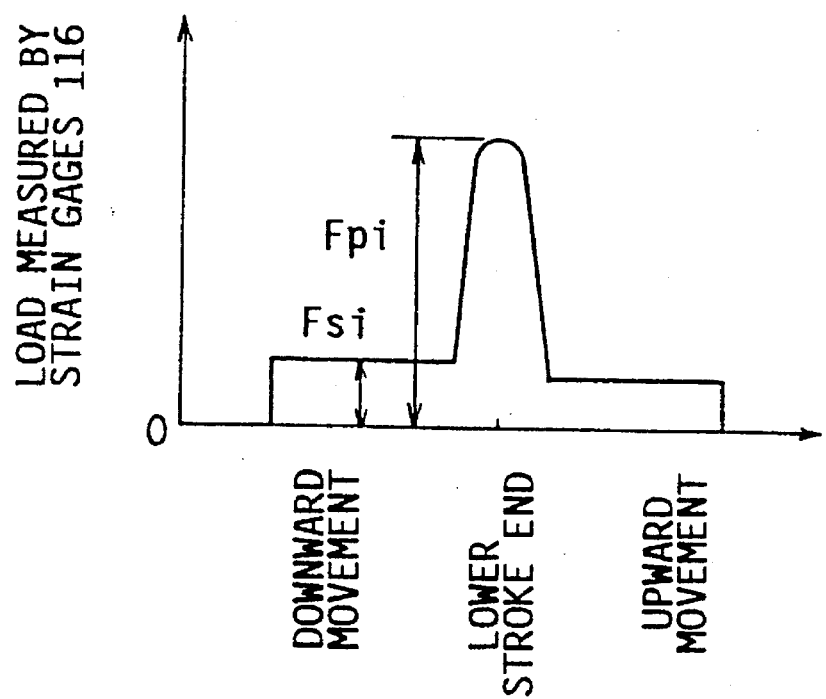
FIG. 7 is a graph showing an example of a waveform of the load detected by strain gages 116 used in the measuring apparatus of FIG. 6.

The graph of FIG. 7 indicates a variation in the load detected by the strain gages 116 provided on one of the four sensing elements 112. In the graph, a load value Fsi corresponds to the holding force expected to be applied to the pressure ring 30, and a load value Fpi corresponds to the pressing force expected to be applied to the punch and die 12, 18 (blank). The load value Fpi includes the load value Fsi.

Figure 8:
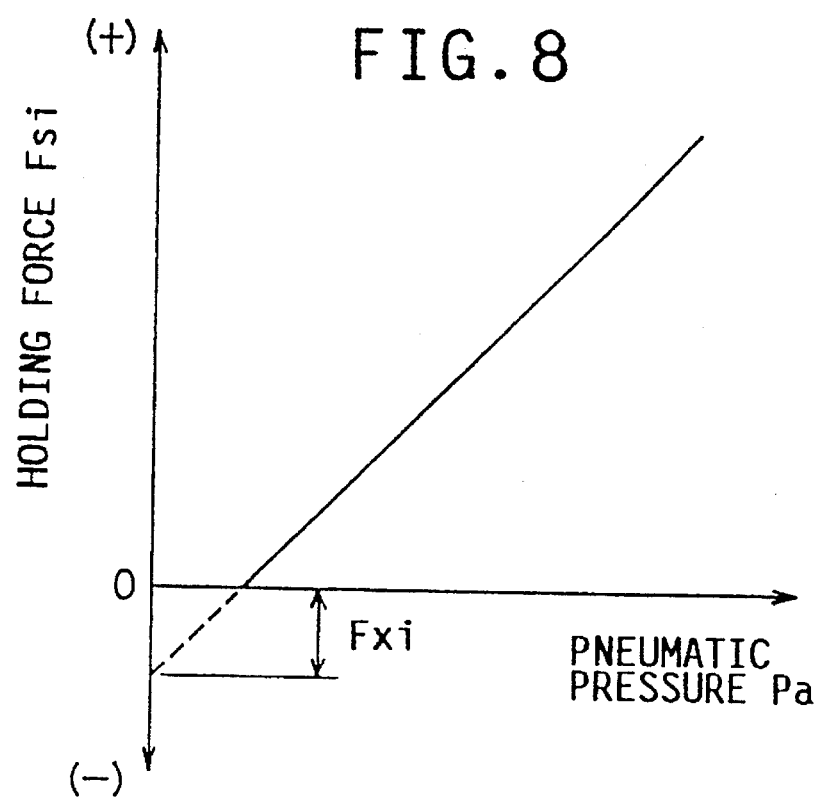
FIG. 8 is a graph indicating a relationship between the holding force Fsi detected by the measuring apparatus of FIG. 6 and a pneumatic pressure Pa.

The graph of FIG. 8 indicates a relationship between the pneumatic pressure Pa of the pneumatic cylinder 42 and the load value Fsi (corresponding to the holding pressure), which was obtained by measuring the load value Fsi while the pneumatic pressure Pa was continuously changed. The weight Wa of the cushion pad 28 is calculated on the basis of a load value Fxi which can be obtained from the Pa-Fsi relationship. Described more specifically, the weight Wa is calculated by subtracting the total weight of the measuring member 106 (including the weight of the sensing pins 104 and elements 112) and the cushion pins 24, from a total load value Fx of the load values Fxi (i=1, 2, 3, 4) of the four sensing elements 112. Alternatively, the weight Wa can be obtained from a relationship between the pneumatic pressure Pa and a total load value Fs of the detected load values Fsi of the four sensing elements 112. The thus obtained weight Wa is different from and smaller than the actual weight of the cushion pad 28, by an amount which is determined by various parameters such as the sliding resistance values of the guide 40 and piston 43, a degree of the air leakage of the pneumatic cylinder 42 and a detecting error of the pneumatic pressure sensor 50. Accordingly, the obtained weight Wa is specific to the particular condition of the press 20 on which the measuring apparatus 100 was operated. As indicated above, the weight Wa is used as one item of the machine specifications. The weight Wa may be replaced by an actual weight of the cushion pad 28, and a sliding resistance value which can be obtained on the basis of a difference ΔFsi between the load values Fsi and Fpi shown in the graph of FIG. 7.

The weight Wp is an average value of the weights of the multiple cushion pins 24 used on the press 10. The weight Ws is equal to the actual weight of the main slide 20 minus a sliding resistance value of the slide 20 with respect to a guide therefor. To obtain the weight Ws, the load values Foi are detected by the respective strain gages 61 during the downward movement of the main slide 20. The total load value Fo of the four load values Foi of the four plungers 22 is detected while the pneumatic pressure Pb of the pneumatic cylinder 80 is continuously changed. Like the weight Wa of the cushion pad 28, the weight Ws of the main slide 20 can be obtained from the obtained characteristic relationship between the total load Fo and the pneumatic pressure Pb. The weight Ws may be replaced by the actual weight of the main slide 20, and the related sliding resistance value.

The pressure-receiving area Aa of the pneumatic cylinder 42 is a value which reflects an influence of the air leakage of the cylinder 42. For instance, the area Aa corresponds to a gradient of a line which represents the relationship between the holding force Fs (total load value Fsi) and the pneumatic pressure Pa. When a plurality of pneumatic cylinders 42 are provided, the area As is a total pressure-receiving area of all the cylinders 42. Like the pressure-receiving area As, the total pressure-receiving area Ab of the four pneumatic cylinders 80 can be obtained from the Fo-Pb characteristic relationship. The average pressure-receiving area As of the hydraulic cylinders 32 can be obtained from a characteristic relationship between the holding force Fs, and the hydraulic pressure Ps which is detected by the hydraulic pressure sensor 38 when the Fsi-Pa characteristic relationship of FIG. 8 is obtained, for example.

The modulus K of elasticity of volume of the working fluid is determined depending upon the specific property of the oil used. The mean travel Xav of the pistons of the hydraulic cylinders 32 is an average value of travel distances of the pistons of the cylinders 32 from the upper stroke ends, when the main slide 20 has reached its lower stroke end. The travel distances are determined so as to apply the holding force to the pressure ring 30 evenly through all of the cushion pins 24 in abutting contact with the ring 30. Described more particularly, the travel distances are determined so that all of the pistons of the cylinders 32 are lowered from their upper stroke ends by the respective cushion pins 24 while none of the pistons are bottomed or lowered to their lower stroke ends by the cushion pins 24, upon reaching of the main slide 20 to its lower stroke end, even in the presence of a variation in the length of the cushion pins 24 and an inclination of the cushion pad 28. The travel distances can be obtained by an experiment, or on the basis of the measured length variation of the cushion pins 24 and maximum strokes of the pistons of the cylinders 32. The volume V is a total volume of the working fluid existing in a portion of the hydraulic circuit associated with the hydraulic cylinders 32, which portion includes the pressure chambers of the cylinders 32 and is bounded by a check valve 39 (FIG. 1). The volume V is a value when the pistons of the cylinders 32 are at their upper stroke ends.

The provisional h-Fpi characteristic relationship (i=1, 2, 3, 4) is a relationship (Fpi=a·h) between the distance h and the pressing force Fpi when the plungers 22 have reached the lower stroke ends. This relationship is obtained by measuring the pressing force values Fpi (when the plungers 22 have reached the lower stroke ends), with different values of the distance h. Since the value Fpi differs depending upon the rigidity of the punch and upper die 12, 18, suitable members having considerably higher rigidity than the die set are used for the measurement of the value Fpi. The obtained provisional h-Fpi relationship reflects the rigidity of the press 10 (except for the punch and upper die). It is noted that the measurement is effected after the pneumatic pressure Pb of the pneumatic cylinders 80 is adjusted so that the lifting force produced by the cylinders 80 counterbalances the total weight of the main slide 20 and the upper die 18.

Figure 9:
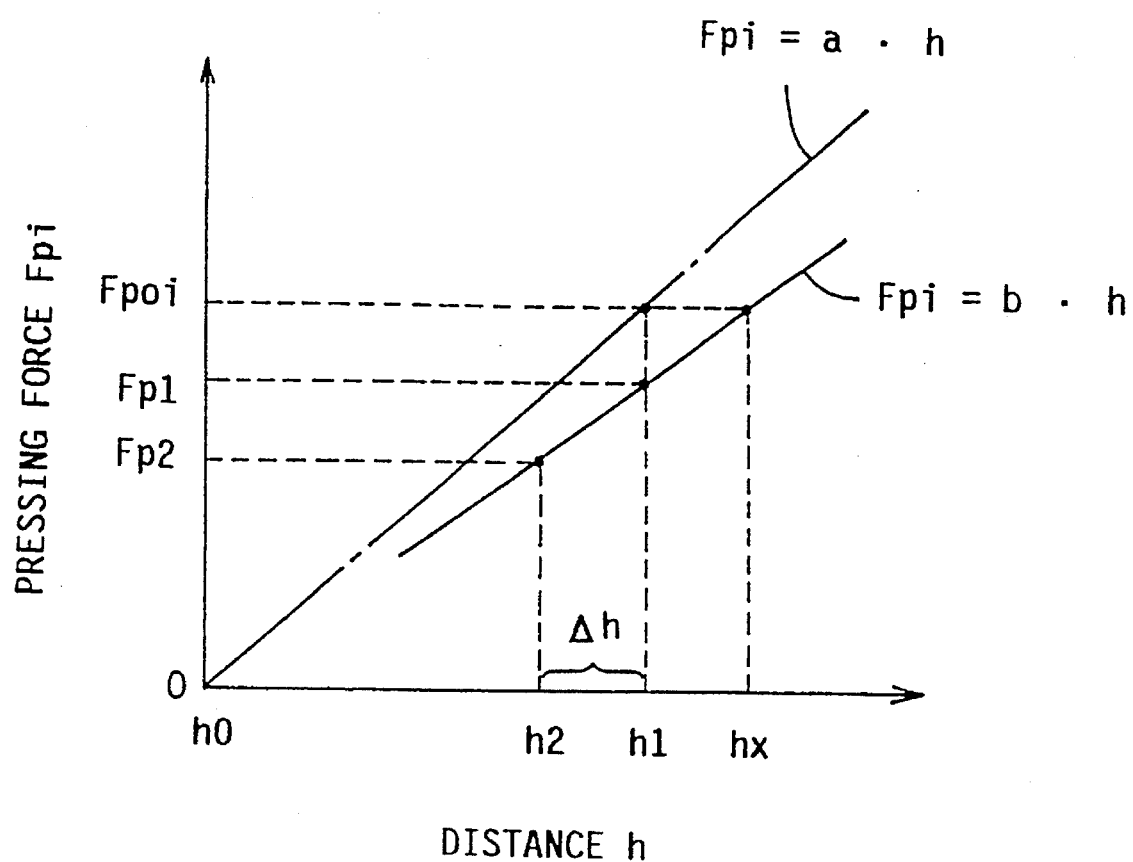
FIG. 9 is a graph indicating a pressing force Fpi of the press and a distance h as indicated in FIG. 2.

An example of the provisional h-Fpi characteristic relationship is indicted by one-dot chain line in the graph of FIG. 9, wherein the maximum value h0 of the distance h when the pressing force Fpi is zero is used as a reference. This h-Fpi characteristic relationship is obtained for each of the four plungers 22 (four die-height adjusting mechanisms 52). The overall pressing force Fp is a sum of the pressing forces Fpi of the individual plungers 22. The provisional h-Fpi characteristic relationship may be obtained from the load values Fpi shown in FIG. 7, by using the load measuring apparatus 100.

There will next be described the individual items of the information on the die set 12, 18, 30.

The weight Wr of the pressure ring 30 and the weight Wu of the upper die 18 are the values actually measured of the ring 30 and die 18 as manufactured. The holding pressure Fso and the pressing force Fpoi (i=1, 2, 3, 4) are obtained by a trial-and-error procedure, in which the optimum forces Fso and Fpoi suitable for performing a desired drawing operation are determined by test operations on a trial or test press on which the pressure ring 20, upper die 18 and punch 12 are installed. The holding pressure Fso and pressing force Fpoi do not include components due to the influences by the weights of the punch and die 12, 18 and the sliding resistance values of the associated components. In the case where the trial press is similar to that shown in FIGS. 1 and 2, for example, the pneumatic pressure Pb is adjusted so that the main slide 20 is lowered by the plungers 22 While the total weight of the slide 20 and the upper die 18 is counterbalanced by the lifting force produced by the cylinders 80. The load values Foi are detected by the strain gages 61 during a trial drawing operation effected with the adjusted pneumatic pressure Pb. The holding force Fso and pressing force Fpoi can be obtained on the basis of the detected load values Foi. While the holding force Fso is a total force applied to the pressure ring 30 through the cushion pins 24, the pressing force Fpoi is a force produced by each of the four plungers 22, and the total pressing force Fp is a sum of the forces Fpoi of the four plungers 22. The number n of the cushion pins 24 is determined depending upon the size and shape of the pressure ring 30, so as to draw a blank into a desired product.

The press operation data memory 128 of the ID-card 96 stores data indicative of optimum distances h* associated with the four plungers 22 of the specific press 10, and data representative of the serial numbers of individual machines of the press 10 on which the punch 12 with the ID card 96 attached thereto is used. The data are written in the data memory 128, through the transmitter/receiver 94 and the transceiver 127, and sent to the controller 90 through the transmitter/receiver 94 and transceiver 127. Each optimum distance h* stored in the data memory 128 is the distance h as adjusted by the die-height adjusting mechanism 52 so that the drawing operation is effected on the press 10, with the pressing forces Fpoi stored in the die set data memory 125. Since the punch 12 may be used for different machines of the press 10, the optimum distances h* specific to the individual machines are stored in the data memory 128 of the ID card 96 attached to the punch 12 used. When a drawing operation is effected on the specific pressing machine 10, the distances h associated with the four plungers 22 on that machine 10 is adjusted to the optimum value h* corresponding to the appropriate serial number of the machine. If a single servomotor 60 is used to adjust the distance h associated with the four plungers 22, only one optimum distance h* is stored in the data memory 125, for each pressing machine 10.

Figure 4:
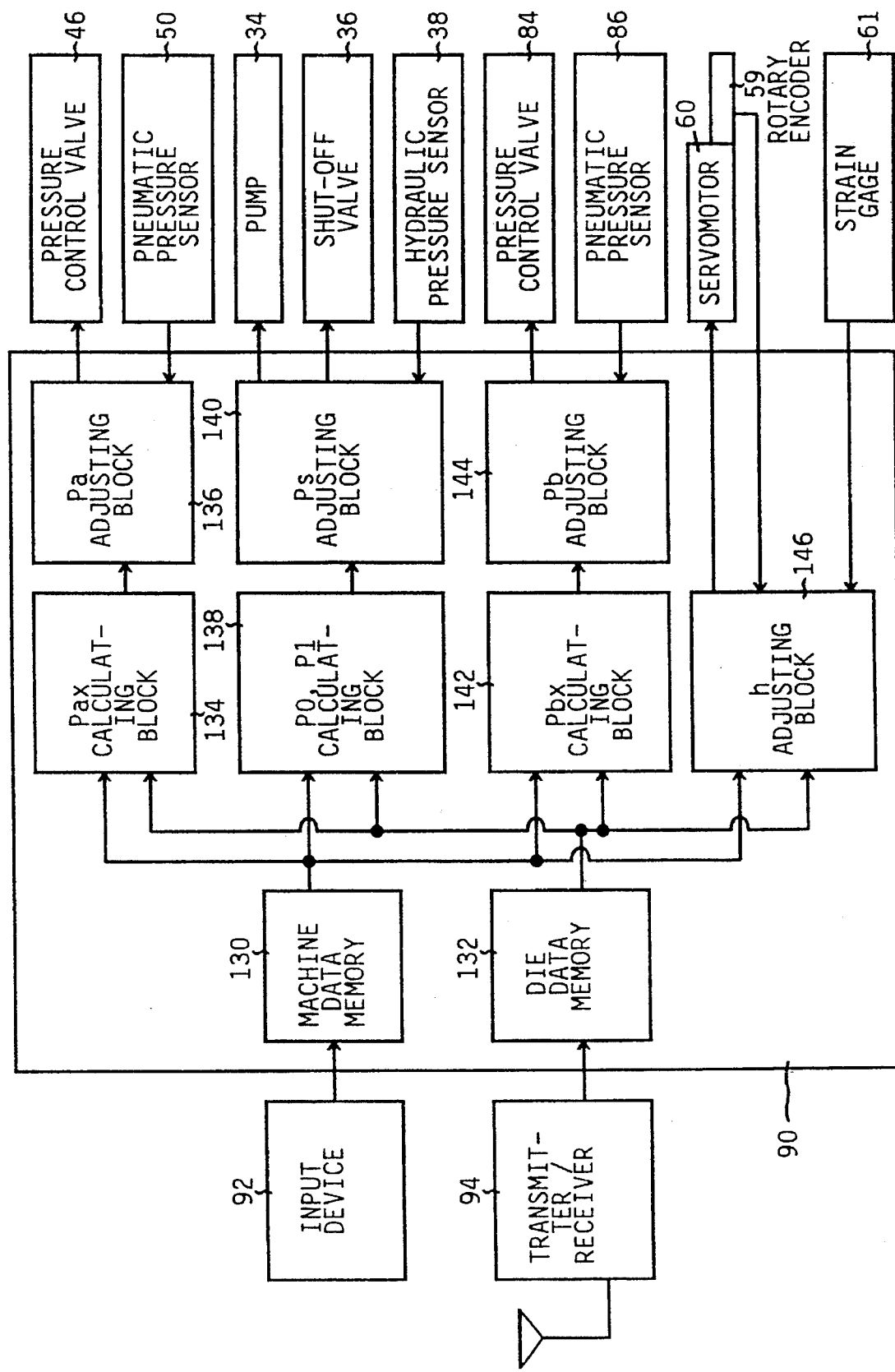
FIG. 4 is a block diagram for explaining the functions of a controller of the control system of FIG. 3.

Referring back to FIG. 3, the controller 90 is adapted to achieve various functions as illustrated in the block diagram of FIG. 4, according to the control programs stored in its ROM. The controller 90 includes a machine data memory 130 for storing data including the machine information entered through the data input device 92. The controller 90 further includes a die data memory 132 for storing the data including the die set information which is read and transmitted by the transmitter/receiver 94, from the ID card 96 on the punch 12 installed on the press 10. As indicated above, the die set information stored in the die set data memory 125 of the ID card 96 includes the data indicative of the optimum distances h* of the press 10 in question.

The block diagram of FIG. 4 shows various functional blocks which correspond to respective means for performing the corresponding functions. A Pax calculating block 134 is for calculating an optimum pneumatic pressure Pax for producing the holding force Fso, according to the following equation (1), on the basis of the machine information stored in the machine data memory 130 and the die set information stored in the die data memory 132. The holding force Fso to be produced is represented by the die set information:

$$Pax=(Fso+Wa+Wr+n\cdot Wp)/Aa \quad (1)$$

A Pa adjusting block 136 is for controlling the solenoid-operated pressure control valve 46 so that the pneumatic pressure Pa in the air tank 44 detected by the pneumatic pressure sensor 50 coincides with the optimum pneumatic pressure Pax calculated by the Pax calculating block 134. With the pneumatic pressure Pa thus adjusted, the holding force Fso specified by the die information is applied to the pressure ring 30. The pneumatic pressure Pax may be calculated, with suitable compensation for a change in the volume of the pressure chamber of the pneumatic cylinder 42 due to a downward movement of the cushion pad 28. In this respect, however, since the capacity of the air tank 44 is sufficiently large, they amount of change in the pneumatic pressure Pa due to the change in the volume of the pressure chamber of the cylinder 421 is so small and negligible. Thus, the block 134 corresponds to means for calculating the optimum pneumatic pressure Pax, while the block 136 cooperates with the pressure control valve 46 and the pressure sensor 50, to constitute means for adjusting the pneumatic pressure Pa as one of the operating conditions of the press 10.

A P0, P1 calculating block 138 is for calculating an optimum initial hydraulic pressure P0 and an optimum final hydraulic pressure P1 according to the following equations (2) and (3), respectively, on the basis of the machine information in the machine data memory 130 and the die set information in the die data memory 132.

$$Xav(Fso-n\cdot As \quad P0)V/n^2\cdot As^2\cdot K \quad (2)$$

$$Fso+Wr+n\cdot Wp=n\cdot As\cdot P1 \quad (3)$$

The optimum initial hydraulic pressure P0 is a pressure for applying the holding force Fso to the pressure ring 30 substantially equally through the cushion pins 24, when the upper die 18 is not in contact with the pressure ring 30. On the other hand, the optimum final hydraulic pressure P1 is a similar pressure when the upper die 18 is in pressing contact with the pressure ring 30.

A Ps adjusting block 140 is for controlling the pump 34 and shut-off valve 36, so that the initial value of the hydraulic pressure Ps detected by the hydraulic pressure sensor 38 is equal to the calculated optimum initial hydraulic pressure P0 indicated above. With the hydraulic pressure Ps thus adjusted to the optimum initial value P0, it is theoretically possible to lower the pistons of all the hydraulic cylinders 32 by the average travel distance Xav, in a drawing operation with the pressure ring 30 in pressing contact with the upper die 18, and to apply the holding force Fso to the pressure ring 30 substantially equally through the cushion pins 24. However, the optimum initial hydraulic pressure P0 is not necessarily accurate enough due to a possibility of existence of air in the hydraulic circuit including the cylinders 32, which causes a variation in the modulus K of elasticity of volume of the working fluid. In view of this drawback, the Ps adjusting block 140 is adapted to read the hydraulic pressure Ps in a test operation, and adjust the pressure Ps once adjusted to the optimum initial value P0, so that the pressure Ps is made substantially equal to the optimum final pressure P1 also calculated according to the P0, P1 block 138. If the actually detected hydraulic pressure Ps during the test operation is higher than the optimum final value P1, some of the cushion pins 24 are not in abutting contact with the pressure ring 30, and the holding force Fso is applied to the pressure ring 30 through the other cushion pins 24 only. In this case, the initial hydraulic pressure P0 is lowered to move the cushion pins 24 upwards so that all the cushion pins 24 may contact the pressure ring 30. If the actual hydraulic pressure Ps is lower than the optimum final value P1, on the other hand, the pistons of some of the hydraulic cylinders 32 are bottomed, and a portion of the holding force Fso acts on the pressure ring 30 directly through the cushion pad 28 and the cushion pins 24 corresponding to the bottomed pistons. In this case, the initial hydraulic pressure P0 is raised to avoid the bottoming of the pistons of any cylinders 32. The test operation indicated above is conducted after the pneumatic pressure Pa is adjusted to obtain the holding force Fso. The block 138 corresponds to means for calculating the optimum initial and final pressure values P0 and P1, while the block 140 cooperates with the pump 34, pressure control valve 36 and pressure sensor 38 to constitute means for adjusting the hydraulic pressure Ps, as one of the operating conditions of the press 10.

A Pbx calculating block 142 is for calculating an optimum pneumatic pressure Pbx of the pneumatic cylinders 80 to produce a lifting force for counterbalancing the total weight of the main slide 20 and the upper die 18, according to the following equation (4), on the basis of the machine information and die set information.

$$Pbx=(Wu+Ws)/Ab \quad (4)$$

A Pb adjusting block 144 is for controlling the solenoid-operated pressure control valve 84 so that the pneumatic pressure Pb in the air tank 82 detected by the pneumatic pressure sensor 86 coincides with the optimum pressure Pbx calculated according to the Pbx calculating block 142. With the pressure Pb thus adjusted, the pressing force Fpoi as specified by the die set information can be applied to the die set 12, 18, in a drawing operation, without an influence of the weights of the slide 20 and upper die 18. The optimum pneumatic pressure Pbx may be calculated, with suitable compensation for a change in the volume of the pressure chamber of each pneumatic cylinder 80 due to a downward movement of the main slide 20. In this respect, however, since the capacity of the air tank 82 is sufficiently large, the amount of change in the pneumatic pressure Pb due to the change in the volume of the pressure chamber of the cylinder 80 is so small and negligible. The block 142 corresponds to means for calculating the optimum pneumatic pressure Pbx, while the block 144 cooperates with the pressure control valve 84 and the pressure sensor 86 to constitute means for adjusting the pneumatic pressure Pb as one of the operating conditions of the press 10.

Figure 10:
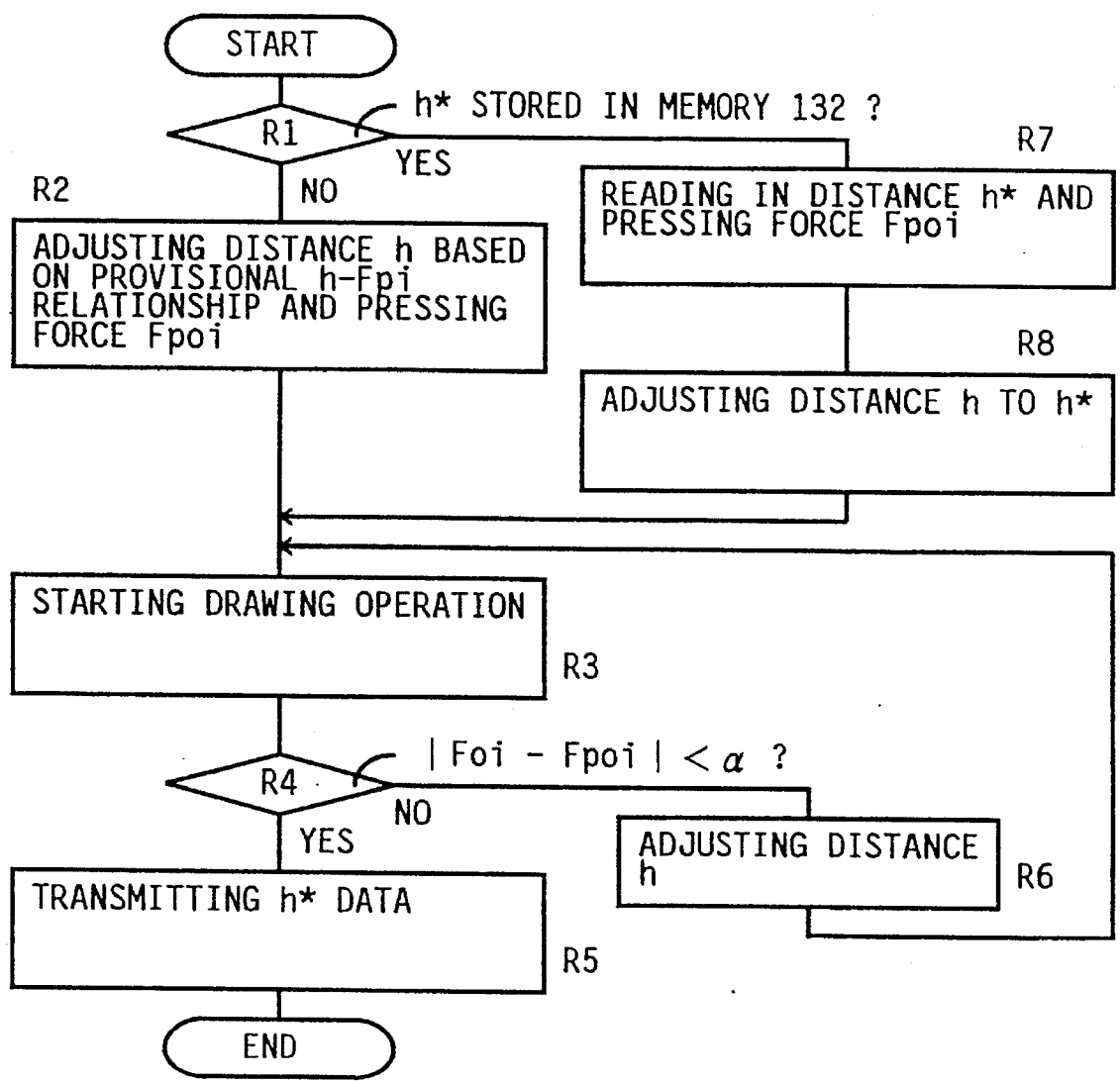
FIG. 10 is a flow chart illustrating details of the functional block 146 of FIG. 4 for adjusting the distance h.

An h adjusting block 146 is for adjusting the distances h associated with the four die-height adjusting mechanisms 52, independently of each other, according to a control routine as illustrated in the flow chart of FIG. 10. The control routine is started with step R1 to determine whether data representative of the optimum distances h* for the press 10 in question are stored in the die data memory 132, or not. If the data representative of the optimum distances h* are stored in the memory 132, step R7 is implemented. If the data are not stored in the memory 132, namely, if the die set 12, 18, 30 (including the punch 12 carrying the ID card 96) is used for the first time on the appropriate press 12, the control flow goes to step R2.

Figure 11:
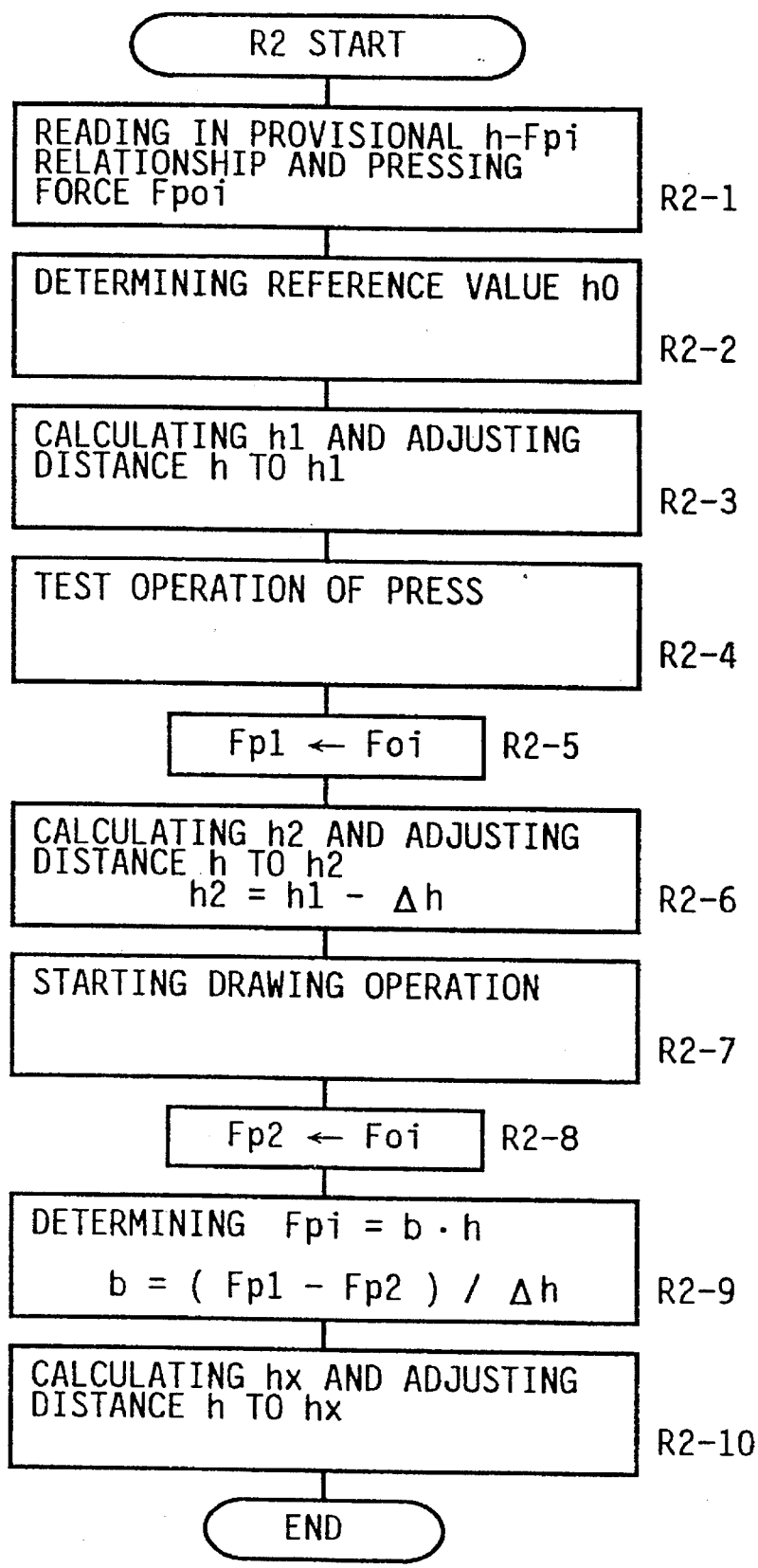
FIG. 11 is a flow chart illustrating an operation performed in step R2 of the flow chart of FIG. 10.

The details of a sub-routine in step R2 of FIG. 10 are shown in the flow chart of FIG. 11. This sub-routine is started with step R2-1 in which the provisional h-Fpi relationship and the optimum pressing force Fpoi are read from the machine data memory 130 and the die data memory 132, respectively. Step R2-1 is followed by step R2-2 in which the reference value h0 which is the maximum value of the distance h when the pressing force Fpi of each plunger 22 is zero is determined from the corresponding load value Foi detected by the strain gages 61 on the corresponding plunger 22. To this end, test operations are conducted with different values of the distance h for each plunger 22, which increase in steps by a predetermined amount, and the actual distance h is detected when the pressing force Foi exceeds a predetermined threshold. Alternatively, the main slide 20 is lowered down to its lower stroke end with the distance h set at its minimum value, and the distance h is increased by operating the appropriate servomotor 60 until the pressing force Foi exceeds a predetermined threshold. In either case, the actual distance h when the pressing force Foi exceeds the threshold is used as the reference value h0. The reference value may also be determined by visual inspection by the operator of the abutting condition of the punch and die 12, 18.

Step R2-2 is followed by step R2-3 in which a distance h1 for obtaining the pressing force Fpoi is obtained from the provisional h-Fpi characteristic relationship (Fpi=a·h) as indicated by one-dot chain line in the graph of FIG. 9, and the distance h is then adjusted to the obtained value h1, with respect to the reference value h0, by operating the servomotor 60. The control flow then goes to step R2-4 to perform a test operation (one reciprocation of the main slide 20) on the press 10. Step R2-4 is followed by step R2-5 in which the pressing force Fp1 is determined on the basis of the load value Foi represented by the output signals of the strain gages 61 when the main slide 20 is at its lower stroke end. Since the predetermined provisional h-Fpi characteristic relationship is based on higher rigidity of the die set than the rigidity of the actually used die set 12, 14, 30, the pressing force Fp1 is generally smaller than the load value Fpoi. Then, the control flow goes to step R2-6 to calculate a distance h2 which is smaller than h1 by a predetermined amount Δh, and to adjust the distance h to h2. Step R2-6 is followed by steps R2-7 and R2-8 similar to steps R2-4 and R2-5, to measure the pressing force Fp2 in the same manner as described above with respect to the value Fp1. Step R2-9 is then implemented to obtain a final h-Fpi characteristic relationship (Fpi=b·h) as indicated by solid line in FIG. 9, based on the thus obtained values Fp1, Fp2, and a difference Δh between the distances h1 and h2. Finally, step R2-10 is implemented to determine an optimum distance hx (corresponding to the optimum distance h* indicated above) for obtaining the pressing force Fpoi, according to the obtained final h-Fpi relationship, and activate the servomotor 60 for adjusting the distance h to the determined optimum distance hx. The determination of the distance hx and the adjustment of the distance h to the determined distance hx by the servomotor 60 are effected for each of the four mechanisms 52 (four plungers 22). The sub-routine of FIG. 11 corresponds to means for calculating the optimum distance hx (h*). The above step R2-10 of FIG. 11 cooperates with step R8 of FIG. 10 (which will be described) to provide means for adjusting the distance h as one of the operating conditions of the press 10.

Referring back to the flow chart of FIG. 10, step R2 is followed by step R3 in which a desired drawing operation is effected on the blank, with the distances h associated with all the plungers 22 adjusted to the optimum distances hx determined in step R2. This step R3 is also effected following step R8 (which will be described). In this case, the drawing operation in step R3 is effected with the distances h adjusted to the optimum distances h* stored in the die data memory 132. Step R3 is followed by step R4 to determine whether an absolute value |Foi−Fpoi|, a difference between the load value Foi represented by the output signals of the strain gages 61 and the pressing force Fpoi when the main slide 20 is at its lower stroke end is smaller than a predetermined value α, or not. The predetermined value α is determined depending upon the detecting error and control accuracy associated with the values Foi and Fpoi. If the difference is equal to or larger than the predetermined value α, step R6 is implemented to change the distances h by a predetermined amount. Step R6 is repeatedly implemented until the difference becomes smaller than the predetermined value α. With this adjustment of the distances h, it is possible to perform a drawing operation with the optimum pressing force Fpoi as specified by the die set information stored in the data memory 132, irrespective of a variation in the rigidity from one pressing machine to another. When the difference becomes is smaller than the threshold value α, step R4 is followed by step R5 in which the data representative of the distances h as represented by the output signals of the rotary encoders 59 associated with the four plungers 22 are sent from the transmitter/receiver 94 to the ID card 96 and stored in the press operation data memory 128, as the optimum distances h*, together with the data indicative of the serial number of the pressing machine 10 in question. If the corresponding data are already stored in the data memory 128, the already stored data are replaced by the data sent from the transmitter/receiver 94.

If an affirmative decision (YES) is obtained in step R1, that is, if the data representative of the optimum distances h* of the press 10 in question are already stored in the die data memory 132 because a drawing operation using the same punch 12 (die set 12, 18, 30) has ever been performed on the press 10, the control flow goes to step R7 in which the data representative of the optimum distances h* and the load force Fpoi are read from the die data memory 132. Step R8 is then implemented to activate the servomotors 60 to adjust the distances h to the optimum values h*. Step R8 is followed by steps R3–R6 to adjust the distances h as needed until the load values Foi as detected by the strain gages 61 are made substantially equal to the pressing force Fpoi, and send the data representative of the adjusted distances h, to the ID card 96 as the data representative of the optimum distances h*.

The controller 90 is also adapted to regulate the pneumatic pressure Pc in the air chamber 70 of the cylinder 66, so that the load value Foi detected by the strain gages 61 on each plunger 22 does not exceed a predetermined upper limit Foli (i=1, 2, 3, 4). That is, the solenoid-operated pressure control valve 74 is controlled to adjust the pneumatic pressure Pc to a predetermined optimum value Pcx. This optimum value Pcx is determined on the basis of the pressure-receiving area of the cylinder 62 and the pressure-receiving areas of the oil and air chambers 68, 70 of the cylinder 66, so that if a load exceeding the upper limit Foli acts on the overload-protective hydraulic cylinder 62, due to increased sliding resistance of the main slide 20, for example, the piston of the cylinder 66 may be moved towards the air chamber 70, thereby permitting the working oil to flow from the hydraulic cylinder 62 into the oil chamber 68 of the cylinder 66, and allowing the corresponding plunger 22 to be moved towards and relative to the main slide 20. This adjustment of the pneumatic pressure Pc is effected for all of the four cylinders 66 provided for the respective four plungers 22, so that the pressure values Pci of the four cylinders 66 are adjusted independently of each other. Thus, the overload-protective cylinder 62 protects the press 10 and the die set against damage due to an overload. Since the optimum pneumatic pressure Pc is not influenced by the die set, the adjustment may be effected manually, i.e., by manipulation of the pressure control valve 74 by the operator of the press 10.

It will be understood from the above explanation that the press 10 is capable of automatically calculating optimum values of the operating conditions of the press, such optimum pneumatic pressures Pax, Pbx, initial hydraulic pressure P0 and optimum distances hx, so as to establish the optimum holding pressure Fso and optimum pressing force Fpoi as determined in a trial or test operation on a test machine and stored in the die data memory 132, irrespective of variations or differences in the rigidity and sliding resistances of the press from one machine to another. The automatic calculation of the optimum operating parameters is effected by the controller 90, according to the machine information stored in the machine data memory 130 and the die set information stored in the die data memory 132 (received from the ID card 96 via the transmitter/receiver 94). The controller 90 is further adapted to automatically adjust the operating conditions such as the pneumatic pressures Pa, Pb, hydraulic pressure Ps and distances h to the calculated optimum values Pax, Pbx, P0 and hx. Thus, the press 10 eliminates or minimizes the conventional cumbersome manual adjustment of the operating conditions of the press by the trial-and-error procedure, and reduces the operator's work load during a setup procedure of press, while assuring high stability in the quality of formed products obtained.

As described above, when a given die set (12, 18, 30) is used for the first time to perform a drawing operation on the press 10, the optimum distances hx are determined according to the provisional h-Fpi relationship and the pressing force Fpoi, during test pressing operations (in step R2 of FIG. 10), and the distances h are adjusted to the determined optimum distances hx, as explained above in detail by reference to the flow chart of FIG. 11. The thus adjusted distances h are stored in the ID card 96 as the optimum distances h* (step R5 of FIG. 10), so that when a pressing operation is effected again using the same die set on the press 10, the distances h are adjusted according to the stored optimum distances h*, without the sub-routine of FIG. 11 being executed. Therefore, the time necessary for the adjustment of the distances h is shortened, and the production efficiency of the press 10 is accordingly improved.

In the present embodiment, steps R2, R3, R4 and R6 of FIG. 10 are considered as a step for determining the optimum values hx (h*) and adjusting the distances h to the optimum values hx (h*), when a certain drawing operation is effected for the first time using a given die set on the press 10. Further step R5 is considered a step for storing the data representative of the adjusted distances h (optimum distances h*) in the press operation data memory 128 of the ID card 96. Steps R7 and R8 are considered as a step for utilizing the data stored in the memory 128 to establish or reproduce the optimum distances hx (h*) for the subsequent drawing operations using the same die set. It is also noted that a portion of the controller 90 assigned to implement steps R2–R4 and R6 constitutes means for determining the optimum distances hx (h*) and adjusting the distances h to the optimum values hx, when a given die set is used for the first time on the press 10. A portion of the controller 90 assigned to implement steps S7 and R8 constitutes reproducing means for utilizing the press operation-data stored in the data memory 128 to reproduce the optimum distances h* for the subsequent drawing operations using the same die set. Further, the transmitter/receiver 94 and the ID card 96 constitute data input means for receiving the pressing force Fpoi as die set information and storing the die set information into the die data memory 132 of the controller 90, while the press operation data memory 128 of the ID card 96 serves as memory means for storing the data representative of the optimum distances h*.

It is appreciated that data representative of the hydraulic pressure Ps as adjusted for the first time according to the optimum initial and final values P0, P1 are also stored in the ID card 96, as data representative of optimum hydraulic pressure Ps*, together with the data representative of the serial number of the specific pressing machine 10 used, so that when the same die set is subsequently used on the machine, the hydraulic pressure Ps is adjusted to Ps* without the prior determination of the optimum values P0, P1 and adjustment according to P0, P1. The pneumatic pressures Pa and Pb may be comparatively readily adjusted according to the above equations (1) and (4). However, data representative of optimum pneumatic pressures Pa* and Pb* may also be stored the ID card 96, depending upon the requirements.

It is not absolutely necessary to adjust the operating conditions Pa, Pb, Ps and h exactly to the optimum values Pax, Pbx, P0 and hx as calculated. In this respect, it is possible to provide certain ranges of tolerances for those operating conditions, within which the quality of the products produced by the press 10 satisfies appropriate requirements.

While the automatic adjustments of the parameters Pa, Pb, Ps and h under the control Of the controller 90 have been described above, these parameters may be manually adjusted in a manual mode established by a suitable selector switch provided in the controller 90, for example. The selector switch has respective positions for establishing the automatic and manual modes.

Although the pressure sensors 50, 86 and the pressure control valves 46, 84 are provided on the press 10, they may be provided on a stand-alone control console separate from the press, as in a second embodiment of the invention described below.

Figure 12:
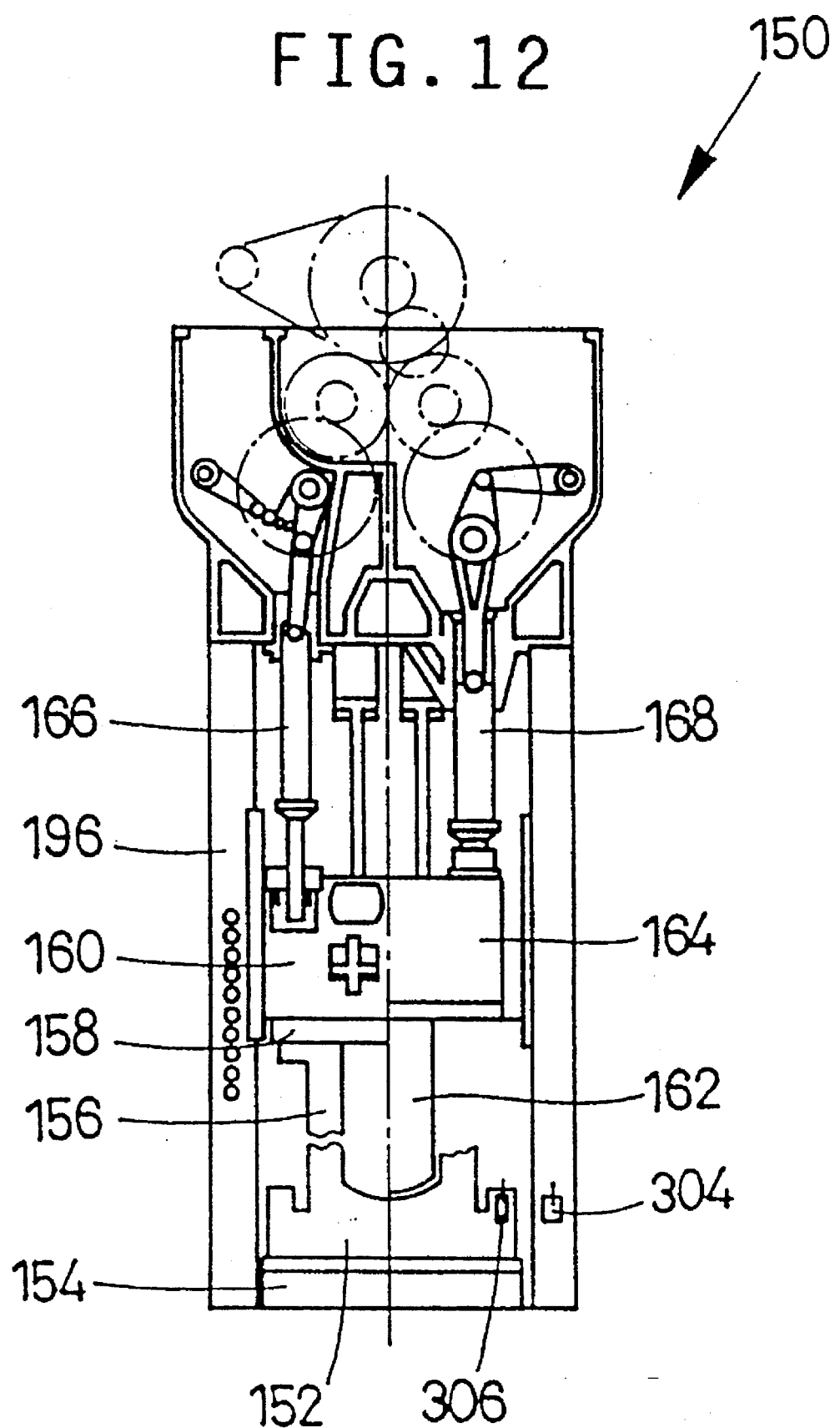
FIG. 12 is an elevational view showing an example of a double-action press whose operation conditions are automatically adjusted according to a second embodiment of this invention.
Figure 15A:
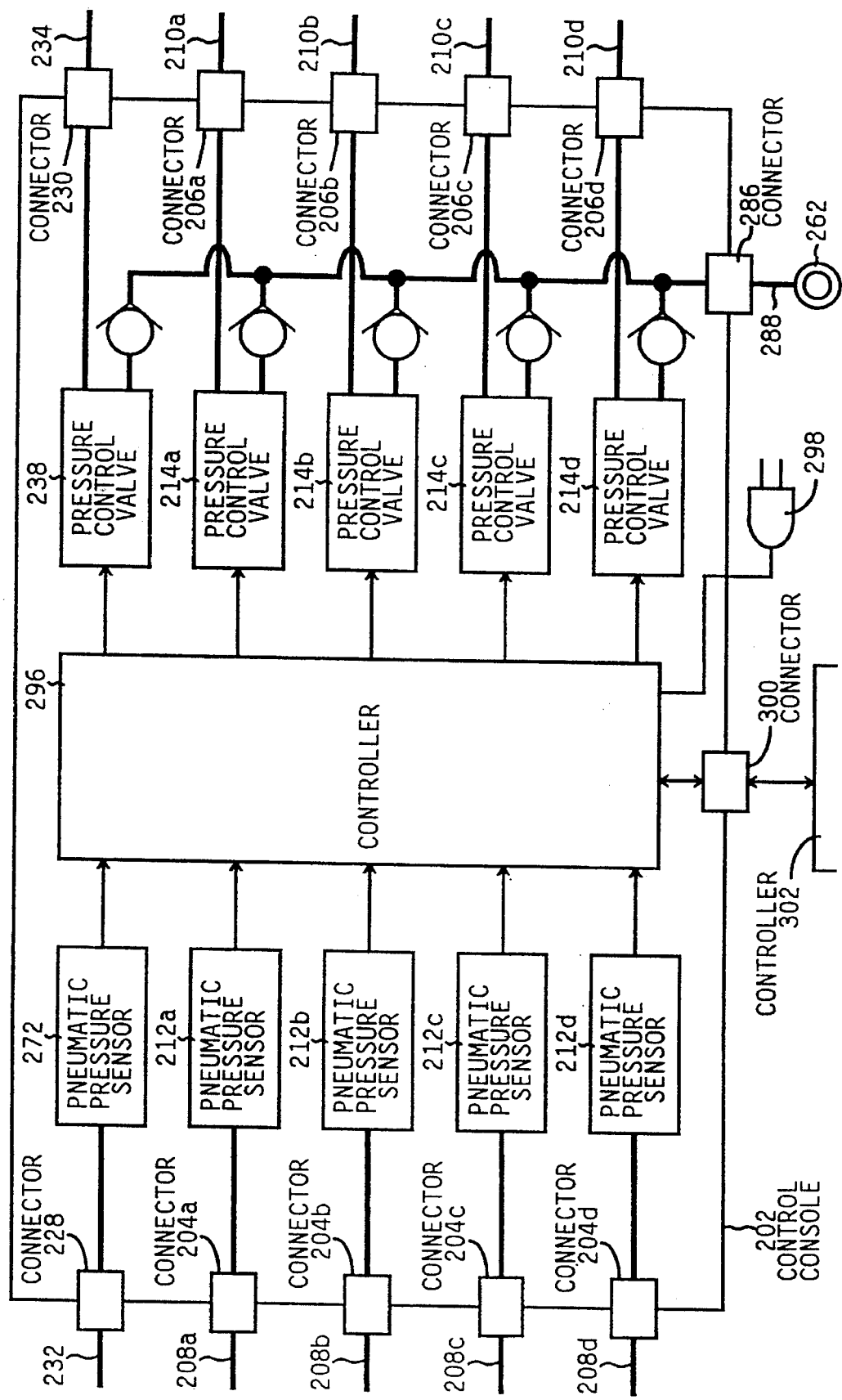
FIGS. 15A and 15B are block diagrams illustrating a control system for the press of FIG. 12 according to the second embodiment of the invention.
Figure 15B:
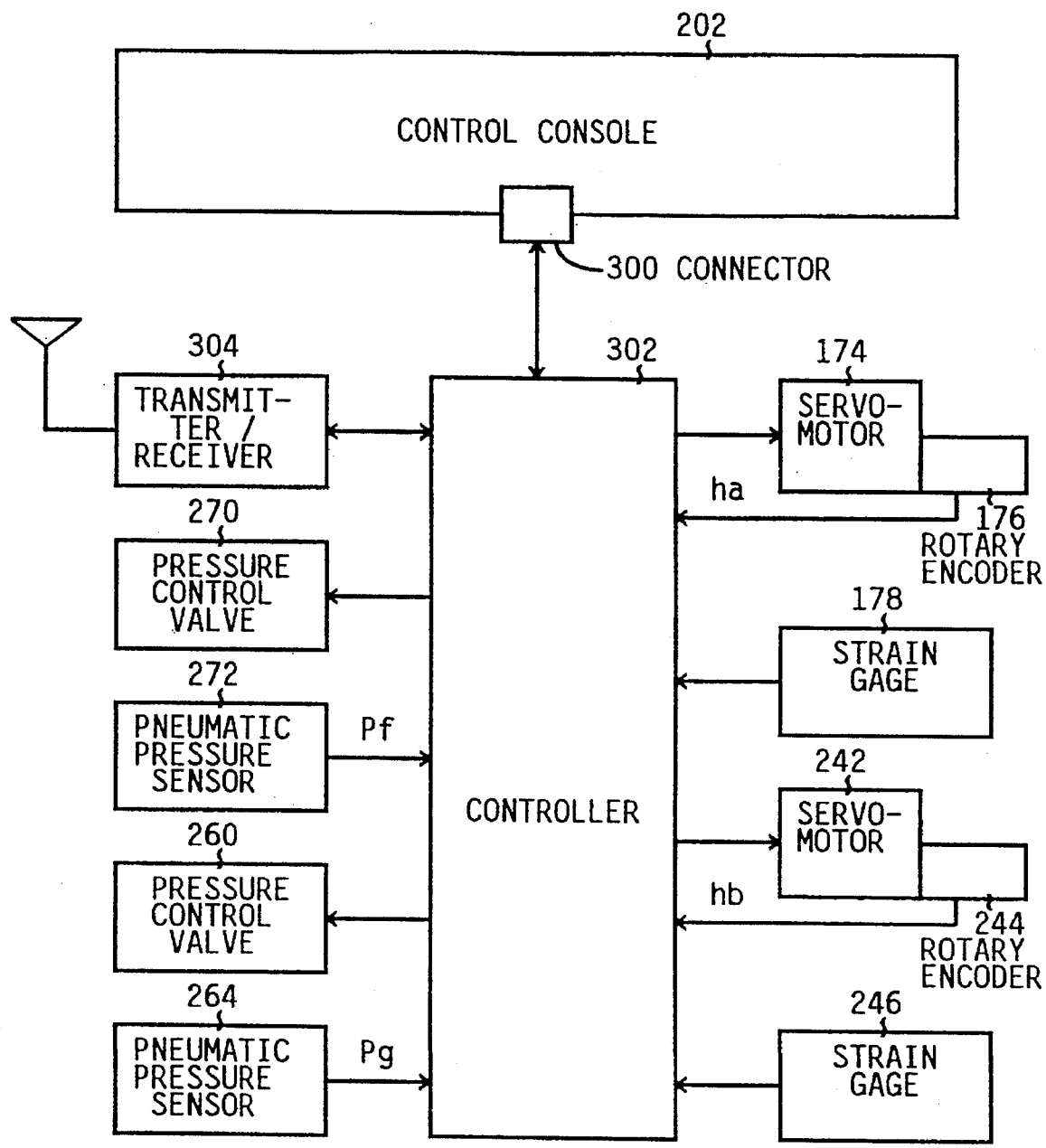

Referring next to FIG. 12, there is shown an example of a double-action press 150 also adapted to perform a drawing operation on a blank in the form of a metal strip or sheet. The double-action press 150 is controlled by a control system as shown in FIGS. 15A and 15B, which is constructed according to the second embodiment of this invention.

Figure 13:
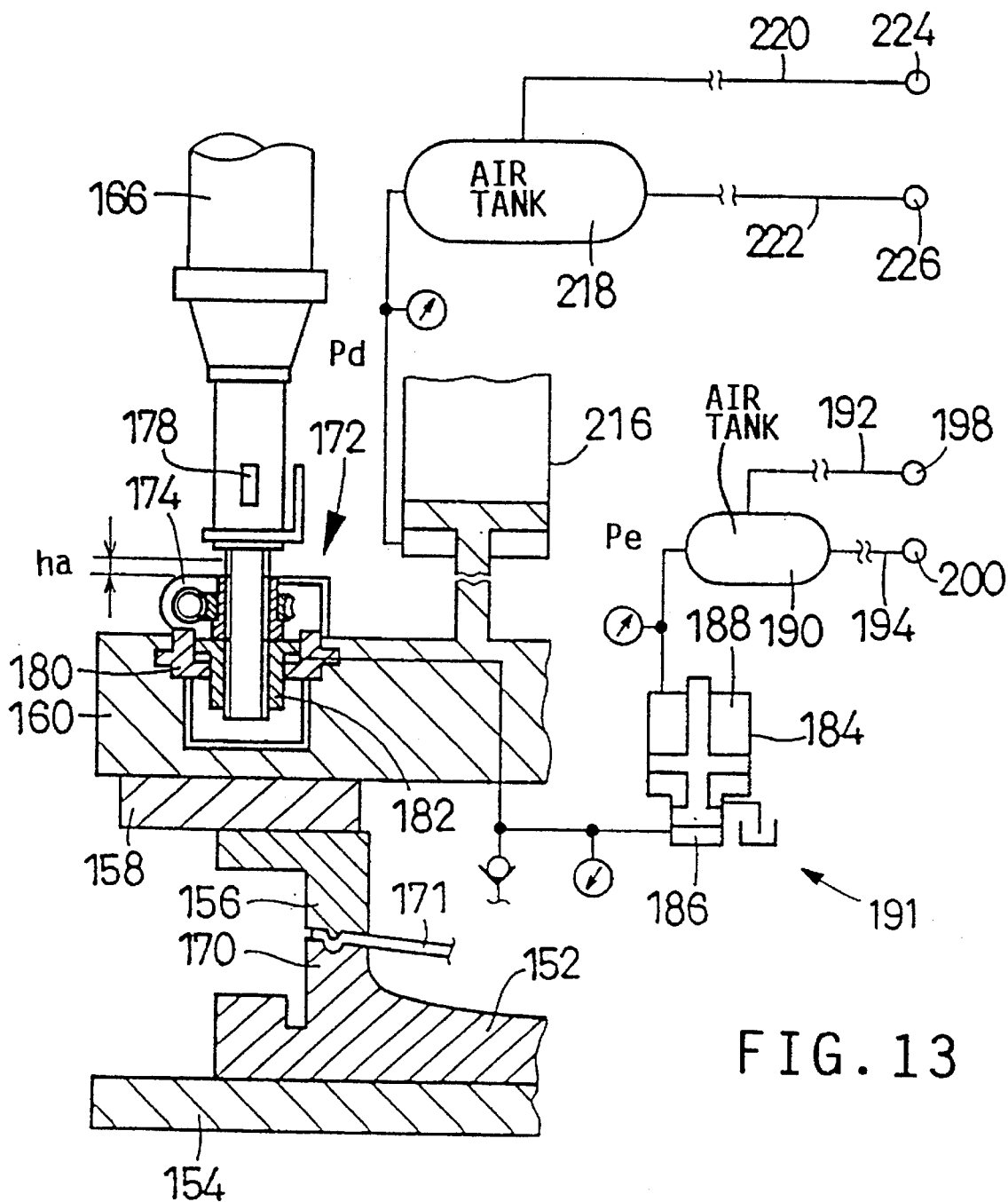
FIG. 13 is a schematic view showing a die-height adjusting mechanism, a counterbalancing pneumatic cylinder and the related components associated with an outer slide of the press of FIG. 12.

The press 150 has: a bolster 154 on which a lower die 152 is fixed; an outer slide 160 which carries a pressure ring 156 through a blank holder plate 158 secured thereto; and an inner slide 164 to which is fixed an upper die in the form of a punch 162. The outer slide 160 and the inner slide 164 are vertically reciprocated by four outer plungers 166 and four inner plungers 168, respectively. As shown in FIG. 13, the lower die 152 includes a pressure portion 170, which cooperates with the pressure ring 156 to hold a peripheral portion of the blank 171 therebetween while the blank 171 is drawn by the punch 162 and the lower die 152. The lower die 152, pressure ring 156 and punch 162 constitute a die set removably installed on the press 150.

As is apparent from FIG. 13, each of the four outer plungers 166 is connected to the outer slide 160, via a die-height adjusting mechanism 172 similar to the mechanism 52 described above with respect to the single-action press 10. The mechanism 172 is operated by a servomotor 174 to adjust a distance ha. The adjusted distance ha is detected by a rotary encoder 176 (FIG. 15B) provided on the servomotor 174. The outer slide 166 is lowered with respect to the outer plunger 166 as the distance ha increases. Accordingly, the holding force Fs applied to the pressure ring 156 when the outer plunger 166 is at its lower stroke end is changed with the distance ha. Thus, the distance ha is one of the operating conditions of the press 150, which is adjusted depending upon the desired holding force Fs. The die-height adjusting mechanism 172 is provided for each of the four outer plungers 166, so that the distances ha associated with all the plungers 166 can be adjusted. The outer plungers 166 are provided with respective sets of strain gages 178 to detect the load values Fai (i=1, 2, 3, 4) acting thereon.

Each die-height adjusting mechanism 172 is integrally connected to a piston 182 of a hydraulic cylinder 180, which is provided for adjusting the holding pressure. The housing of the hydraulic cylinder 180 is built in the outer slide 160. The pressure chamber of the hydraulic cylinder 180 is filled with a working oil and communicates with an oil chamber 186 of a cylinder 184. The cylinder 184 also has an air chamber 188 communicating with an air tank 190, which is connected to connectors 198, 200 disposed on a frame 196, through respective conduits 192, 194, respectively. The connectors 198, 200 are connected to respective pressure-tight connector hoses 208a, 210a, which are connected to respective connectors 204a, 206a provided on a control console 202 (FIG. 15A), at their ends remote from the connectors 198, 200. Pneumatic pressure Pe within the air tank 190 is detected by a pneumatic pressure sensor 212a provided in the control console 202, and is adjusted by a solenoid-operated pressure control valve 214a also provided on the control console 202. The cylinder 180, cylinder 184 and air tank 190 are provided for each of the four outer plungers 166 (four die-height adjusting mechanisms 172 provided on the outer slide 160). The other three air tanks 190 are connected through respective pairs of conduits to respective pairs of connectors on the machine frame 196, which are connected to respective connectors 204a–204d through respective pressure-tight connector hoses 208b–208d, and also to respective connectors 206b–206d through respective pressure-tight connector hoses 210b–210d. Pneumatic pressures Pe within those three other tanks 190 are detected by respective pneumatic pressure sensors 212b–212d, and adjusted by respective solenoid-operated pressure control valves 214b–214d. The pneumatic pressure Pe in each air tank 190 is also one of the operating conditions of the press 150, which is adjusted depending upon the holding force Fs. The connectors 198, 200, 204a–204d, 206a–206d, and hoses 208a–208d and 210a–210d are differently colored for facilitating their connection.

The cylinder 180 of each die-height adjusting mechanism 172 and the corresponding cylinder 184 and air tank 190 constitute a force applying device 191 for producing the holding force Fs to the blank 171 through the pressure ring 156.

The outer slide 160 is connected to four counterbalancing pneumatic cylinders 216 attached to the machine frame 196 of the press 150. The pressure chamber of each pneumatic cylinder 216 communicates with an air tank 218, which in turn is connected to connectors 224, 226 disposed on the machine frame 196, through respective conduits 220, 222. The connectors 224, 226 are connected to respective pressure-tight connector hoses 232, 234, which are connected to respective connectors 228, 230 provided on the control console 202, at their ends remote from the connectors 224, 226. Pneumatic pressure Pd within the air tank 218 is detected by a pneumatic pressure sensor 236 provided in the control console 202, and is adjusted by a solenoid-operated pressure control valve 238 also provided on the control console 202. The pneumatic pressure Pd is one of the operating conditions of the press 150, which is adjusted such that the holding force Fs is not influenced by the weights of the outer slide 160 and the pressure ring 156. The four counterbalancing pneumatic cylinders 216 are connected to the common air tank 218.

Figure 14:
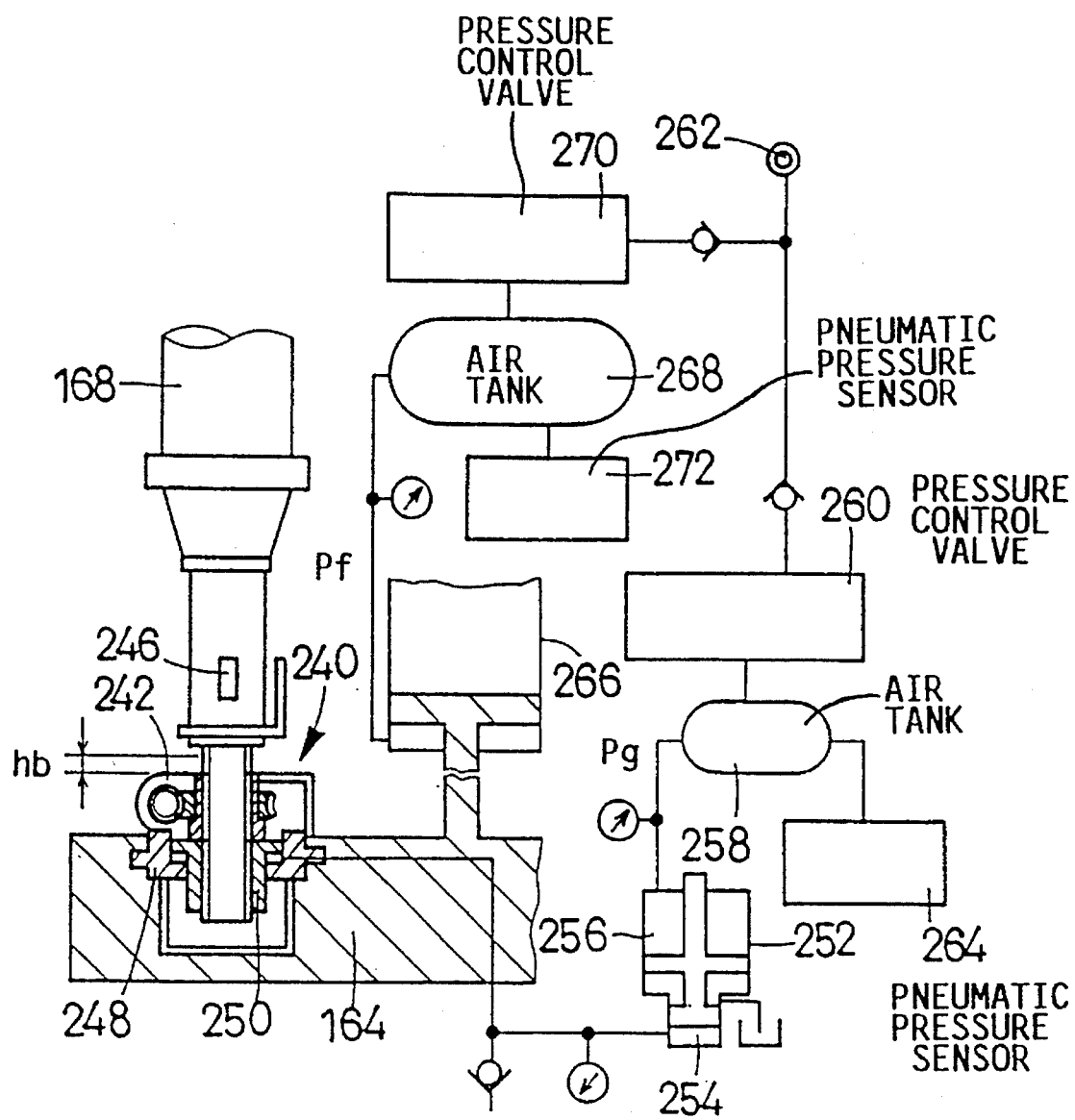
FIG. 14 is a schematic view showing a die-height adjusting mechanism, a counterbalancing pneumatic cylinder and the related components associated with an inner slide of the press of FIG. 12.

As shown in FIG. 14, each of the four inner plungers 168 is connected to the inner slide 164 through a die-height adjusting mechanism 240 similar to the mechanism 172, so that a distance hb as indicated in the figure is adjustable by a servomotor 242. The distance hb is detected by a rotary encoder 244 (FIG. 15B) provided on the servomotor 242. The inner slide 164 is lowered with respect to the inner plunger 168 as the distance hb increases. Accordingly, the pressing force Fp applied to the blank 171 when the inner plunger 168 is at its lower stroke end is changed with the distance hb. Thus, the distance hb is one of the operating conditions of the press 150, which is adjusted depending upon the desired pressing force Fp. The die-height adjusting mechanism 240 is provided for each of the four inner plungers 168, so that the distances hb associated with all the plungers 168 can be adjusted. The inner plungers 168 are provided with respective sets of strain gages 246 to detect the load values Fbi (i=1, 2, 3, 4) acting thereon.

Each die-height adjusting mechanism 240 is integrally connected to a piston 250 of an overload-protective hydraulic cylinder 248. The housing of the hydraulic cylinder 248 is built in the inner slide 164. The pressure chamber of the hydraulic cylinder 248 is filled with a working oil and communicates with an oil chamber 254 of a cylinder 252. The cylinder 252 also has an air chamber 256 communicating with an air tank 258, which is connected to an air source 262 through a solenoid-operated pressure control valve 260. Pneumatic pressure Pg within the air chamber 256 and air tank 258 is adjusted by the pressure control valve 260. The pneumatic pressure Pg is detected by a pneumatic pressure sensor 264, and adjusted depending upon the pressing capacity of the press 150, so that when an overload acts on the hydraulic cylinder 248, the piston of the cylinder 252 is moved toward the air chamber 256 to permit the adjusting mechanism 240 and the inner slide 164 to move towards each other, for protecting the press 150 and the die set against damage. The hydraulic cylinder 248, cylinder 252 and air tank 258 are provided for each of the four inner plungers 168 (for each of the four die-height adjusting mechanisms 240 of the inner slide 168), and the pneumatic pressure Pg in each of the four cylinders 252 is adjusted as described above.

The inner slide 164 is connected to four counterbalancing pneumatic cylinders 266 attached to the machine frame 196 of the press 150. The pressure chamber of each pneumatic cylinder 266 communicates with an air tank 268, which in turn is connected to the air source 262 through a solenoid-operated pressure control valve 270. Pneumatic pressure Pf within the pressure chamber of the cylinder 266 and the air tank 268 is adjusted by the pressure control valve 270. The pneumatic pressure Pf is detected by a pneumatic pressure sensor 272, and is one of the operating conditions of the press 150, which is adjusted such that the pressing force Fp is not influenced by the weights of the inner slide 164 and the punch 162. The pressure chambers of the four pneumatic cylinders 266 are connected to the common air tank 268.

Figure 18:
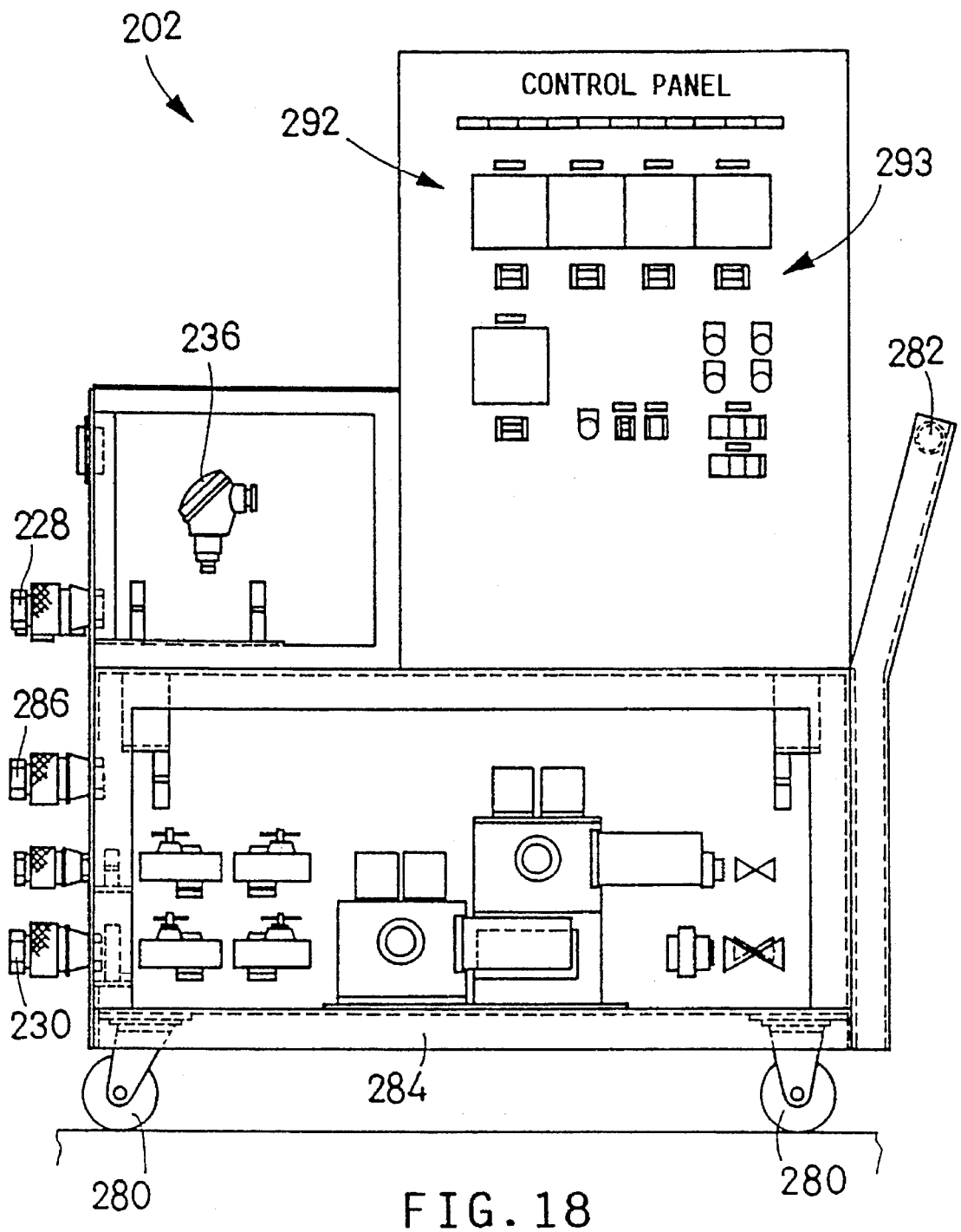
FIG. 18 is a front elevational view of a control console provided in the control system of FIGS. 15A and 15B.
Figure 19:
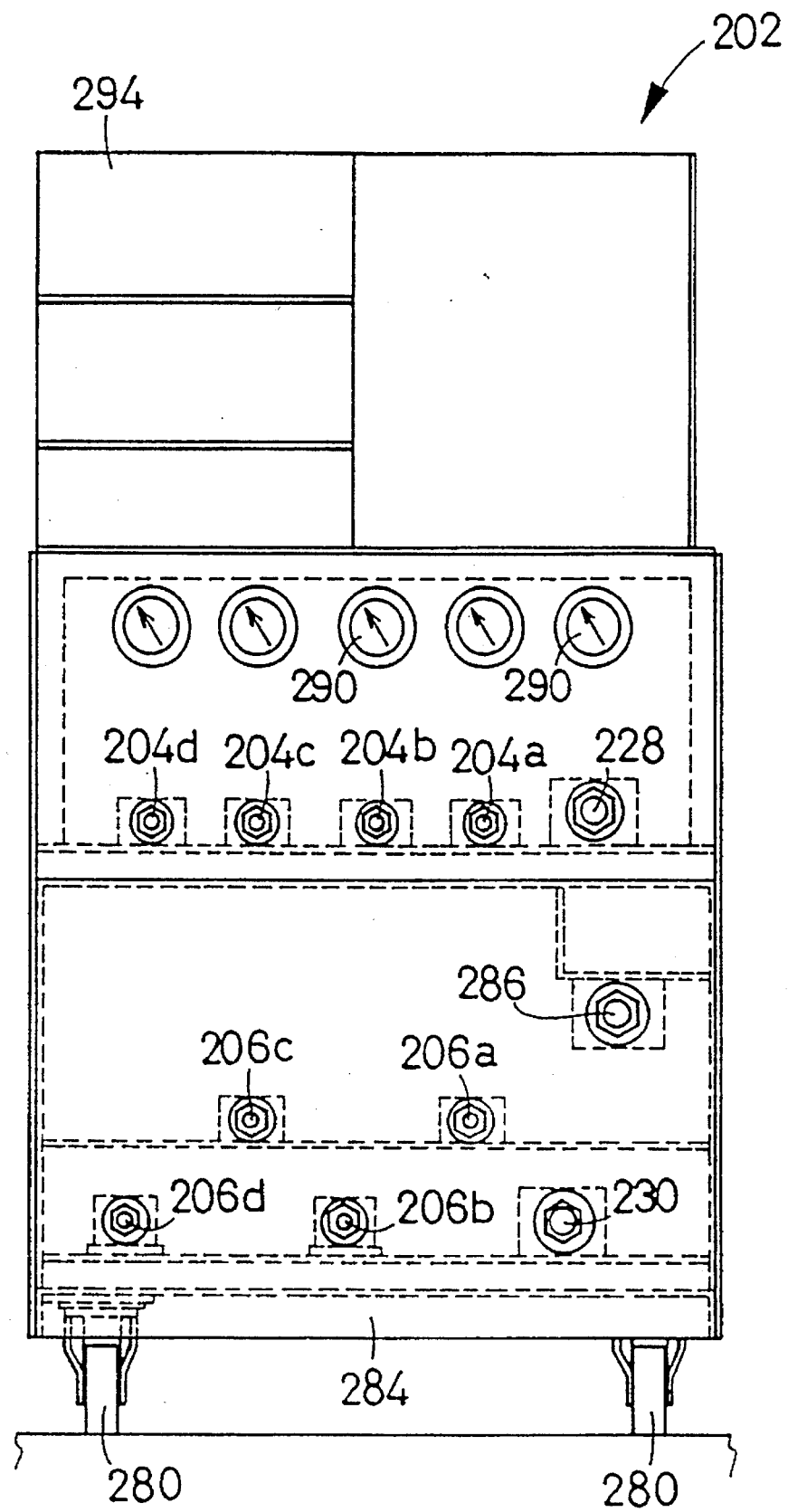
FIG. 19 is a left-hand side elevational view of the control console of FIG. 18.

As shown in FIGS. 18 and 19, the control console 202 is mounted on a trolley 284 provided with four wheels 280 for easy movement with a handle 282 gripped by the user. The control console 202 is used selectively for two or more pressing machines 150, as needed. As described above, the control console 202 has the connectors 204a–204d, 206a–206d, 228, 230, and the solenoid-operated pressure control valves 214l–214d, 238. The control console 202 also has a connector 286 connected to the pressure control valves 214a–214d and 238. This connector 286 is connected to a pressure-tight connector hose 288 which in turn is connected to the above-indicated air source 262, as shown in FIG. 15A. The control console 202 is equipped with various pressure gages 290 for analog indication of the pneumatic pressures Pe, Pd as detected by the pressure sensors 212a–212d, 236, and a display panel 292 for digital indication of various parameters such as the holding force Fsi (i=1, 2, 3, 4,) and the counterbalancing force which are obtained by the pneumatic pressures Pe, Pd. The control console 202 is also provided with adjusting switches 293 for manually adjusting the holding force Fsi and the counterbalancing force. The pressure-tight connector hoses 288, 208a–208d, 210a–210d, 232 and 234 can be accommodated within a storage box 294 provided on the control console 202.

As indicated in FIG. 15A, the control console 202 incorporates a controller 296, which receives output signals of the pneumatic pressure sensors 212a–212d, 236 which represent the pneumatic pressures Pe, Pd. The controller 296 is a microcomputer including a central processing unit (CPU), a random-access memory (RAM), a read-only memory (ROM), and an input-output interface circuit, as well known in the art. The CPU processes the signals, to control the pressure control valves 214a–214d and 238, according to control programs stored in the ROM, while utilizing a temporary data storage function of the RAM. The control console 202 is connected to a power source in a factory, through a plug 298, and to an exclusive controller 302 through a connector 300, as also indicated in FIG. 15A. The controller 296 of the control console 202 and the exclusive controller 302 effect interactive communication so that the exclusive controller 302 controls the servomotors 176, 242 and the pressure control valves 260, 270.

The exclusive controller 302 may be a personal computer including a CPU, a RAM, a ROM, an input-output interface circuit, and an A/D converter. The CPU operates according to control programs stored in the ROM, while utilizing a temporary data storage function of the RAM. The exclusive controller 302 receives the output signals of the pneumatic pressure sensors 264, 272 representative of the pneumatic pressures Pg, Pf, the output signals of the rotary encoders 176, 244 representative of the distances ha, hb, and the output signals of the strain gages 178, 246 representative of the load values Fai, Fbi. The controller 302 controls the servomotors 174, 242 and the pressure control valves 260, 270, based on the received signals. Although FIG. 15B shows only one piece or unit, for the servomotors 174, 242, strain gages 178, 246, pressure control valve 260, and pressure sensor 264, four pieces are in fact provided for each of these elements, as described above, and the exclusive controller 302 controls all of the four pieces.

The exclusive controller 302 is adapted to store machine information on the specifications of the machine 150, and die set information on the die set 152, 156, 162 used on the press 150. The machine information is received from a suitable input device such as a keyboard, while the die set information is received from an ID card 306 through a transmitter/receiver 304. The ID card 306 is attached to the lower die 152 as indicated in FIG. 12, and the transmitter/receiver 304 is disposed on the machine frame 196 such that the transmitter/receiver 304 faces the ID card 306, as also shown in FIG. 12. Like the ID card 96 used in the first embodiment, the ID card 306 has a data transmitting function and incorporates a battery. Upon reception from the transmitter/receiver 304 of a signal requesting transmission of the die set information, the ID card 96 transmits the die set information to the transmitter/receiver 304, which in turn transmits the received information to the exclusive controller 302. The transmitter/receiver 304 and the ID card 306 function as data input means for receiving the appropriate die set information. The die set information received by the transmitter/receiver 304 is sent to the controller 296 through the exclusive controller 302.

The information indicative of the specifications of the press 150 and the die set 152, 156, 162 is necessary to determine the pneumatic pressure values Pd, Pe, Pf, and distances ha and hb, which are optimum for effecting a drawing operation under the best conditions. The information received by the controller 302 include the following items, for example. It is noted that the information on the die set also includes data indicative of the specific die set used, which differs depending upon a model of a car for which a part produced by the press is used, a type of press on which the die set is used, and a process in which the product is obtained from the blank.

MACHINE INFORMATION o Travel Y of the piston of the cylinder 184 o Pressure-receiving area Ax of the hydraulic cylinder 180 o Pressure-receiving area Ay of the oil chamber 186 of the cylinder 184 o Pressure-receiving area Az of the air chamber 188 of the cylinder 184 o Volume Ve of the air tank 190 o Total weight Wos of the outer slide 160 and the blank holder plate 158 o Weight Wis of the inner slide 164 o Total pressure-receiving area Ad of the four pneumatic cylinders 216 o Total pressure-receiving area Af of the four pneumatic cylinders 266 o Provisional ha-Fsi relationship (Fsi=c·ha+d)

o Provisional hb-Fpi relationship (Fsi=e·hb)

DIE SET INFORMATION o Weight Wr of the pressure ring 156 o Weight Wq of the punch 162 o Holding force Fsoi o Pressing force Fpoi

The travel Y, pressure-receiving areas Ax, Ay, Az and volume Ve are obtained for each of the four outer plungers 166 connected to the outer slide 160. The travel Y is a travel distance of the piston of the cylinder 184 from its lower stroke end toward the air chamber 188. The travel Y is determined by an experiment, for example, so as to apply a suitable holding force to the pressure ring 156 based on the pneumatic pressure Pe. The pressure-receiving areas Ax, Ay and Az are effective areas which are determined according to the operating characteristics of the cylinders 180, 184 and which reflect influences of the sliding resistance and the fluid leakage. The volume Ve includes the volume of the air chamber 188 of the cylinder 184, and can be obtained on the basis of a change in the pressure Pe in relation to the travel distance of the piston of the cylinder 184.

The total weight Wos of the outer slide 160 and the blank holder plate 158 is the actual total weight minus the sliding resistance of the outer slide 160. Like the weight Ws of the slide plate 20 in the first embodiment, this weight value Wos can be obtained from a Fa-Pd relationship, which is obtained from the total load Fa measured upon lowering of the outer slide 160 while the pneumatic pressure Pd in the cylinder 216 is changed. The total load Fa is a sum of the four load values Fai detected by the strain gages 178. The weight Wos may be replaced by the actual total weight of the outer slide 160 and the blank holder plate 158, and the sliding resistance value of the outer slide 160. The weight Wis of the inner slide 164 can be obtained from the Fb-Pf relationship.

The total pressure-receiving area Ad of the four pneumatic cylinders 216 reflects the influences of the air leakage of the individual cylinders 216. A gradient of the line representing the Fa-Pd relationship corresponds to the total press-receiving area Ad. The total pressure-receiving area Af of the four pneumatic cylinders 266 reflects the influences of the air leakage of the individual cylinders 266. A gradient of the line representing the Fa-Pf relationship corresponds to the total pressure-receiving area Af.

Figure 20:
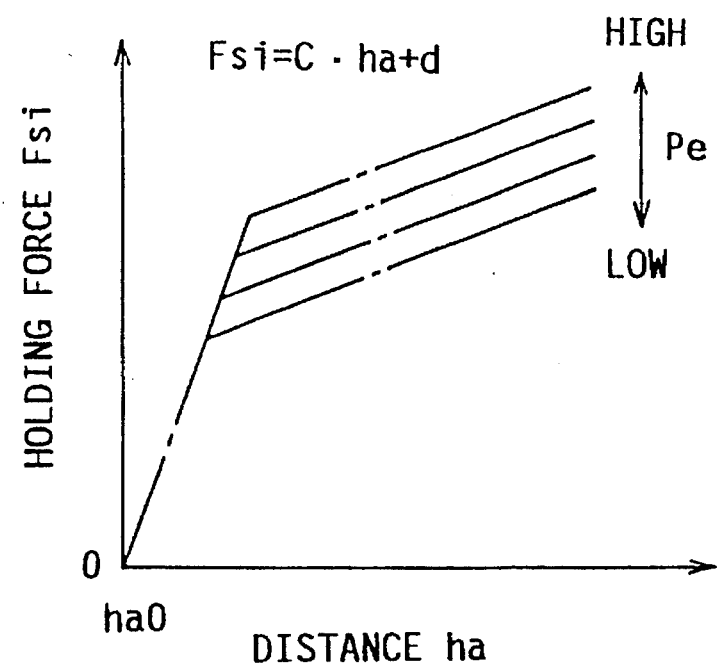
FIG. 20 is graph indicating a relationship between the holding force Fsi and the distance ha on the press of FIG. 12.
Figure 22:
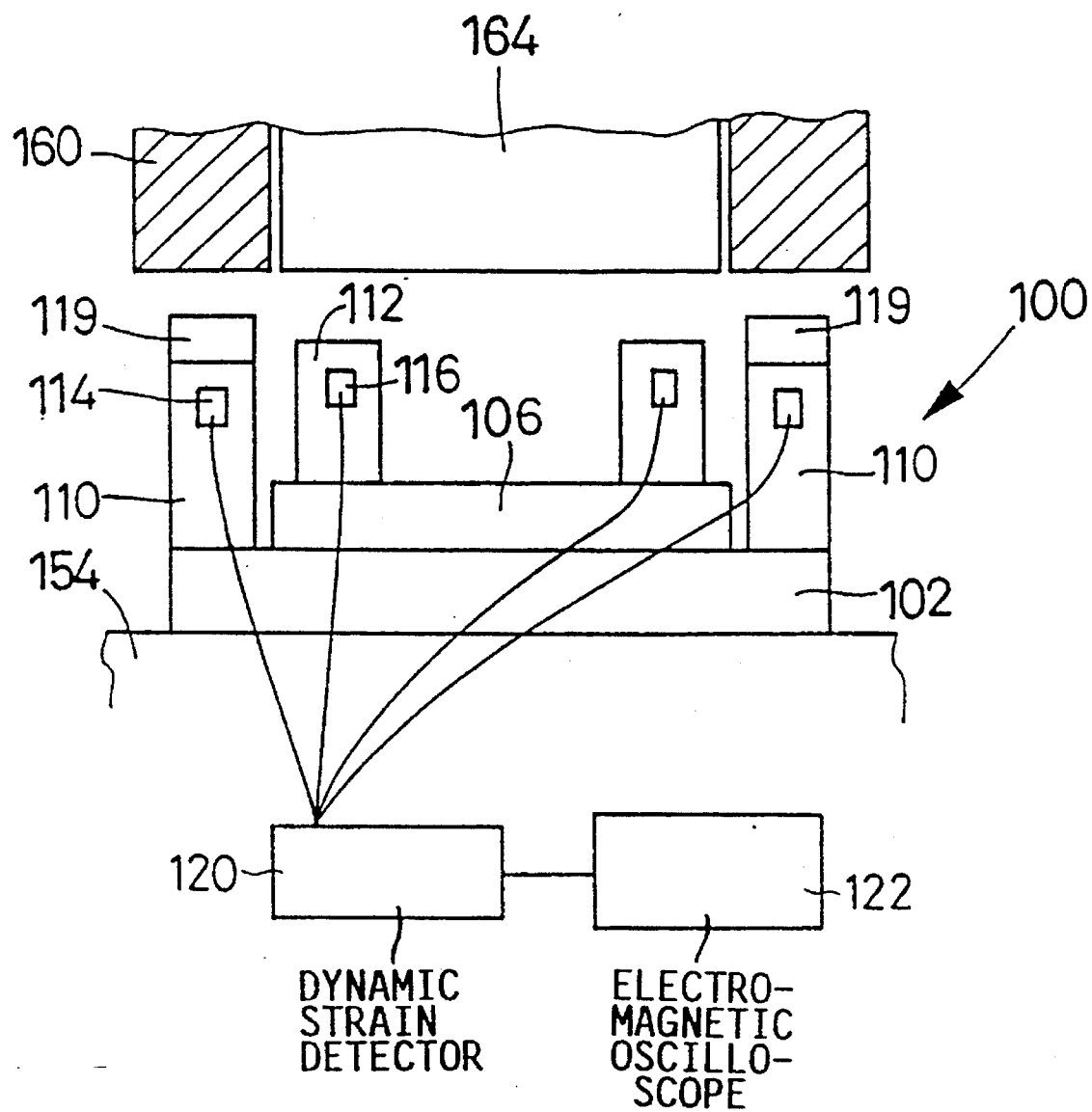
FIG. 22 is an elevational view in cross section 10 showing the measuring apparatus of FIG. 6 as incorporated in the double-action press of FIG. 12.

The provisional ha-Fsi relationship (i=1, 2, 3, 4) is a relationship (Fsi=c·ha+d) between the distance ha and the holding force Fsi when the outer plungers 166 have reached the lower stroke ends. This relationship is obtained from the load values Fsi detected by the strain gages 178 (when the plungers 166 have reached the lower stroke ends), with different values of the distance ha. Since the value Fsi differs depending upon the rigidity of the die set 152, 156, 162, suitable members having considerably higher rigidity than the die set are used for the measurement of the value Fsi. The obtained provisional ha-Fsi relationship reflects the rigidity of the press 150 (except for the die set). It is noted that the measurement is effected after the pneumatic pressure Pd of the pneumatic cylinders 216 is adjusted so that the lifting force produced by the cylinders 216 counterbalances the total weight of the outer slide 160 and the blank holder plate 158. Since the load value Fsi (holding force Fs) changes with the pneumatic pressure Pe, the Fsi-ha relationship is set in relation to the pneumatic pressure Pe, as indicated in the graph of FIG. 20. To obtain the ha-Fsi relationship, the maximum value ha0 of the distance ha when the load value Fsi is zero is used as a reference. The provisional ha-Fsi relationship is obtained for each of the four outer plungers 166 (four die-height adjusting mechanisms 172). The overall holding force Fs is a sum of the load values Fsi of the individual plungers 166. The provisional ha-Fsi relationship may be obtained from the load values Fsi measured by the load measuring apparatus 100 as shown in FIG. 22. In this case, spacer blocks 119 are placed on the sensing posts 110 of the positioning member 102, as shown in FIG. 22, and the load values Fsi upon abutting contact of the outer slide 160 with the spacer block 119 are detected by the strain gages 114 on the sensing posts 110.

The provisional hb-Fpi relationship (i=1, 2, 3, 4) is a relationship (Fpi=e·hb) between the distance hb and the pressing force Fpi when the inner plungers 168 have reached the lower stroke ends. This relationship is obtained in the same manner as the relationship h-Fpi (Fpi=a·h) in the first embodiment. That is, the load values Fpi are detected by the strain gages 246 when the plungers 168 have reached the lower stroke ends, with different values of the distance hb. Since the value Fpi differs depending upon the rigidity of the die set 152, 156, 162, suitable members having considerably higher rigidity than the die set are used for the measurement of the load value Fpi. The obtained provisional hb-Fpi relationship reflects the rigidity of the press 150. The measurement is effected after the pneumatic pressure Pf of the pneumatic cylinders 266 is adjusted so that the lifting force produced by the cylinders 266 counterbalances the weight of the inner slide 164. The provisional hb-Fpi relationship is obtained for each of the four inner plungers 168 (four die-height adjusting mechanisms 240). The overall pressing force Fs is a sum of the load values Fpi of the individual plungers 168. The provisional hb-Fpi relationship may be obtained from the load values Fpi measured by the strain gages 116 of the load measuring apparatus 100 as shown in FIG. 22.

There will next be described the individual items of the die set information.

The weight Wr of the pressure ring 156 and the weight Wq of the punch 162 are the values actually measured of the ring 156 and punch 162 as manufactured. The holding force Fsoi (i=1, 2, 3, 4) and the pressing force Fpoi (i=1, 2, 3, 4) are obtained by a try-and-error procedure, in which the optimum forces Fsoi and Fpoi suitable for performing a desired drawing operation are determined by test operations on a trial or test press on which the pressure ring 156, lower die 152 and punch 162 are installed. The holding force Fsoi and pressing force Fpoi do not include components due to the influences by the weights of the die set 156, 152, 162 and the sliding resistance values of the associated components. In the case where the trial press is similar to that shown in FIG. 12, for example, the pneumatic pressure Pd is adjusted so that the outer slide 160 is lowered by the outer plungers 166 while the total weight of the outer slide 160, blank holder plate 158 and pressure ring 156 is counterbalanced by the lifting force produced by the cylinders 216. The load values Fai are detected by the strain gages 178 during a trial drawing operation effected with the thus adjusted pneumatic pressure Pd. The load values Fsoi are obtained on the basis of the detected load values Fai. Further, the pneumatic pressure Pf is adjusted so that the inner slide 164 is lowered while the total weight of the inner slide 164 and the punch 162 is counterbalanced by the lifting force produced by the pneumatic cylinders 266. The load values Fbi are detected by the strain gages 246 during a trial drawing operation effected with the thus adjusted pneumatic pressure Pf. The load values Fpoi are obtained on the basis of the detected load values Fbi. Thus, the four load values Fsoi associated with the four outer plungers 166, and the four load values Fpoi associated with the four inner plungers 168 are obtained. The total holding force Fso is a sum of the four load values Fsoi, while the total pressing force Fpo is a sum of the four load values Fpoi.

Figure 16:
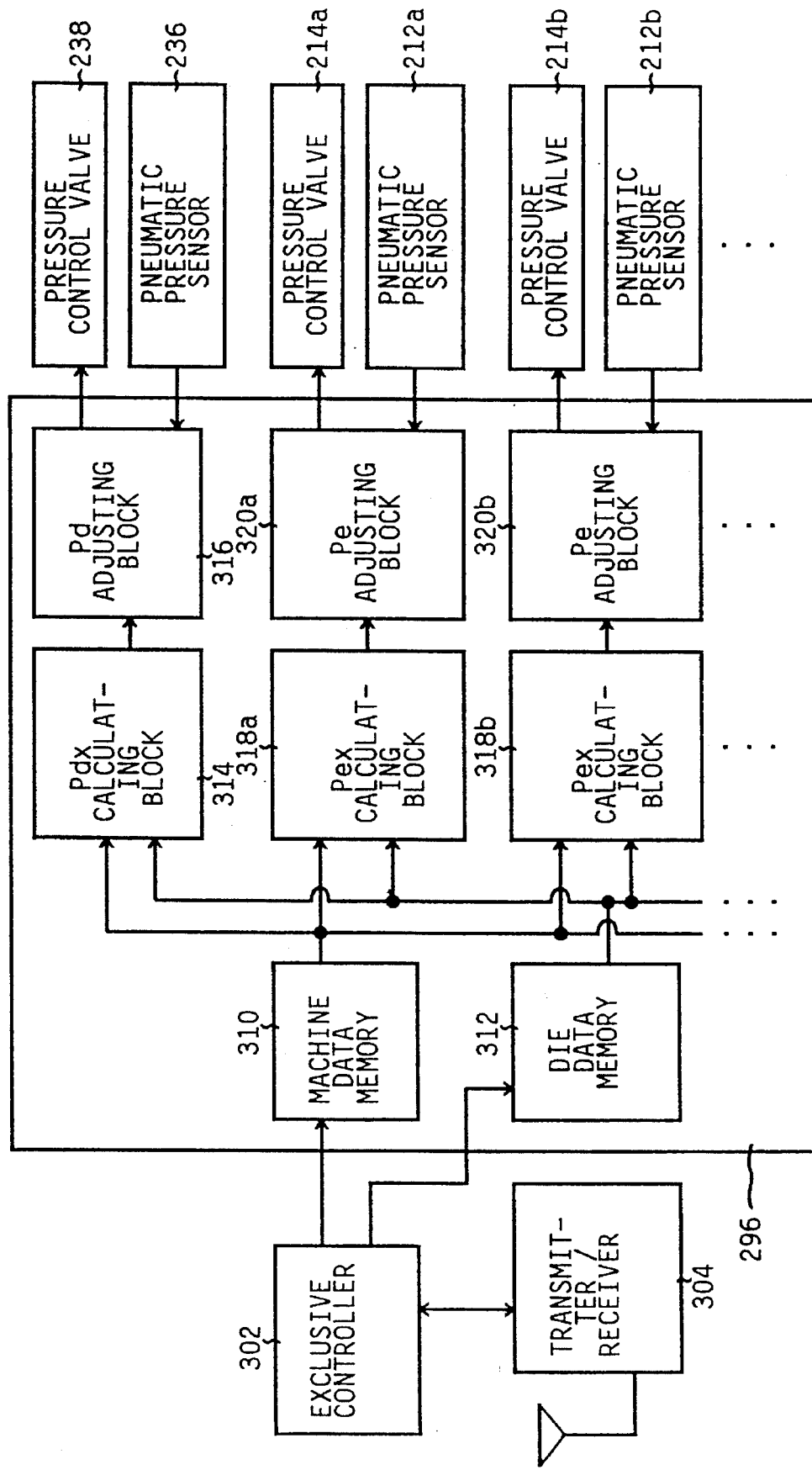
FIG. 16 is a block diagram for explaining the functions of a controller of the control system of FIG. 15A.

Referring back to FIG. 15A, the controller 296 is adapted to achieve various functions as illustrated in the block diagram of FIG. 16, according to the control programs stored in its ROM. The controller 296 includes a machine data memory 310 for storing the machine information entered and stored in the exclusive controller 302. The controller 296 further includes a die data memory 312 for storing the die set information received from the ID card 306, through the transmitter/receiver 304. The ID card 306 is attached to the lower die 152 installed on the press 150.

The block diagram of FIG. 16 shows various functional blocks which correspond to respective means for performing the corresponding functions. A Pdx calculating block 314 is for calculating an optimum pneumatic pressure Pdx for producing the lifting force which counterbalances the total weight of the outer slide 160, blank holder plate 158 and pressure ring 156. This calculation is effected according to the following equation (5), on the basis of the machine information stored in the machine data memory 310 and the die set information stored in the die data memory 312.

$$Pdx=(Wr+Wos)/Ad \qquad (5)$$

A Pd adjusting block 316 is for controlling the solenoid-operated pressure control valve 238 so that the pneumatic pressure Pd in the air tank 218 detected by the pneumatic pressure sensor 236 coincides with the optimum pneumatic pressure Pdx calculated by the Pdx calculating block 314. With the pneumatic pressure Pd thus adjusted, the holding force Fsoi specified by the die information is applied to the pressure ring 156. The pneumatic pressure Pdx may be calculated, with suitable compensation for a change in the volume of the pressure chamber of the pneumatic four cylinders 216 due to a downward movement of the outer slide 160. In this respect, however, since the capacity of the air tank 218 is sufficiently large, the amount of change in the pneumatic pressure Pd due to the change in the volume of the pressure chamber of the cylinders 216 is so small and negligible. Thus, the block 314 corresponds to means for calculating the optimum pneumatic pressure Pdx, while the block 316 cooperates with the pressure control valve 238 and the pressure sensor 236, to constitute means for adjusting the pneumatic pressure Pd as one of the operating conditions of the press 150.

APex calculating block 318a is for calculating an optimum pneumatic pressure Pex for producing the holding force Fsoi, according to the following equation (6), on the basis of the machine information in the machine data memory 310 and the die set information in the die data memory 312.

$$Fsoi=(Ax \cdot Az/Ay) \{(Pex+Pt)[Ve/(Ve-Az \cdot Y)]-Pt\} \qquad (6)$$

where, Pt: atmospheric pressure

A Pe adjusting block 320a is for controlling the pressure control valve 214a so that the pneumatic pressure Pe in the air tank 190 detected by the pressure sensor 212a coincides with the optimum pneumatic pressure Pex calculated by the Pex calculating block 318a. The optimum pneumatic pressure Pex is calculated for all of the four air tanks 190 on the basis of the stored machine and die set information, and the pressure control valves 214b–214d are similarly controlled to adjust the pneumatic pressures Pe in the other three air tanks 190, which are detected by the corresponding pressure sensors 212b–212d. To this end, Pex calculating blocks 318b–318d and Pe adjusting blocks 320b–320d are provided in the controller 296. In FIG. 16, the blocks 318a, 318b and 320a, 320b are indicated by way of example. The pneumatic pressures Pe in the four air tanks 190 thus adjusted assure the optimum holding forces Fsoi at the positions of the individual four outer plungers 166, as specified by the die set information, irrespective of the difference in the pressure-receiving areas of the four cylinders 180, 184. The blocks 318a–318d correspond to means for calculating the optimum pneumatic pressures Pex of the four cylinders 184, and the blocks 320a–320d cooperate with the pressure control valves 214a–214d and the pressure sensors 212a–212d to provide means for adjusting the pneumatic pressures Pe as one of the operating conditions of the press 150.

Figure 17:
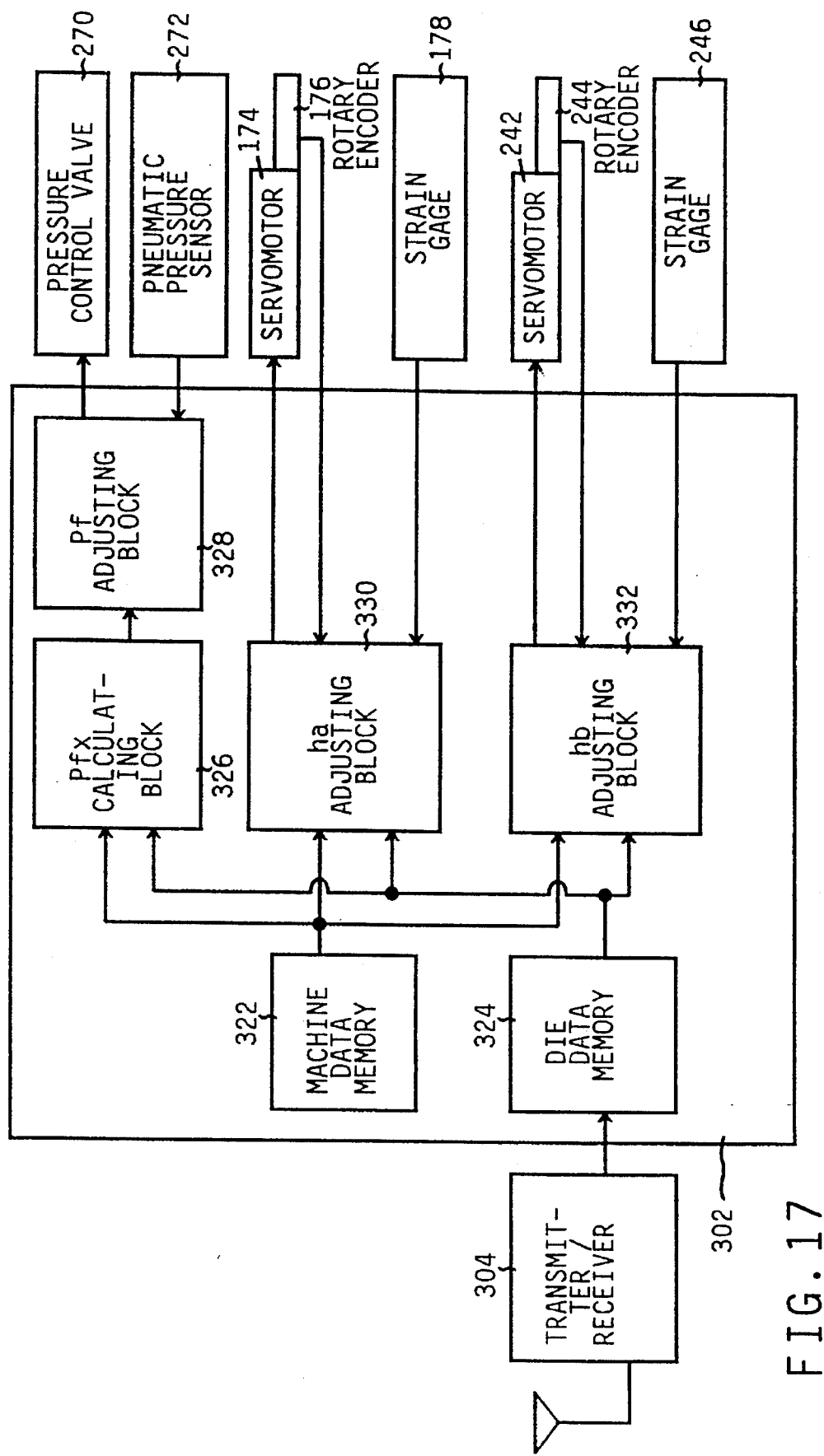
FIG. 17 is a block diagram for explaining the functions of an exclusive controller of the control system of FIG. 15B.

The exclusive controller 302 is adapted to achieve various functions as illustrated in the block diagram of FIG. 17, according to the control programs stored in its ROM. The controller 302 includes a machine data memory 322 for storing the machine information entered through a keyboard, for example, and a die data memory 324 for storing the die set information received from the ID card 306 through the transmitter/receiver 304, when the lower die 152 is installed on the press 150.

The block diagram oft FIG. 17 shows various functional blocks which correspond to respective means for performing the corresponding functions. A Pfx calculating block 326 is for calculating an optimum pneumatic pressure Pfx for producing the lifting force which counterbalances the total weight of the inner slide 164 and the punch 162. This calculation is effected according to the following equation (7), on the basis of the machine information stored in the machine data memory 322 and the die set information stored in the die data memory 324.

$$Pfx=(Wq+Wis)/Af \qquad (7)$$

A Pf adjusting block 328 is for controlling the solenoid-operated pressure control valve 270 so that the pneumatic pressure Pf in the air tank 268 detected by the pneumatic pressure sensor 272 coincides with the optimum pneumatic pressure Pfx calculated by the Pfx calculating block 326. With the pneumatic pressure Pf thus adjusted, the pressing force Fpoi as specified by the die information is applied to the blank 171, without an influence of the weights of the inner slide 164 and the punch 162. The pneumatic pressure Pfx may be calculated, with suitable compensation for a change in the volume of the pressure chamber of the pneumatic cylinders 266 due to a downward movement of the inner slide 164. In this respect, however, since the capacity of the air tank 268 is sufficiently large, the amount of change in the pneumatic pressure Pf due to the change in the volume of the pressure chamber of the cylinders 266 is so small and negligible. It will be understood that the block 326 corresponds to means for calculating the optimum pneumatic pressure Pfx, while the block 328 cooperates with the pressure control valve 270 and the pressure sensor 272, to constitute means for adjusting the pneumatic pressure Pf as one of the operating conditions of the press 150.

Figure 21:
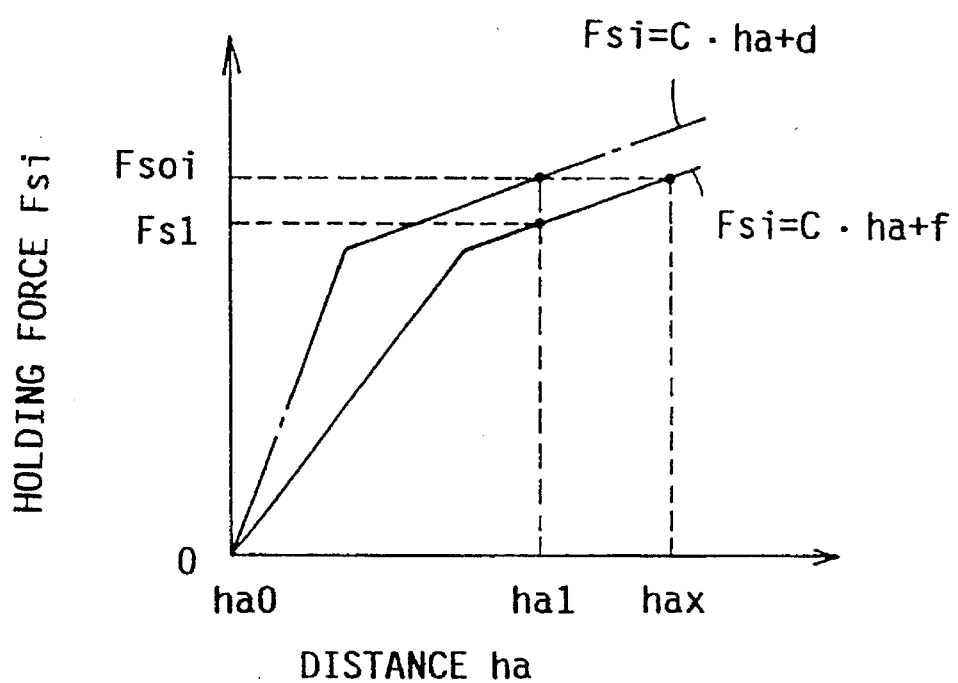
FIG. 21 is a graph for explaining a manner of determining the distance hax on the basis of the relationship of FIG. 20.

An ha adjusting block 330 is for adjusting the distances ha associated with the four die-height adjusting mechanisms 172, independently of each other, so as to provide the holding force values Fsoi, on the basis of the machine information and die set information stored in the memories 322, 324. Initially, a reference value ha0 which is a maximum value of the distance ha when the holding force Fsi is zero is determined on the basis of the load value Fai detected by the strain gages 178. Then, the provisional ha-Fsi relationship (Fsi=c·ha+d) (as shown in the graph of FIG. 20) which corresponds to the optimum pneumatic pressure Pex calculated by the appropriate one of the calculating blocks 319a–318d is selected and read out from the machine data memory 322. On the basis of the selected provisional ha-Fsi relationship, a distance ha1 for obtaining the holding force value Fsoi is obtained as indicated in the graph of FIG. 21, and the distance ha is adjusted to the obtained value ha1, with respect to the reference value ha0, by operating the servomotor 174. In this condition, a test operation is conducted on the press 150, with the outer slide 160 moved between their stroke ends. The holding force value Fs1 is measured on the basis of the load value Fai represented by the output signals of the strain gages 178 when the outer slide 160 is at its lower stroke end. Since the predetermined provisional ha-Fsi relationship is based on higher rigidity of the die set than the rigidity of the actually used die set 152, 156, 162, the holding force value Fs1 is generally smaller than the holding force value Foi. Based on a difference between the values Fs1 and Fsoi, a final ha-Fsi relationship (Fsi=c·ha +f) is obtained as also indicated in the graph of FIG. 21. Then the optimum distance hax for obtaining the holding force value Fsoi is determined by the obtained final ha-Fsi relationship. The servomotor 174 is operated to adjust the distance ha to the distance hax. The determination of the distance hax and the adjustment of the distance ha to hax are effected for each of the four die-height adjusting mechanisms 172, in the same manner as described above. The adjustment of the distances ha according to the functional block 330 assures the holding force values Fsoi as specified by the die set information, irrespective of a variation in the rigidity of the press 150 from one machine to another. The block 330 corresponds to means for calculating the optimum distance hax, and cooperates with the servomotor 174 and the strain gages 178 to provide means for adjusting the distances ha as one of the operating conditions of the press 150.

An hb adjusting block 332 is for adjusting the distances hb associated with the four die-height adjusting mechanisms 240, independently of each other, so as to provide the pressing force values Fpoi, on the basis of the machine information and die set information stored in the memories 322, 324, in a manner similar to that used to adjust the distances ha described above. The block 332 corresponds to means for calculating the optimum distances hax, and cooperates with the servomotor 242 and the strain gages 246 to provide means for adjusting the distances hb as one of the operating conditions of the press 150.

The exclusive controller 302 also functions to adjust the pneumatic pressure Pg of each cylinder 252, in the same manner as used for the pneumatic pressure Pc, so that the load values Fbi detected by the strain gages 246 do not exceed the respective upper limit values Foli (i=1, 2, 3, 4). Since the pneumatic pressure Pg can be adjusted irrespective of the die set used, it may be manually adjusted by the operator of the machine 150.

It will be understood from the above explanation of the second embodiment of the invention, that the press 150 is capable of automatically calculating optimum values of the operating conditions of the press, such as the optimum pneumatic pressures Pdx, Pex, Pfx, and optimum distances hax, hbx, so as to establish the optimum holding pressure Fsoi and optimum pressing force Fpoi as determined in a trial or test operation on a test machine, irrespective of variations or differences in,the rigidity and sliding resistances of the press from one machine to another. The automatic calculation of the optimum operating parameters is effected by the controllers 296, 302, according to the machine information stored in the machine data memories 310, 322 and the die set information stored in the die data memories 312, 324 (received from the ID card 306 via the transmitter/receiver 304). The controllers 296, 302 are further adapted to automatically adjust the operating conditions such as the pneumatic pressures Pd, Pe, Pf and distances ha, hb to the calculated optimum values Pdx, Pex, Pfx, and hax, hbx. Thus, the press 150 eliminates or minimizes the conventional cumbersome manual adjustment of the operating conditions of the press by the trial-and-error procedure, and reduces the operator's work load upon setting up the press, while assuring high stability in the quality of formed products obtained.

In the present second embodiment, the pneumatic pressure sensors $212a$–$212d$, 236 and the pressure control valves $214a$–$214d$, 238 necessary for automatic adjustment of the pneumatic pressures Pd and Pe are provided on the control console 202, which is easily movable to the location of the desired one of the pressing machines 150 of the same type as shown in FIG. 12. Therefore, the automatic adjustment of the pressures Pd, Pe according to the present invention may be accomplished even if the machine in question is not equipped with such pressure sensors and control valves. The control console 202 may be carried to a desired factory to demonstrate its functions and the advantages of the automatic adjustment of the pressure Pd, Pe for improved quality of formed articles produced by the adjusted press. The control console 202 is also convenient where a certain pressing operation is effected on selected ones of the machines in a pressing line. Further, the control console 202 permits manual adjustment of the holding force values Fsi and the counterbalancing force values at the positions of the four adjusting mechanisms 172, 240, and provides analog indication of the pressures Pd, Pe on the pressure gages 290, which is helpful in diagnosing the press 150.

As described above with respect to the first embodiment, it is not absolutely necessary to adjust the operating conditions Pd, Pe, Pf, ha and hb exactly to the optimum values Pdx, Pex, Pfx, hax and hbx as calculated by the controllers 296, 302. That is, certain ranges of tolerances may be provided for those operating conditions, provided the tolerance ranges satisfy appropriate requirements in terms of the quality of the products produced.

While the operating parameters Pd, Pe, Pf, ha and hb are automatically controlled under the control of the controllers 296, 302 according to the second embodiment, suitable mode selector switches may be provided on the controller 296 and/or the controller 302, so that those parameters are automatically adjusted when the appropriate selectors switches are set in the automatic mode position, and may be manually adjusted when the switches are set in the manual mode position.

In the second embodiment, only the pressure sensors $212a$–$212d$ and 236 and the pressure control valves $214a$–$214d$ and 238 for the pressures Pd and Pe are provided on the stand-alone control console 202 separate from the press 150, the pressure sensor 272 and the pressure control valve 270 for the pressure Pf may also be provided on the control console 202. Conversely, the sensors $212a$–$212d$, 236, and valves $214a$–$214d$, 238 may be provided on the press 150.

Referring to FIGS. 23–28, there will be described a third embodiment of this invention.

Figure 23A:
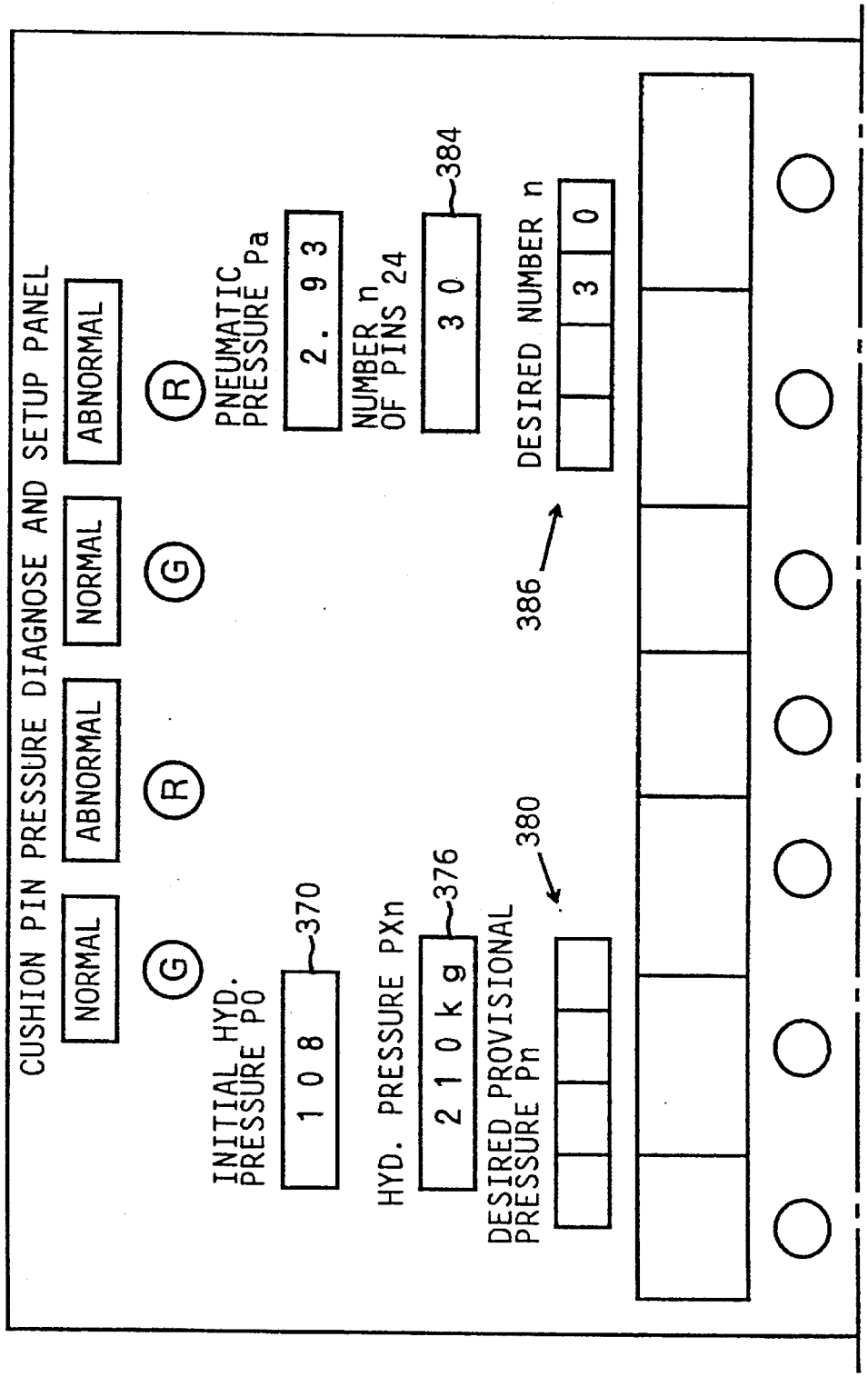

The third embodiment is identical with the first embodiment of FIGS. 1–11, except for the functions of the controller 90, and the use of an operator's control panel 368 as shown in FIGS. 23A and 23B. The control panel 368 is connected to the controller 90 for interactive communication therebetween, to perform various functions such as the adjustment of the hydraulic pressure Ps of the cushioning device 51. In the present embodiment, the controller 90 is adapted to receive, from the press 10, a TEST RUN signal indicating that a TEST RUN switch for performing a test operation on the press 10 is in the ON position, and a LOWER END signal indicating that the main slide 20 is at the lower stroke end or at a position slightly above the lower stroke end. In the present embodiment, the press operation data memory 128 of the ID card 96 stores data indicative of the optimum initial values of the hydraulic pressure Ps*, together with data indicative of the serial numbers of different machines of the press 10. The adjustment of the hydraulic pressure Ps is effected according to a control routine as illustrated in the flow chart of FIG. 24, which is stored in the ROM of the controller 90.

Figure 24:
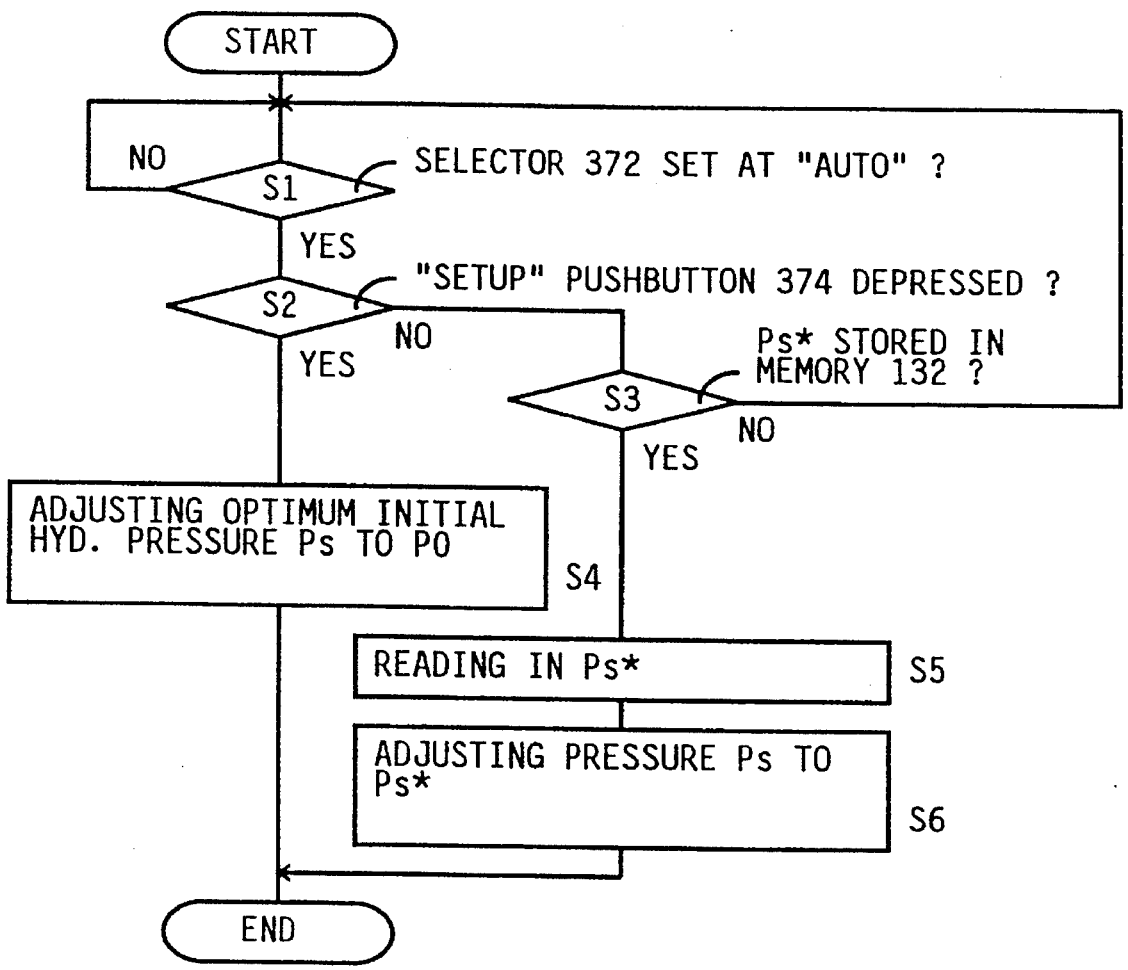
FIG. 24 is a flow chart illustrating an operation to adjust the hydraulic pressure Ps on the press equipped with the operator's control panel of FIGS. 23A and 23B.

The control routine of FIG. 24 is started with step S1 to determine whether a selector switch 372 on the operator's control panel 368 is set in AUTO position for automatic adjustment of the hydraulic pressure Ps, or not. If the selector switch 372 is placed in the AUTO position, step S2 is implemented to determine whether a SETUP pushbutton 374 on the panel 368 has been depressed, or not. If the pushbutton 374 has not been depressed, step S3 is implemented to determine whether data indicative of the optimum initial hydraulic pressure Ps* are stored in the die data memory 132, or not. If the data indicative of the optimum initial hydraulic pressure Ps* are stored in the memory 132, step S3 is followed by step S5 which will be described. If the data are not stored in the memory 132, that is, the die set 12, 18, 30 is used for the first time on the press 10 in question, the control flow goes back to step S1. Steps S1–S3 are repeatedly implemented until the SETUP pushbutton 374 is depressed.

Figure 25A:
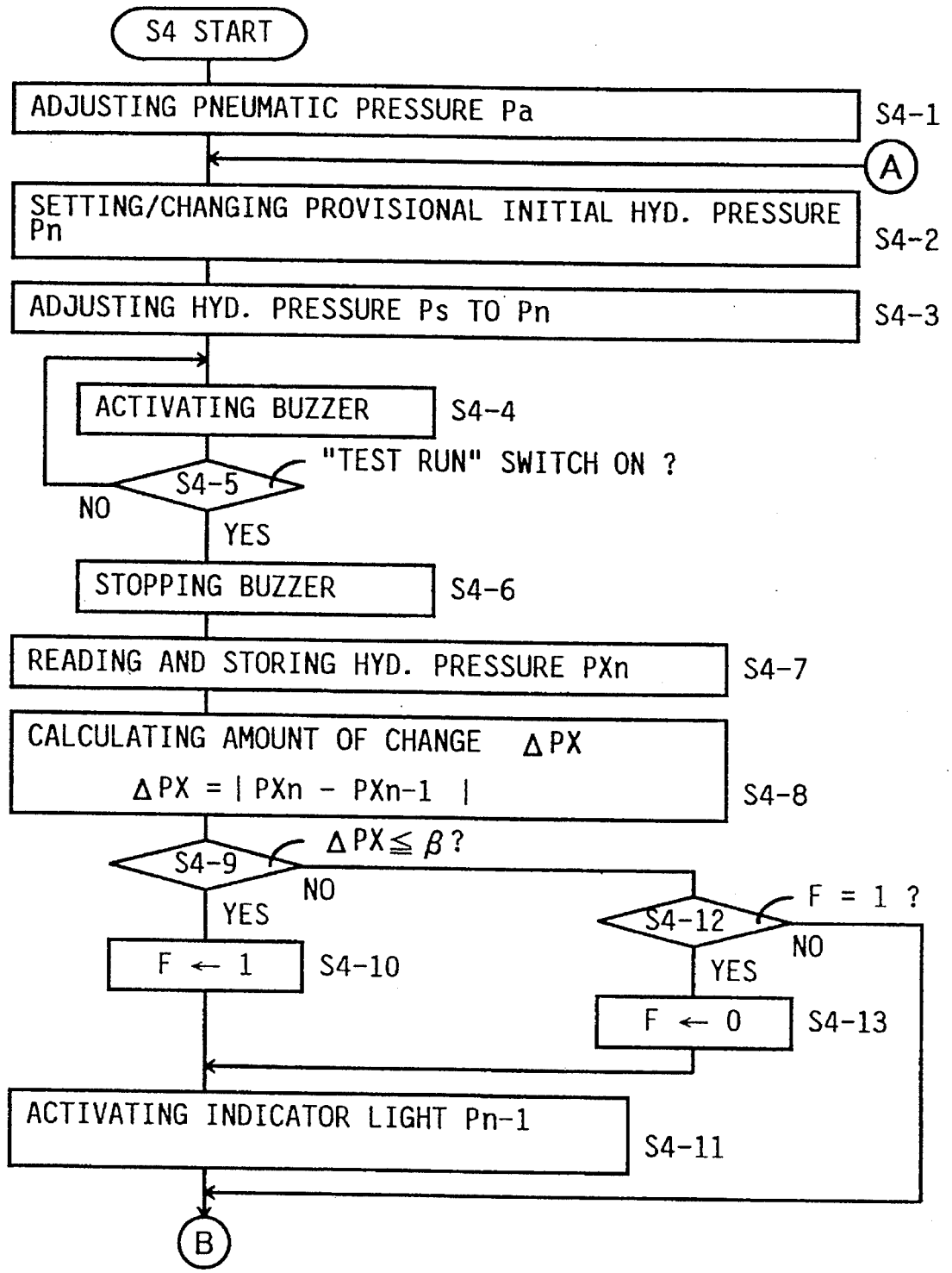
FIGS. 25A and 25B are flow charts illustrating an operation performed in step S4 of the flow chart of FIG. 24.
Figure 25B:
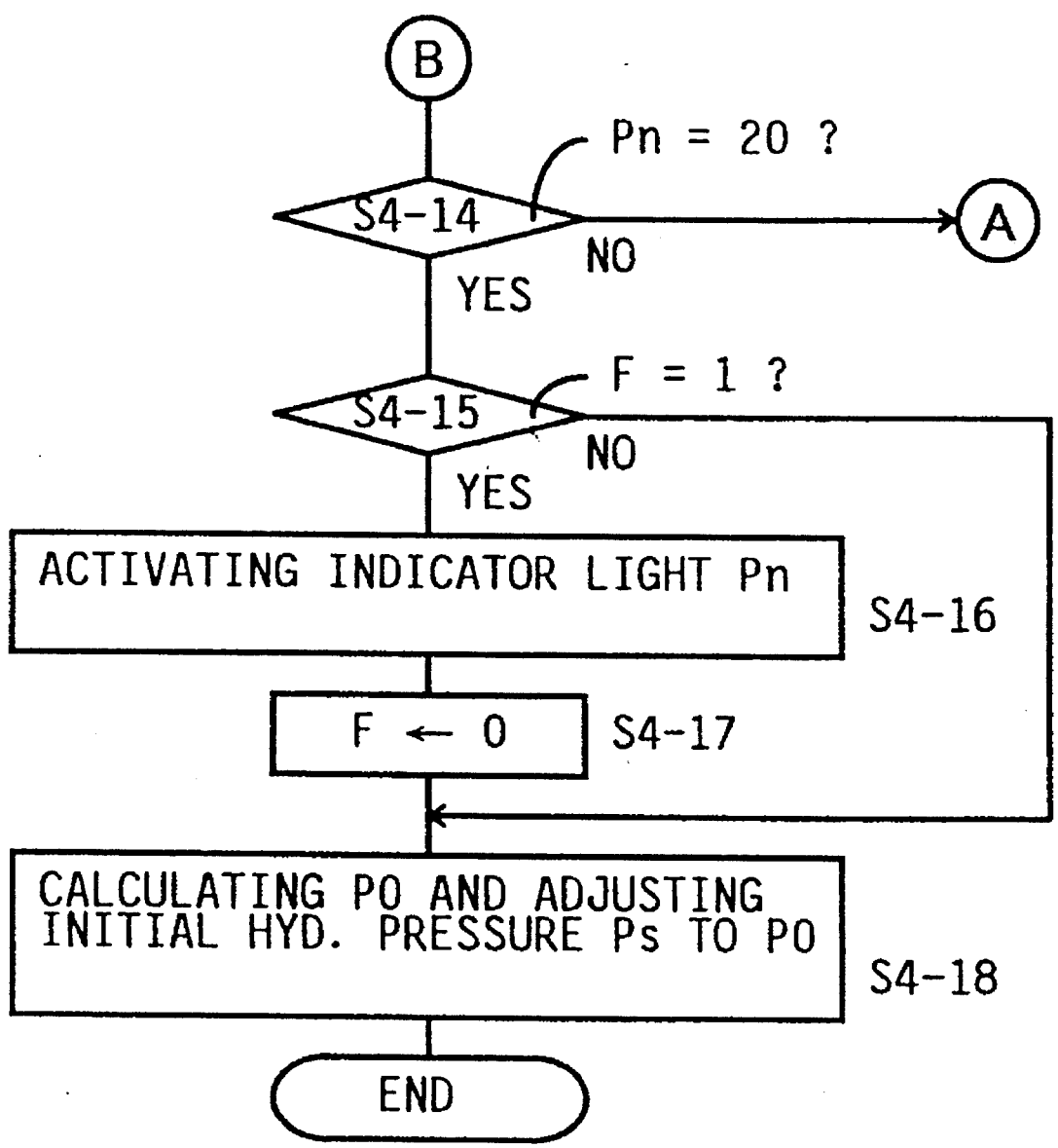

When the pushbutton 374 is depressed, an affirmative decision (YES) is obtained in step S2, and the control flow goes to step S4 to adjust the initial hydraulic pressure Ps, namely, to establish the optimum initial hydraulic pressure P0, according to a control routine as illustrated in the flow chart of FIGS. 25A and 25B. Initially step S4-1 is implemented to adjust the pneumatic pressure Pa so as to obtain the optimum holding force Fso. This adjustment is made because the pneumatic pressure Pa influences the optimum initial hydraulic pressure Ps that assures uniform or even distribution of the holding force Fso on the pressure ring 30. That is, the adjustment of the pneumatic pressure Pa so as to obtain the optimum holding force Fso is a prerequisite for adjusting the hydraulic pressure Ps prior to a pressing operation. Although the pneumatic pressure Pa may be adjusted to the optimum value Pax according to the above equation (1), the pneumatic pressure Pa may be adjusted so that the holding pressure Fs detected by the strain gages 61 when the press 10 is operated substantially coincides with the optimum holding pressure Fso as specified by the die set information. To this end, the pneumatic pressure Pa is changed until the detected holding force Fs substantially coincides with the specified optimum holding pressure Fso.

Step S4-1 is followed by step S4-2 in which provisional initial hydraulic pressure Pn (n=1 through 10) is set or changed. In the first execution of the routine of FIGS. 25A and 25B, the provisional value P1 is set at 200 kgf/cm² in the RAM of the controller 90. As the routine of FIGS. 25A and 25B is repeated, the provisional value Pn is lowered in decrements of 20 kgf/cm², down to 20 kgf/cm² which corresponds to P10. It is noted that 1 kgf/cm² is equal to about $9.8 \times 10^4$ Pa (Pascal).

Figure 26:
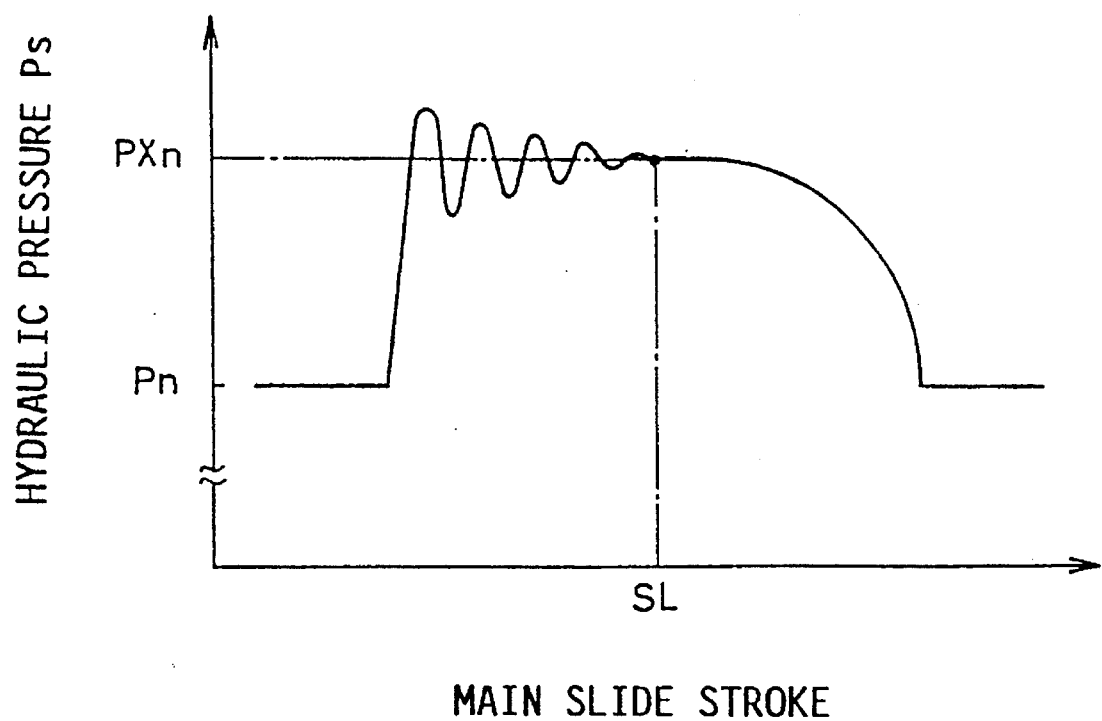
FIG. 26 is a graph for explaining the position the main slide of the press at which the generated hydraulic pressure PXn read in step S4–7 of the flow chart of FIG. 25 is detected.

Step S4-2 is followed by step S4-3 in which the pump 34 and the pressure control valve 36 are operated so that the initial hydraulic pressure Ps prior to a pressing operation is adjusted to the currently set provisional value Pn (e.g., 200 kgf/cm² in the first cycle of execution of the routine of FIGS. 25A and 25B). When the actual hydraulic pressure Ps detected by the pressure sensor 38 becomes substantially equal to the provisional value Pn, step S4-4 is implemented to activate an appropriate buzzer, which indicates that the pressure Ps has been adjusted to the currently selected provisional value Pn. Step S4-4 is followed by step S4-5 to determine whether the TEST RUN switch for initiating a test operation on the press 10 is turned ON or not. When the TEST RUN switch is turned ON by the operator who has recognized the activation of the buzzer RUN switch, step S4-6 is implemented to turn off the buzzer, and the control flow goes to step S4-7 in which the press 10 is operated to perform a test operation with a reciprocation of the main slide 20, and the hydraulic pressure Ps at this time is stored as pressure PXn in the RAM and indicated on the indicator 376 on the panel 368. The pressure Ps during the pressing operation vibrates as shown in the graph of FIG. 26. The pressure Ps stored as the pressure PXn is a pressure when the vibration has settled, that is, a pressure detected by the sensor 38 when the LOWER END signal indicative of the lower stroke end of the main slide 20 is received by the controller 90. Thus, the pressure PXn is the pressure Ps when the main slide 20 has been lowered to its lower stroke end SL (FIG. 26), or a position slight above the lower stroke end SL. However, the pressure PXn may be the maximum, minimum or average pressure detected during a downward movement of the main slide 20 to its lower stroke end SL. The hydraulic pressure Ps is always displayed on an indicator 370 on the operators control panel 368, irrespective of whether the press 10 is in a pressing operation or not.

Then, step S4-8 is implemented to calculate an amount of change $\Delta PX = |PXn - PXn-1|$ of the currently obtained pressure PXn with respect to the preceding value PXn−1. Step S4-8 is followed by step S4-9 to determine whether the amount of change $\Delta PX$ is equal to or smaller than a predetermined value β, or not. The predetermined value β is for determining whether the pressure PXn remains substantially constant in spite of a change in the provisional initial hydraulic pressure Pn. This value β is determined depending upon the expected fluctuation and detecting error of the pressure PXn, and is usually in the neighborhood of 5 kgf/cm². If an affirmative decision (YES) is obtained in step S4-9, step S4-10 is implemented to set a flag F to "1", and step S4-11 is implemented to activate one of ten indicator lights 378 on the panel 368. More specifically, the ten indicator lights 378 correspond to the ten provisional values Pn set in step S4-2, and the light 378 corresponding to the preceding value Pn−1 is activated.

If the amount of change $\Delta PX$ is larger than the predetermined value β, step S4-9 is followed by step S4-12 to determine whether the flag F is equal to "1" or not. If an affirmative decision (YES) is obtained in step S4-12, step S4-13 is implemented to reset the flag F to "0", and step S4-11 is then implemented. The control flow goes to step S4-14 if a negative decision (NO) is obtained in step S4-12, or after step S4-11 has been implemented. Step S4-14 is provided to determine whether the currently set provisional value Pn is 20 kgf/cm² or not, that is, whether the pressures PXn corresponding to all the ten provisional values Pn have been detected and stored. If not, the control flow goes back to step S4-2. Steps S4-2S4-14 are repeatedly implemented with the provisional value Pn decremented down to 20 kgf/cm². In the first control cycle in which the provisional value Pn is 20 kgf/cm², steps S4-8 through S4-3 are skipped, and step S4-7 is followed by step S4-14.

Figure 27:
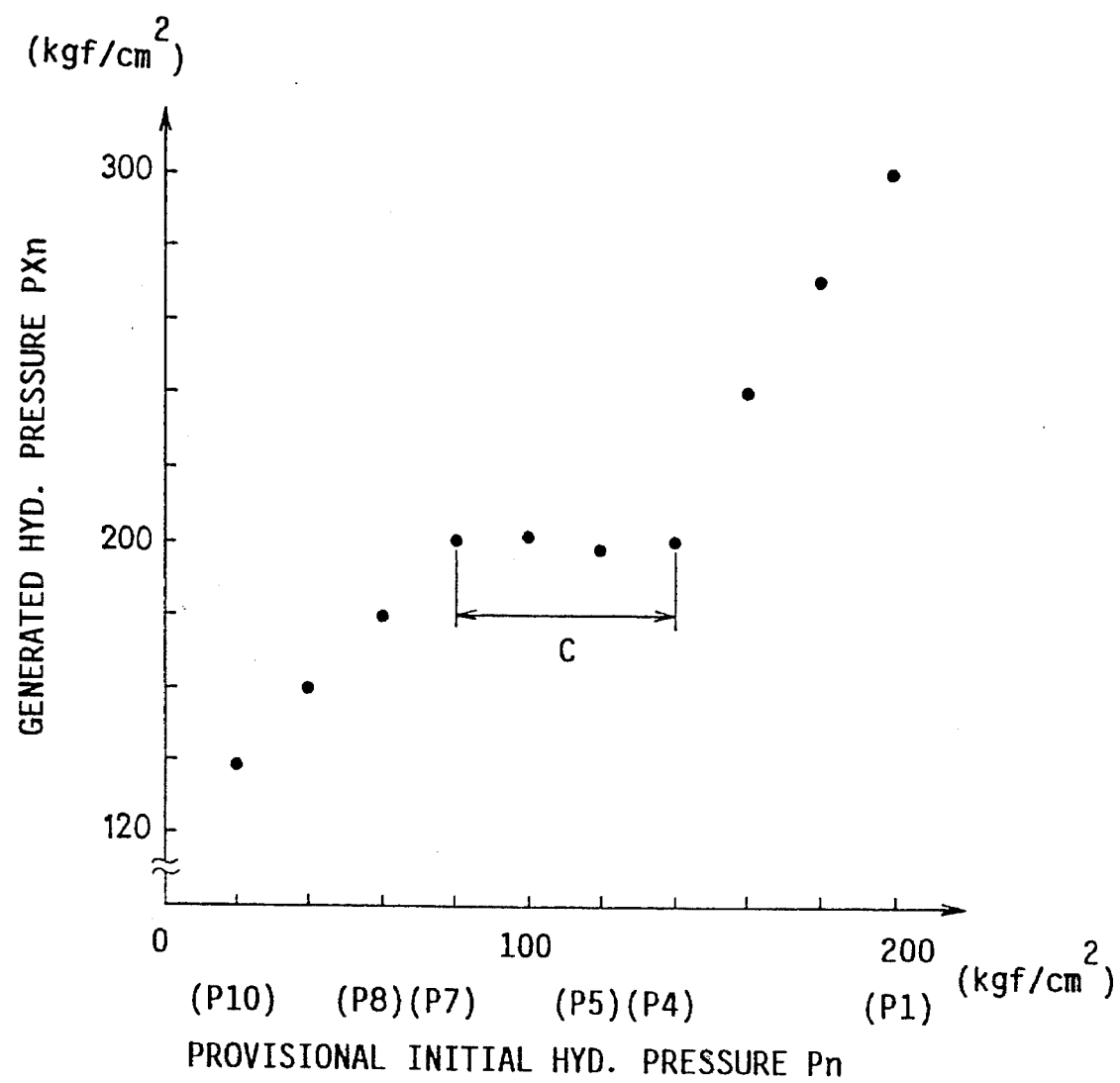
FIG. 27 is a graph indicating an example of the generated hydraulic pressure PXn detected for adjusting the optimum initial pressure P0 according to the flow charts of FIGS. 25A and 25B, in relation to, the provisional initial hydraulic pressure Pn.

The graph of FIG. 27 shows an example of the hydraulic pressure PXn obtained for the 10 provisional pressure values Pn (n=1 through 10), by repeated execution of steps S4-2 through S4-14 of FIGS. 25A and 25B. In this specific example, the pressure PX4 when the provisional value P4 is 140 kgf/cm² is 200 kgf/cm², and the pressure PX5 when the provisional value P5 is 120 kgf/cm² is 198 kgf/cm². Accordingly, the amount of change ΔPX=PX5–PX4 of the pressure PX5 with respect to the pressure PX4 is 2 kgf/cm², which is smaller than the predetermined value β of 5 kgf/cm², for example. Therefore, an affirmative decision (YES) is obtained in step S4-9, whereby the indicator light 378 corresponding to the provisional value P4 (140 kgf/cm²) is activated. Similarly, the affirmative decision (YES) is obtained in step S4-9 for the provisional values P6 (100 kgf/cm²) and P7 (80 kgf/cm²), and the indicator lights 378 corresponding to the provisional values P5 (120 kgf/cm²) and P6 (100 kgf/cm²) are activated. When the provisional value P8 is 60 kgf/cm², the amount of change ΔPX =|PX8–PX7| is larger than the predetermined value β, and a negative decision (NO) is obtained in step S4-9. Since the flag F has been set to "1", an affirmative decision (YES) is obtained in step S4-12, step S4-13 is implemented to reset the flag F to "0", and step S4-11 is implemented to activate the indicator light 378 corresponding to the preceding provisional value P7 (80 kgf/cm²). Hatched circles in the bottom row of the indicator lights 178 in FIG. 23B indicate the activated lights 178.

An optimum range of the initial pressure Ps indicated by the activated indicator lights 378 corresponds to a range C of FIG. 27 in which the amount of change ΔPX of the pressure PXn is smaller than the predetermined value β in spite of the change in the provisional initial pressure Pn. While the initial hydraulic pressure Ps of each hydraulic cylinder 32 is held within this optimum range, the pistons of the cylinders 32 connected to the respective cushion pins 24 are located between their upper and lower travel or stroke ends, without bottoming thereof, during a pressing operation with the main slide 20 lowered down to its lower stroke end. The range of the provisional initial pressure values Pn and the decrementing amount used in step S4-2 to detect the optimum range of the initial hydraulic pressure Ps are suitably determined for individual pressing operations effected with different holding forces and different numbers of the cushion pins 24, depending upon the number of the cylinders 32, pressure-receiving area and travel distance of the pistons of the cylinders 32, and optimum range of the holding force, so that the optimum range of the initial hydraulic pressure Ps can be detected for each specific pressing job.

An excessive variation in the length of the cushion pins 24 or in the travel distance of the pistons of the hydraulic cylinders 32 may cause bottoming of the pistons of some of the cylinders 32. In the event of such abnormality of the cushioning device 51, the optimum range of the initial hydraulic pressure Ps cannot be found out according to the routine of FIGS. 25A and 25B. In this case, the abnormality can be detected by the operating states of the indicator lights 378. For instance, none of the lights 378 are activated or none of the successive lights 378 are activated.

If the selector switch 372 is set to "MANUAL" position, the provisional initial hydraulic pressure Pn can be set as desired by using Pn setting dials 380 on the panel 368. In this manual adjustment, too, the hydraulic pressure PXn is indicated on the indicator 376, facilitating the manual adjustment of the initial hydraulic pressure Ps by changing the provisional value Pn by a desired incremental or decremental amount.

When the provisional value Pn is relatively low, the amount of change ΔPX in response to a change in the provisional value Pn may be small due to the introduction of air in the hydraulic cylinders 32. In this case, an affirmative decision (YES) may be obtained in step S4-9. To avoid this drawback, the control routine of FIGS. 25A and 25B may be modified so that the activation of the indicator lights 378 to indicate the optimum range of the initial hydraulic pressure Ps is controlled on the basis of the pressure PXn detected when the first affirmative decision (YES) is obtained in step S4-9, or so that step S4-9 is followed by step S4-15 and the following steps, when the negative decision (NO) is obtained in step S4-9 for the first time after the first affirmative decision (YES) in step S4-9.

When an affirmative decision (YES) is obtained in step S4-14, step S4-15 is implemented to determine whether the flag F is set at "1" or not. If so, step S4-16 is implemented to activate the indicator light 378 corresponding to the provisional value P10 (20 kgf/cm²). Then, the control flow goes to step S4-17 to reset the flag F to "0", and to step S4-18. If a negative decision (NO) is obtained in step S4-15, the control flow goes to step S4-18, skipping steps S4-16 and S4-17. Steps S4-15 through S4-17 are provided to activate the indicator light 378 corresponding to the provisional value P10, if the amount of change ΔPX of the pressure PX10 (with the provisional value P10 is 20 kgf/cm²) from the pressure PX9 (with the provisional value P9 is 40 kgf/cm²) is equal to or smaller than the predetermined value β.

Step S4-18 is provided to calculate an optimum hydraulic pressure P0, which is an average of the provisional values Pn whose indicator lights 378 are activated. In the specific example as shown in FIG. 23B, the optimum initial value P0 of the hydraulic pressure Ps is equal to 110 kgf/cm²=(80 kgf/cm²+100 kgf/cm²+120 kgf/cm²+140 kgf/cm²)/4. Then, the pump 34 and pressure control valve 36 are controlled so that the hydraulic pressure Ps prior to a pressing operation is adjusted to the calculated optimum initial value P0. As a result, the pressing operation can be achieved with even distribution of the optimum holding force on the pressure ring 30, with the pistons of all the cylinders 32 located between their upper and lower travel ends. As described below, the optimum initial value P0 thus calculated is used as data indicative of the optimum initial hydraulic pressure Ps* stored in the die data memory 132.

Referring back to the flow chart of FIG. 24, step S5 is implemented if the data indicative of the optimum initial hydraulic pressure Ps* are stored in the memory 132, that is, if the die set in question has ever been used on the present press 150. In step S5, the optimum initial hydraulic pressure Ps* is read from the die data memory 132. Then, step S6 is implemented to control the pump 34 and the pressure control valve 36 so that the hydraulic pressure Ps coincides with the optimum pressure Ps*.

Figure 28:
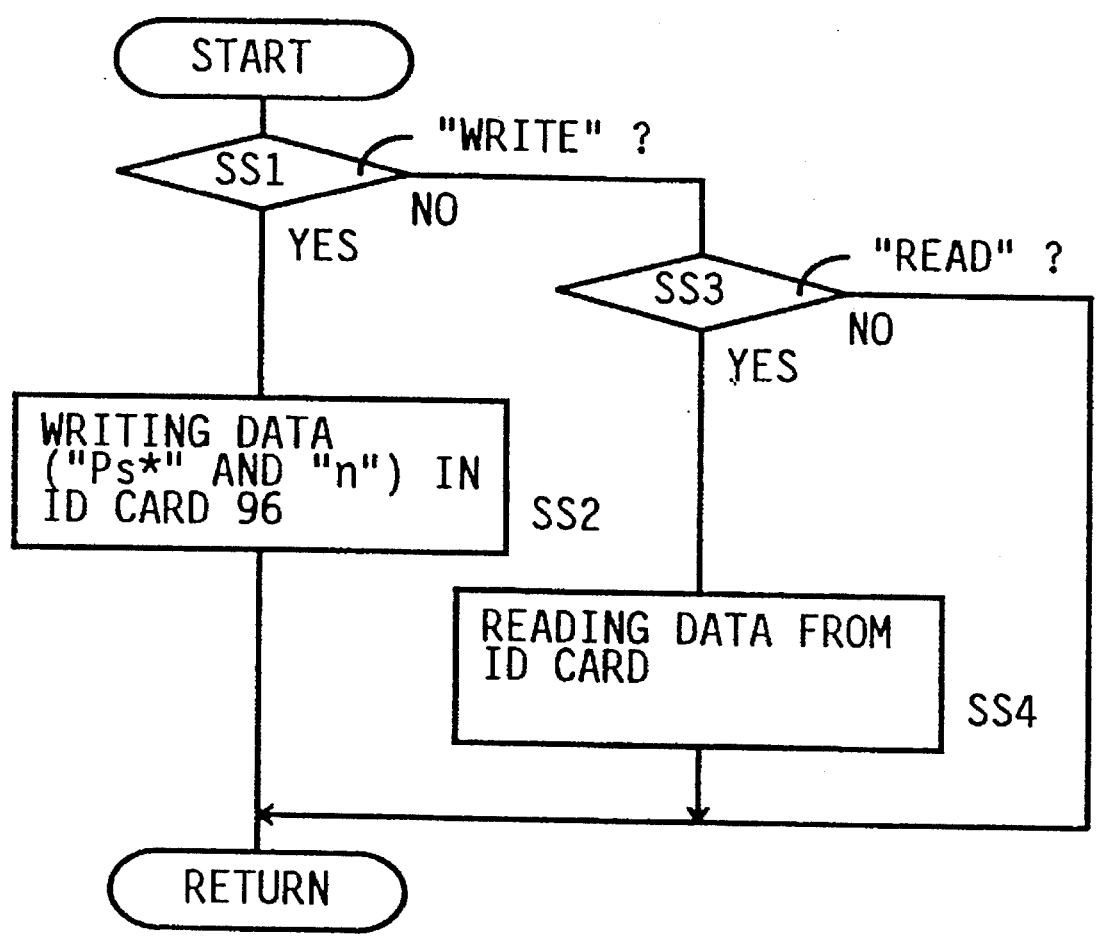
FIG. 28 is a flow chart illustrating an operation to write and read data on or from the ID card, using the display panel of FIGS. 23A and 23B.

As indicated in FIG. 23B, the operators control panel has a selector switch 382 for writing and reading data on and from the ID card 96, according to a control routine illustrated in the flow chart of FIG. 28. This routine is initiated with step SS1 to determine whether the selector switch 382 is set in WRITE position or not. When the switch 382 is placed in the WRITE position, step SS2 is implemented so that the data provided on the operator's control panel 368 are sent to the ID card 96 through the transmitter/receiver 94. The data sent to the ID card 96 include the optimum initial hydraulic pressure P0 as displayed on the indicator 370, and the number of the cushion pins 24 as manually entered through setting dials 386. The optimum initial hydraulic pressure P0 which is the pressure Ps prior to a pressing operation is stored as the optimum initial hydraulic pressure Ps* in the press operation data memory 128 of the ID card 96, together with the serial number of the press 10. When the number of the cushion pins 24 as manually entered through the setting dials 386 is different from that stored the die set data memory 125 of the ID card 96, the number stored in the memory 125 is updated to the actual number entered through the setting dials 386. In this respect, it is noted that the optimum initial hydraulic pressure P0 obtained according to the routine of FIGS. 25A and 25B differs with the number of the cushion pins 24 actually used on the press 10, and therefore the number n of the pins 24 stored in the ID card 96 must be updated to the actual number n. Since the number n stored in the ID card 96 is thus updated with the switch 382 set in the WRITE position, the number displayed on the indicator 184 is accordingly changed.

If a negative decision (NO) is obtained in step SS1, that is, if the switch 382 is not placed in the WRITE position, step SS3 is implemented to determine whether the switch 382 is placed in READ position or not. If so, the control flow goes to step SS4 to read out the data from the ID card 96 and transmit the data to the die data memory 132 of the controller 90 through the transmitter/receiver 94. As described above, the data stored in the ID card 96 include the number n of the cushion pins 24, and may include the optimum initial hydraulic pressure Ps* for the press 10 in question. The number n is displayed on the indicator 384 according to the data stored in the die data memory 132. If the optimum initial hydraulic pressure Ps* is transmitted to the memory 132, the hydraulic pressure Ps is adjusted to the optimum value Ps* in step S6 of the routine of FIG. 24.

In the present third embodiment, the optimum initial hydraulic pressure P0 is obtained according to the control routine of FIGS. 25A and 25B if the die set in question is used for the first time on the press 10 in question. The pressure P0 thus obtained is stored as the optimum initial hydraulic pressure Ps* in the ID card 96, so that the hydraulic pressure Ps of the hydraulic cylinders 32 is adjusted to the optimum value Ps* when the same die set is subsequently used on the same press 10. The utilization of the optimum pressure Ps* eliminates redundant execution of the routine of FIGS. 25A and 25B each time a pressing operation using the same die set is performed on the press 10, whereby the overall time required to establish the optimum initial hydraulic pressure Ps prior to a production run is considerably reduced, and the production efficiency of the press 10 is accordingly improved. In the present embodiment, the routine of FIGS. 25A and 25B requires the operator to activate the TEST RUN switch (step S4-5) to establish the optimum initial hydraulic pressure P0 (Ps*). Hence, the elimination of the routine of FIGS. 25A and 25B for the subsequent pressing job using the same die set on the press 10 significantly reduces the operator's load.

Although the control routine of FIGS. 25A and 25B is adapted such that the operator is required to depress the TEST RUN switch to perform a test operation to measure the pressure PXn for finding out the optimum initial hydraulic pressure P0 (Ps*), the press 10 may be automatically started to perform the test operation, if a safety fence is provided around the press 10 to safeguard the operator.

In the present third embodiment, step S4 of FIG. 24 (steps of the routine of FIGS. 25A and 25B) is a step for determining the optimum value Ps* and adjusting the initial hydraulic pressure Ps of the hydraulic cylinders 32 to the optimum value Ps* as one of the operating conditions of the press 10. Further, steps SS1 and SS2 correspond to a step for storing the optimum initial value Ps* of the hydraulic pressure Ps, and steps S5 and S6 of FIG. 24 correspond to a step of reproducing the stored optimum initial value Ps* on the press 10. It is also noted that a portion of the controller 90 assigned to implemented step S4 of FIG. 24 functions as adjusting means for adjusting the initial hydraulic pressure Ps to the determined optimum value Ps*, while a portion of the controller 90 assigned to implement steps S5 and S6 of FIG. 24 functions as reproducing means for establishing the optimum value Ps* on the press 10. Further, the transmitter/receiver 94, ID card 96 and selector switch 382 constitute means for receiving the optimum holding force Fso as die set information necessary to adjust the pneumatic pressure Pa of the pneumatic cylinder 42, which is necessary for the adjustment of the hydraulic pressure Ps. The press operation data memory 128 of the ID card 96 serves as memory means for storing the optimum initial value Ps* of the hydraulic pressure Ps.

While the first, third and fourth embodiments of FIGS. 1–11 and 23–38 utilize the stored die set information such as the optimum pressing and holding forces Fpo, Fso to determine the optimum values h*, Ps* of the operating conditions, these optimum values h* and Ps* need not be obtained on the basis of the stored die set information, but may be determined by a trial-and-error procedure, by observing the quality of the products obtained in test operations. In this case, too, storing the determined optimum values h* and Ps* in the ID card 96 for the subsequent use is effective to improve the production efficiency of the press.

Figure 29:
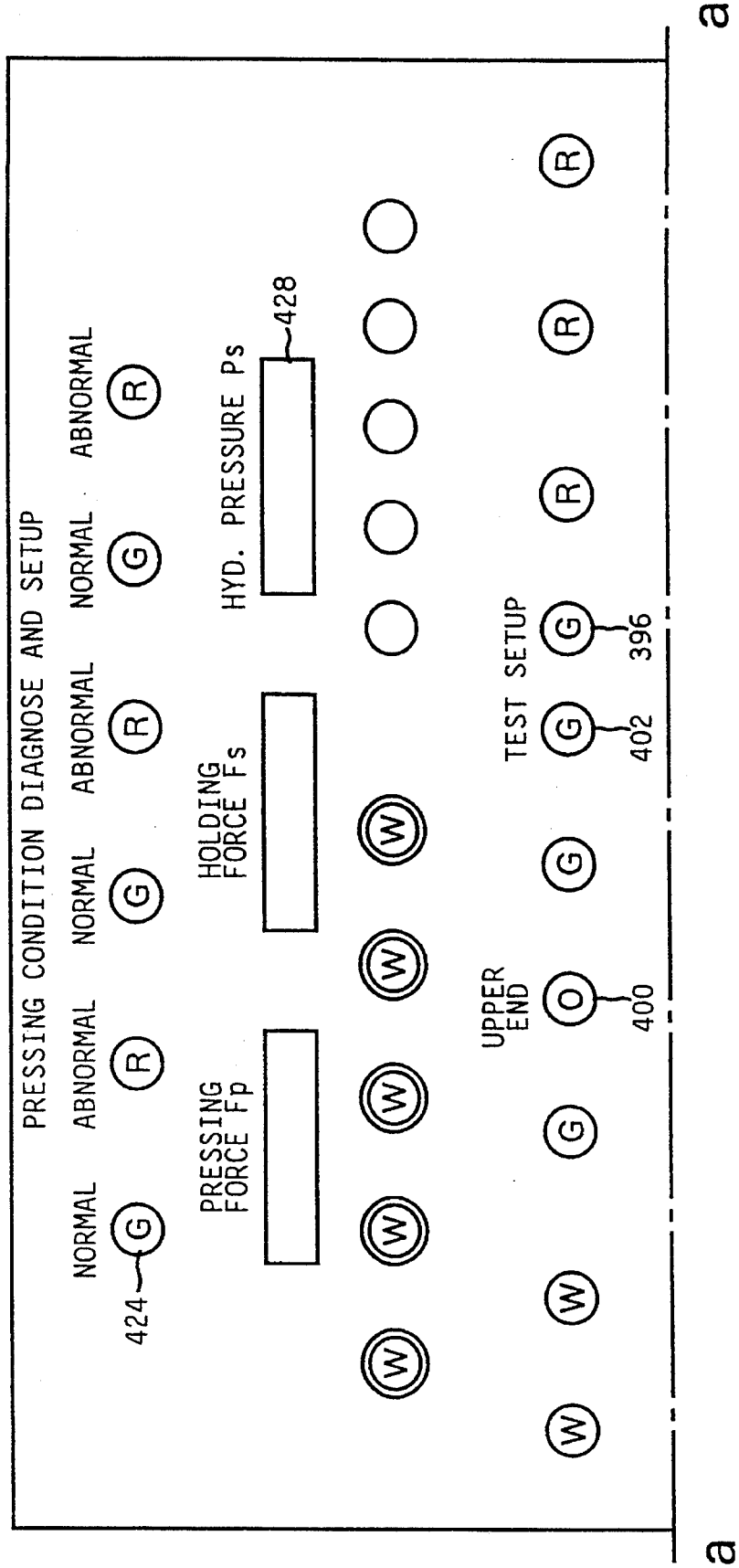
FIGS. 29–31 are views showing an operator's control panel used in a fourth embodiment of this invention.
Figure 30:
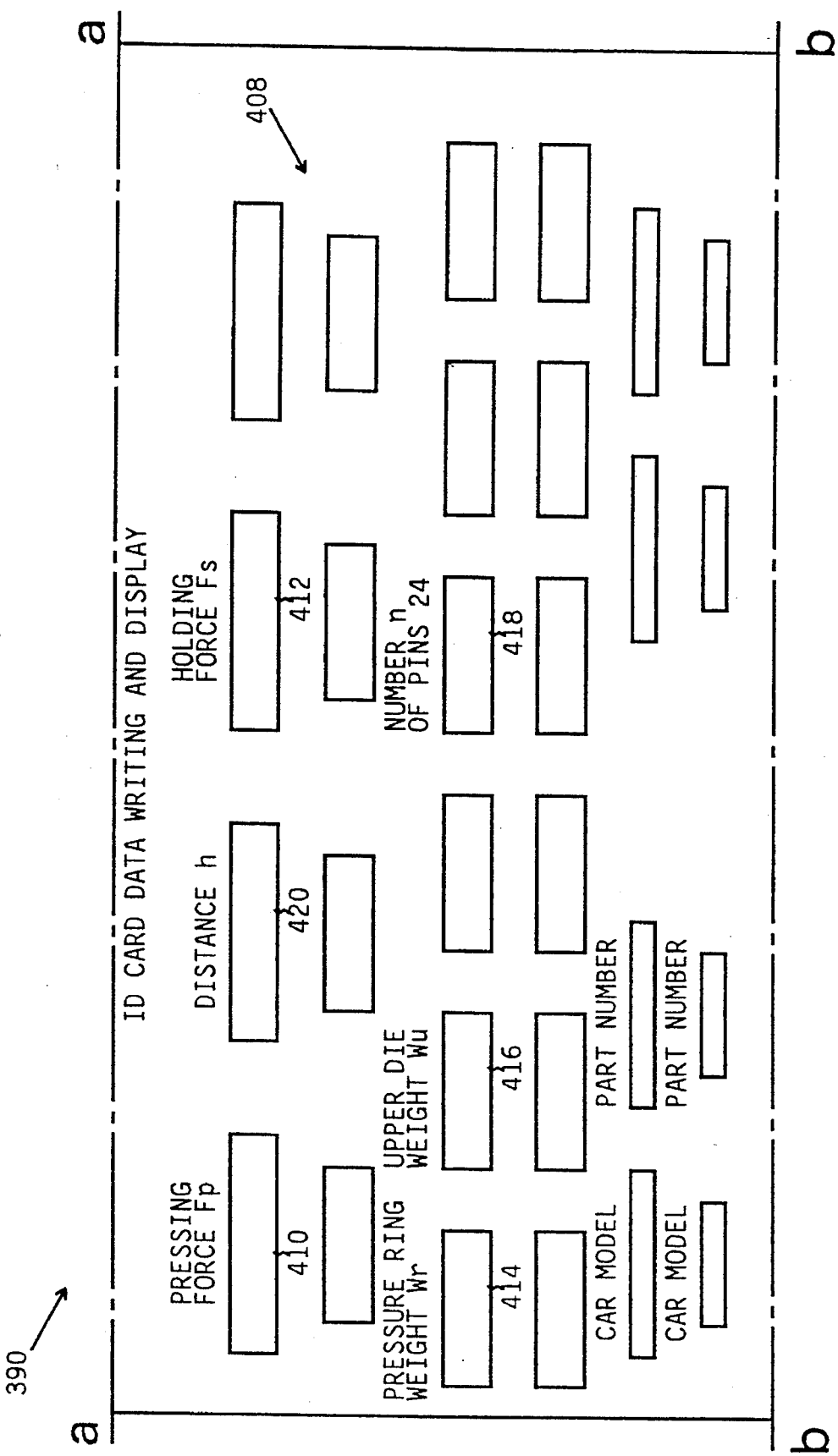
Figure 31:
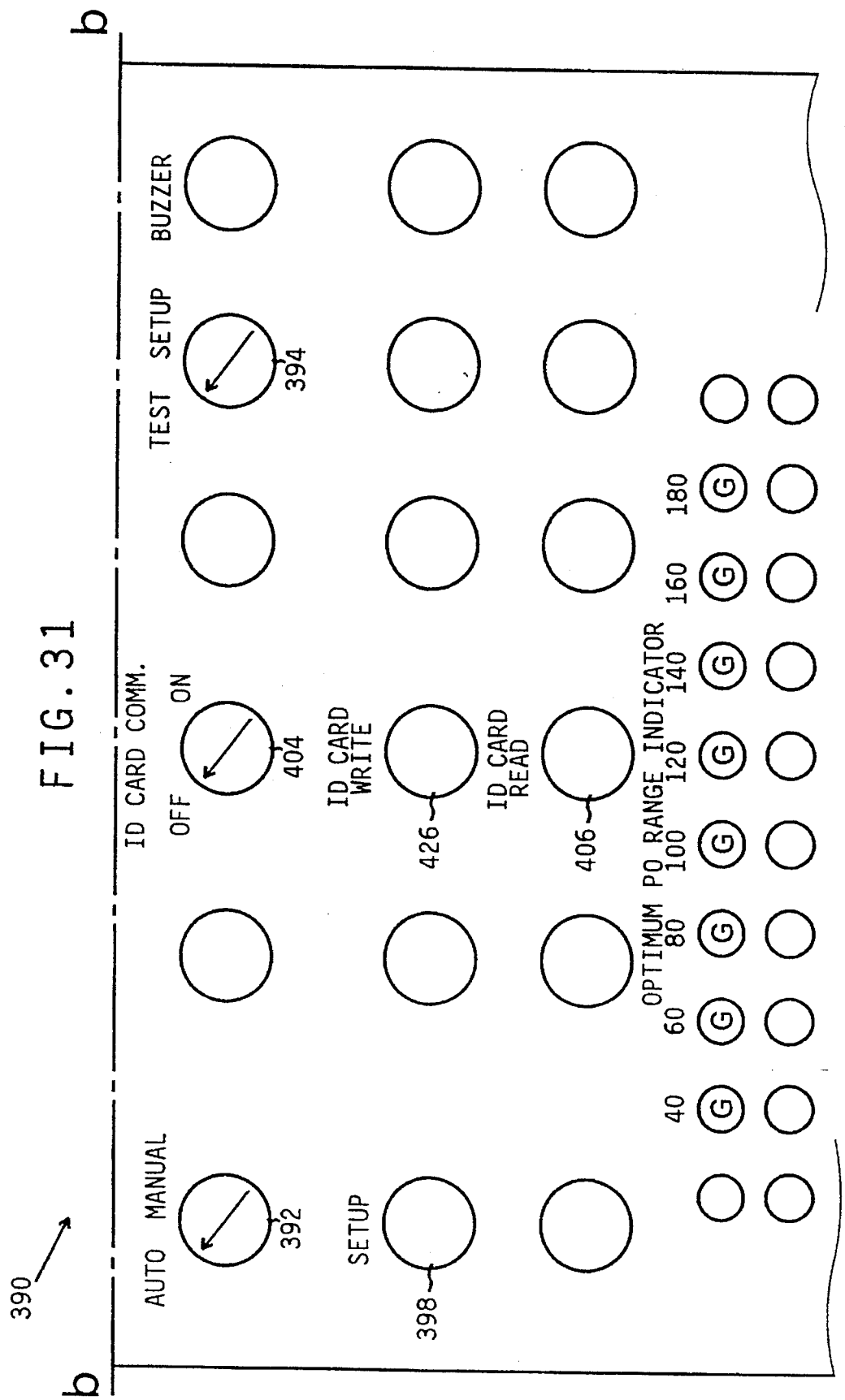

Referring to FIGS. 29–31, there is shown an operator's control panel 390 used in a fourth embodiment of this invention. The control panel 390 is connected to the controller 90 of FIG. 4 for interactive communication therebetween. In the present embodiment, a suitable sensor is provided to detect the vertical position H of the main slide 20 of the press 10. This sensor may be a sensor for directly detecting the position H of the slide 20, or a rotary encoder for detecting the rotating angle of a crankshaft for reciprocating the slide 20. The output of the sensor is applied to the controller 90. Further, the die set data memory 125 of the ID card 96 stores data indicative of the thickness t of the blank (metal strip) to be drawn on the press 10, while the press operation data memory 128 stores data indicative of the optimum distances h* of the die-height adjusting mechanisms 52, for the individual machines of the press 10, whose serial numbers are also stored in the memory 128. The distance h of the mechanisms 52 is adjusted in a procedure illustrated in the flow charts of FIGS. 32–35 and 37–38, which show the manual operations by the operator, as well as the operations performed by the controller 90. In the present fourth embodiment, the distances h associated with the four die-height adjusting mechanisms 52 are adjusted by the single servomotor 60, and the bolster 14 is a moving bolster which is movable for facilitating the installation of the die set (12, 18, 30) on the press 10.

The procedure for adjusting the distance h will be explained. Initially in step Q1, the bolster 14 on which the die set (12, 18, 30) are placed is moved inward of the press 10, by suitable switches. In the next step Q2, the bolster 14 is automatically positioned in place. At this time, the piston of the pneumatic cylinder 42 is held at its lower stroke end by a hydraulic brake. In step Q3, a selector switch 392 on the operator's control panel 390 is turned to "MANUAL" position. Then, in step Q4, a selector switch 394 is turned to "SETUP" position, whereby a SETUP light 396 is activated. Step Q4 is followed by step S5 in which a SETUP pushbutton 398 is depressed. In the next step S6, the TEST RUN switch is turned ON, and the press 10 is operated in an inching mode. Step Q6 is followed by step Q7 to determine whether a pressing force Fp detected by the strain gages 61 has reached a predetermined value F0, or not. When the force Fp has become equal to the value F0, the downward movement of the main slide 20 is automatically stopped. The predetermined value F0 ranges from several tons to several tens of tons, for example, and is determined so as to prevent an overload of the driving system of the press 10. This value F0 is stored as one item of the machine information in the machine data memory 130. The automatic stopping of the downward movement of the main slide 20 in step Q8 is effected since the selector switch 394 is placed in the SETUP position.

In the next step Q9, the upper die 18 is fixed to the main slide 20, by automatic activation of a clamping device on the slide 20. However, the die 18 may be manually installed on the main slide 20 by the operator, using bolts or other fastening means. Step Q9 is followed by step Q10 in which the vertical position H of the main slide 20 is detected and stored in the RAM of the controller 90. Step Q11 (FIG. 33) is then implemented to move the main slide 20 upwards, using a suitable switch. In the next step Q12, the upper stroke end of the main slide 20 is detected, and the main slide 20 is stopped at the upper stroke end, whereby an UPPER END light 400 is activated.

In the next step Q13, the selector switch 394 is turned to "TEST" position, and a TEST light 402 is activated. Step Q13 is followed by step Q14 in which an adjusting amount $\Delta h$ of the distance h is calculated according to the following equation (8), on the basis of a dimension $\Delta H$, the thickness t of the blank stored as the die set information), and a predetermined pressing distance x0. The servomotor 60 is operated to adjust the distance h of the die-height adjusting mechanisms 52 by the calculated adjusting amount $\Delta h$. The dimension $\Delta H$ is calculated from the vertical position H of the main slide 20, and the subtraction of this dimension $\Delta H$ in the equation (8) to calculate the adjusting amount $\Delta h$ assures the pressing force Fp equal to the predetermined value F0, when the main slide 20 is at its lower stroke end. The subtraction of the thickness t assures the pressing force Fp=F0 in a production run with the blank loaded on the press 10. Thus, by adjusting the distance h of the die-height adjusting mechanisms 52 by the calculated amount $\Delta h$, the blank is pressed with the effective pressing distance x0 at the end of the downward movement of the main slide 20. The pressing distance x0 is in the neighborhood of 1.0 mm, for instance.

$$\Delta h = -\Delta H - t + x0 \qquad (8)$$

In step Q15, the blank is loaded onto the press 10. In the next step Q16, the TEST RUN switch is depressed to effect a test pressing operation with one reciprocation of the main slide 20. Step Q16 is followed by step Q17 in which the pressing force Fp is detected by the strain gages 61 at the end of the downward movement of main slide to its lower stroke end, and the detected force Fp is stored as F1. In the next step Q18, a ratio $\Delta a$ is calculated according to the following equation (9), on the basis of the values F0 and F1 and the pressing distance x0.

$$\Delta a = (F1 - F0)/x0 \qquad (9)$$

Figure 36:
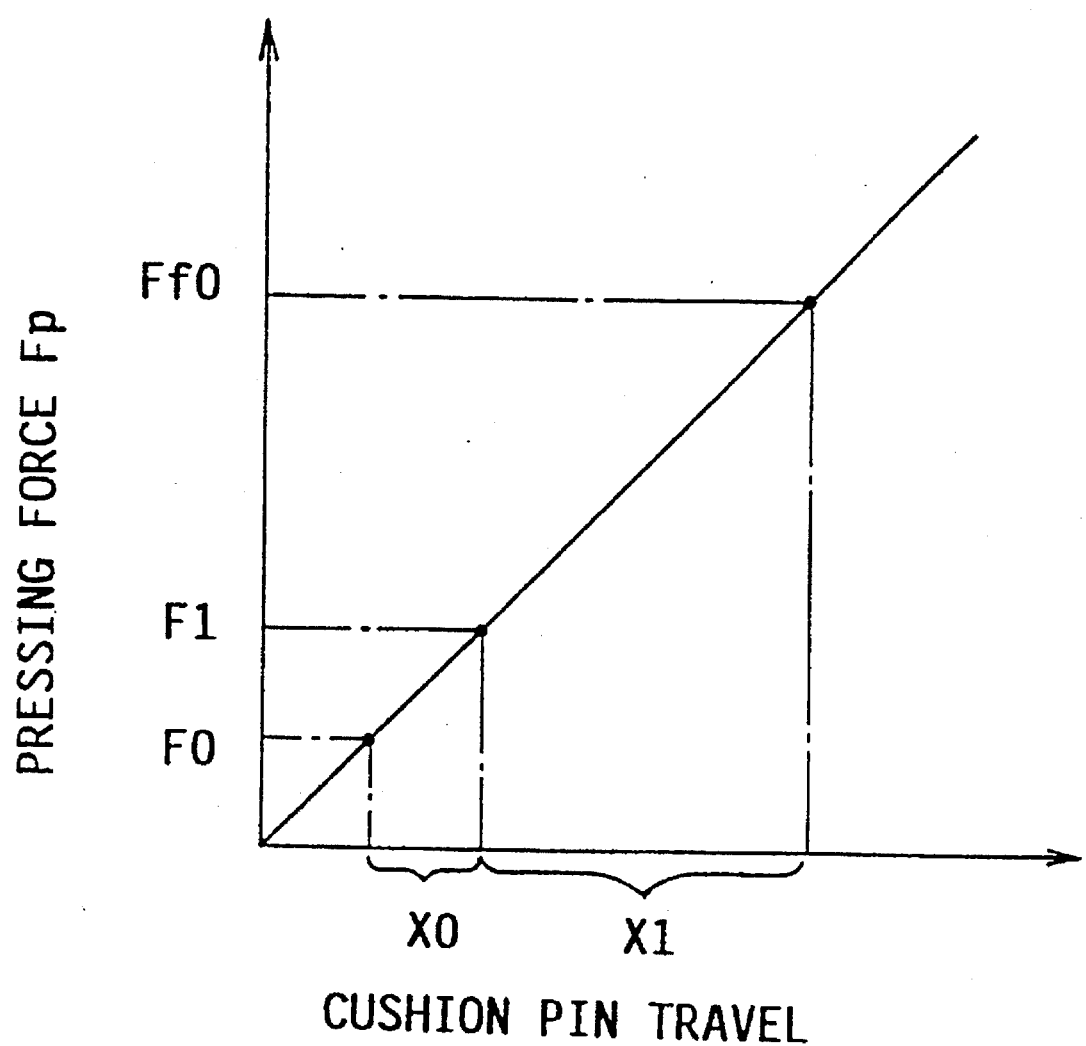
FIG. 36 is a graph for explaining a relationship between the travel of the cushion pins and the pressing force Fp, when the distance h is adjusted according to the flow charts of FIGS. 32–35.

The graph of FIG. 36 indicates a relationship between the pressing forces F0 and F1 and the pressing distance x0. The ratio $\Delta a$ corresponds to the gradient of a line representing the relationship. The graph of FIG. 36 corresponds to the h-Fpi relationship of FIG. 9 of the first embodiment. The relationship of FIG. 36 is specific to each individual machine of the press 10.

Figure 34:
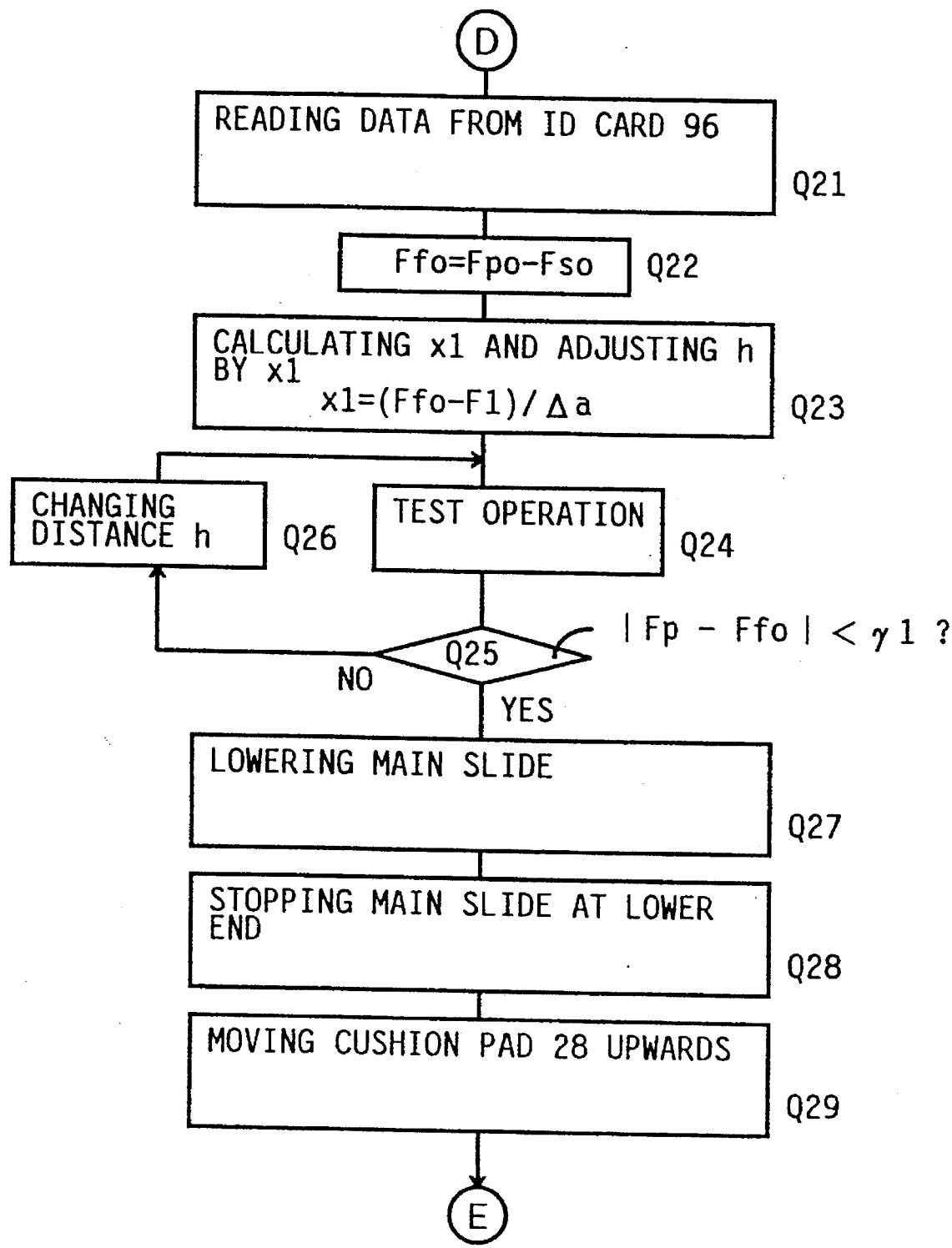
Figure 35:
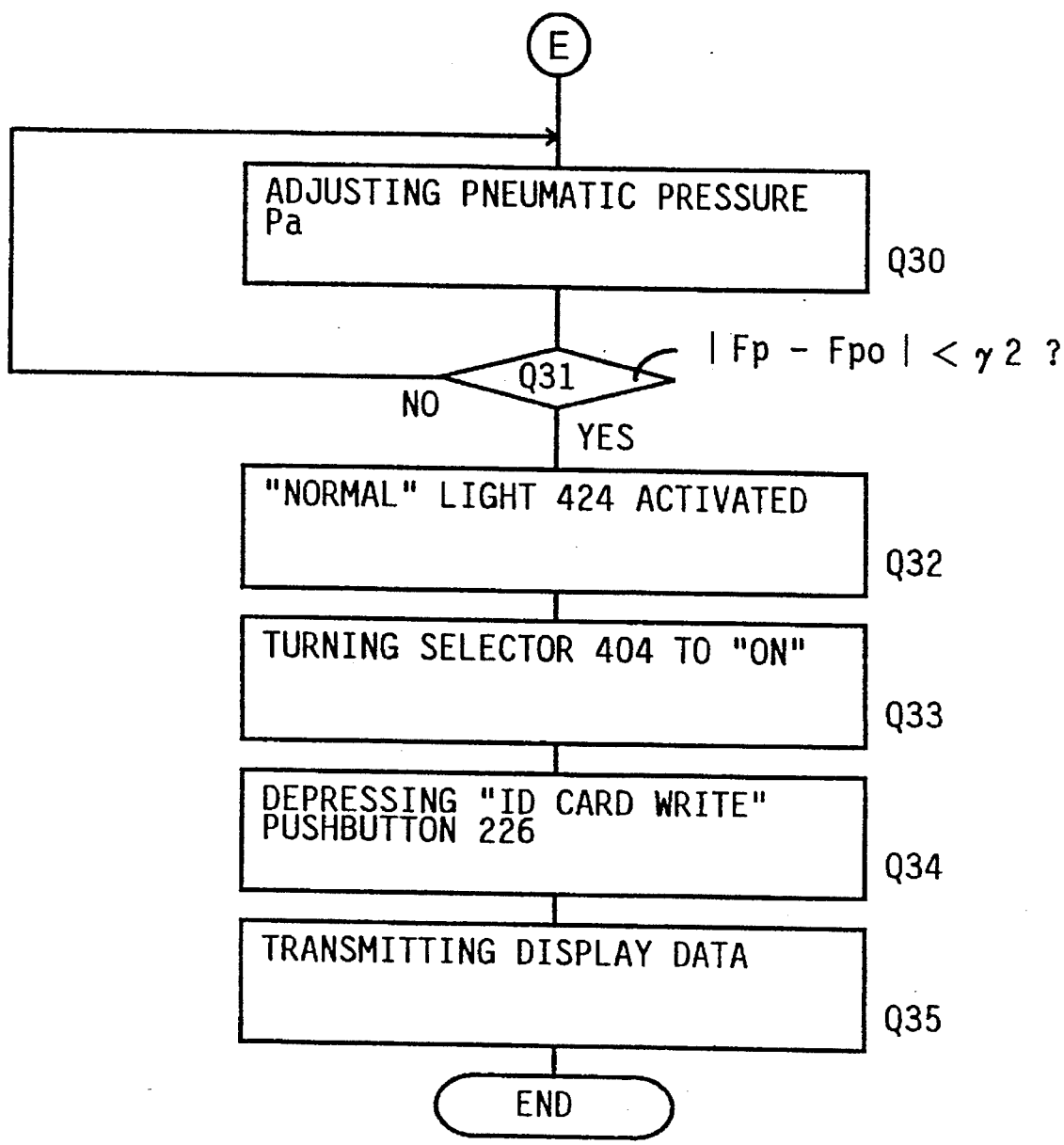

In the next steps Q19 and Q20, an ID CARD COMMUNICATION selector switch 404 is turned to ON position, and an ID CARD READ pushbutton 406 is depressed, whereby the die set information are read out from the ID card 96 and stored in the die data memory 132, in step Q21 (FIG. 34). The die set information stored in the memory 132 are displayed on a display section 408 of the control panel 390. The display section 408 includes: an indicator 410 for indicating the total pressing force Fpo (sum of the load values Fpoi associated with the four plungers 22); an indicator 412 for indicating the holding force Fso; an indicator 414 for indicating the weight Wr of the pressure ring 30; an indicator 416 for indicating the weight Wu of the upper die 18; and an indicator 418 for indicating the number n of the cushion pins 24.

In step Q22, a difference Ffo=(Fpo−Fso) between the pressing and holding forces Fpo and Fso is calculated. Step Q22 22 is followed by step Q23 to calculate an adjusting amount x1 of the distance h according to the following equation (10). The servomotor 60 is operated to adjust the distance h by the calculated amount x1. With the distance h adjusted by the amount x1, the pressing force Fp at the lower stroke end of the main slide 20 is substantially equal to the calculated value Ff0 when the piston of the pneumatic cylinder 42 is at the lower stroke end at which the holding force Fs is zero, as is apparent from the graph of FIG. 36.

$$x1 = (Ff0 - f1)/\Delta a \qquad (10)$$

In the next step Q24, the TEST RUN switch is turned on to perform a test operation with one reciprocation of the main slide 20. Step Q25 is then implemented to detect the pressing force Fp (at the lower stroke end of the main slide 20) on the basis of the output of the strain gages 61, calculate a difference |Fp−Ff0|, and determine whether the difference |Fp|Ff0| is smaller than a predetermined tolerance value $\gamma 1$. If a negative decision (NO) is obtained in step Q25, step Q26 is implemented to incrementally or decrementally change the distance h. Steps Q24–Q26 are repeatedly implemented until the difference |Fp−Ff0| becomes smaller than the tolerance $\gamma 1$. The determination in step Q25 and the adjustment in step Q26 may be automatically effected under the control of the controller 90, or may be manually conducted by the operator. In the latter case, the operator makes the determination in step Q25 by observing the pressing force Fp indicated on the indicator 410, and operates the servomotor 60 by using an appropriate switch. The indicator 420 in the display section 408 indicates the distance h as detected by the encoder 59.

After the difference |Fp−Ff0| has become smaller than the tolerance $\gamma 1$, the main slide 20 is lowered in step Q27, and stopped at its lower end in step Q28, by using the appropriate switch. Then, in step Q29, the pneumatic cylinder 42 is unlocked and the cushion pad 28 is moved upwards. In the next step Q30 (FIG. 35), the pneumatic pressure Pa of the pneumatic cylinder 42 is adjusted so as to obtain the holding-force Fso, according to the equation (1), for example. In this respect, it is noted that the weight Wr of the pressure ring 30 used for producing an outer panel of a motor vehicle is generally 10 tons and is considerably smaller than those of the other components whose weights are used in the equation (1). Therefore, the weight Wr may be ignored in-adjusting the pneumatic pressure Pa. This may also apply to the first embodiment.

With the pneumatic pressure Pa adjusted in step Q30, the pressing force Fp detected by the strain gages 61 is increased by the amount equal to the holding force Fso. Step Q30 is followed by step Q31 to determine whether a difference |Fp−Fpo| is smaller than a predetermined tolerance γ2. If a negative decision (NO) is obtained in step Q31, step Q30 is again implemented. Steps Q30 and Q31 are repeatedly implemented until the difference |Fp−Fpo| becomes smaller than the tolerance γ2. If an affirmative decision (YES) is obtained in step Q31, a NORMAL light 424 is activated in step Q32. The activation of the light 424 indicates that the pressing force Fp is adequate. Subsequently, the ID CARD COMMUNICATION switch 404 is turned to the ON position in step Q33, and an ID CARD WRITE pushbutton 426 is depressed in step Q34. As a result, the distance h indicated on the indicator 420 in the display section 420 and the pressing force Fp indicated on the indicator 410 are written as optimum distance h* and optimum pressing force Fp in the press operation data memory 128 of the ID card 96, together with the serial number of the press 10 in question. Other data such as the number n of the cushion pins 24 indicated on the indicator 418 and the optimum hydraulic pressure Ps indicated on an indicator 428 are also transmitted and written in the ID card 96, as in the third embodiment of FIGS. 23–28. The present fourth embodiment has the same function as the third embodiment, in connection with the hydraulic pressure Ps.

Figure 37:
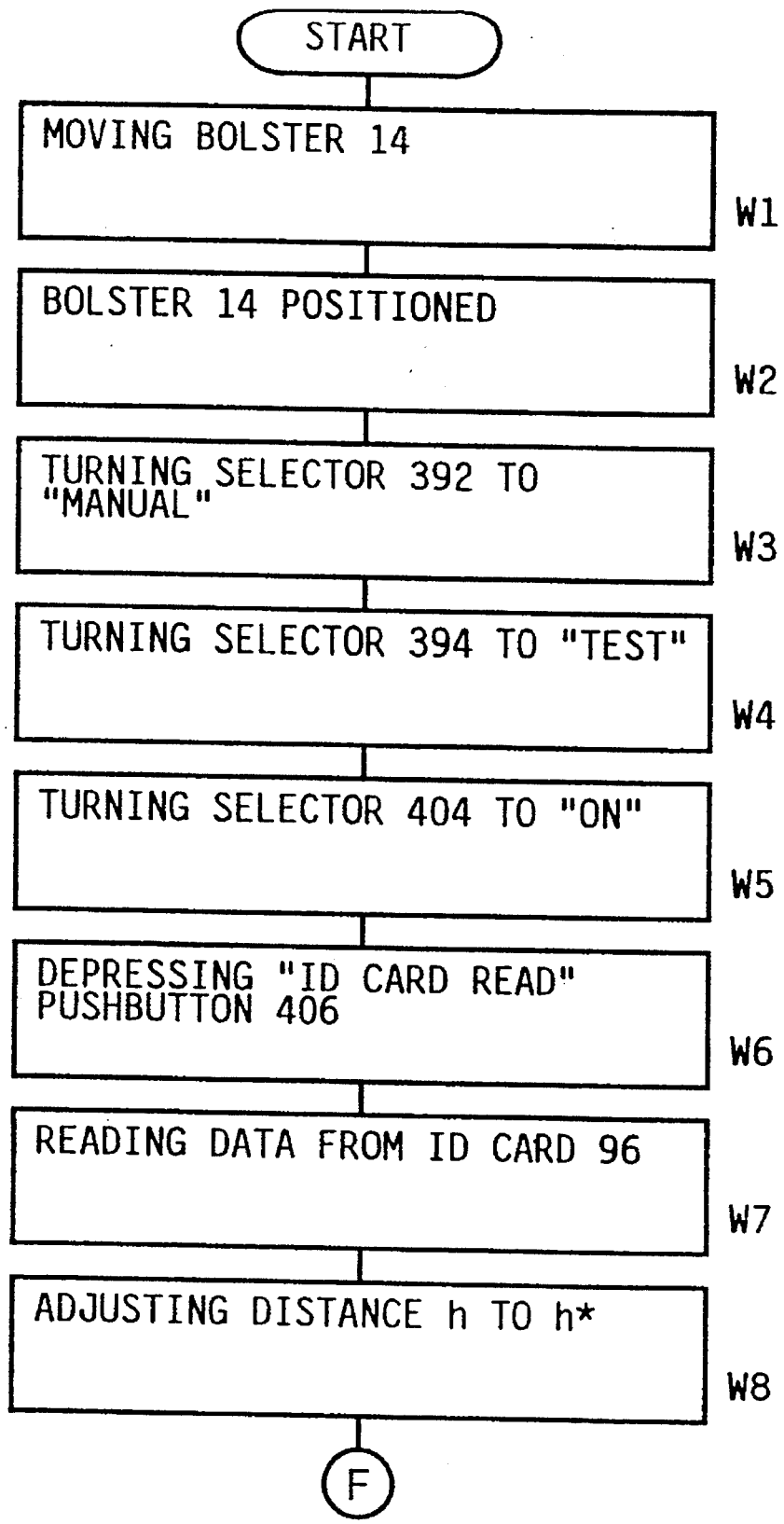
FIGS. 37 and 38 are flow charts illustrating an operation to re-establish the distance h on the press equipped with the operator's control panel of FIGS. 29–31.
Figure 38:
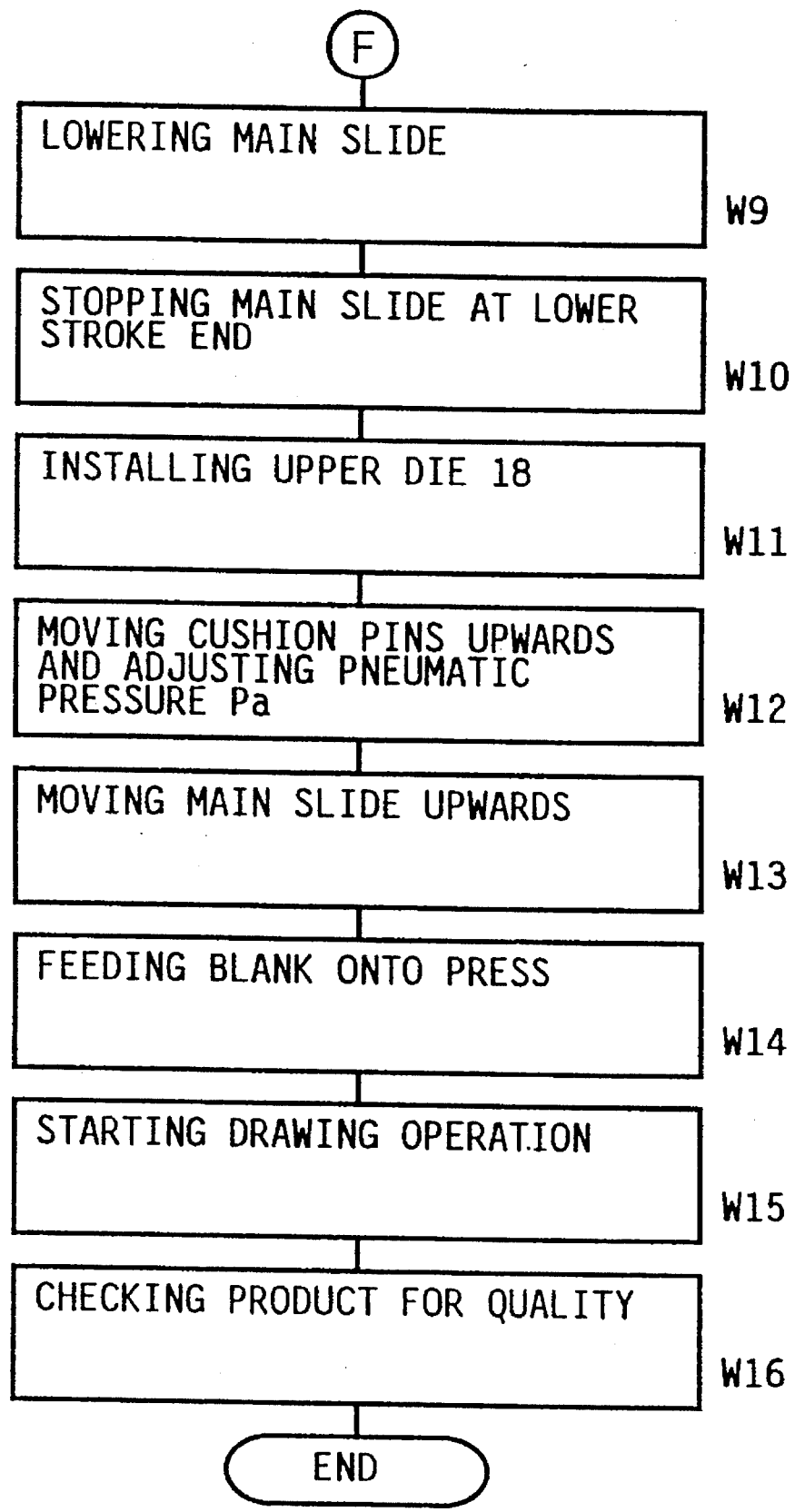

Referring to the flow charts of FIGS. 37 and 38, there will be described a procedure for adjusting the distance h when the die set once used on the press 10 and removed therefrom is again used on the press 10.

Figure 32:
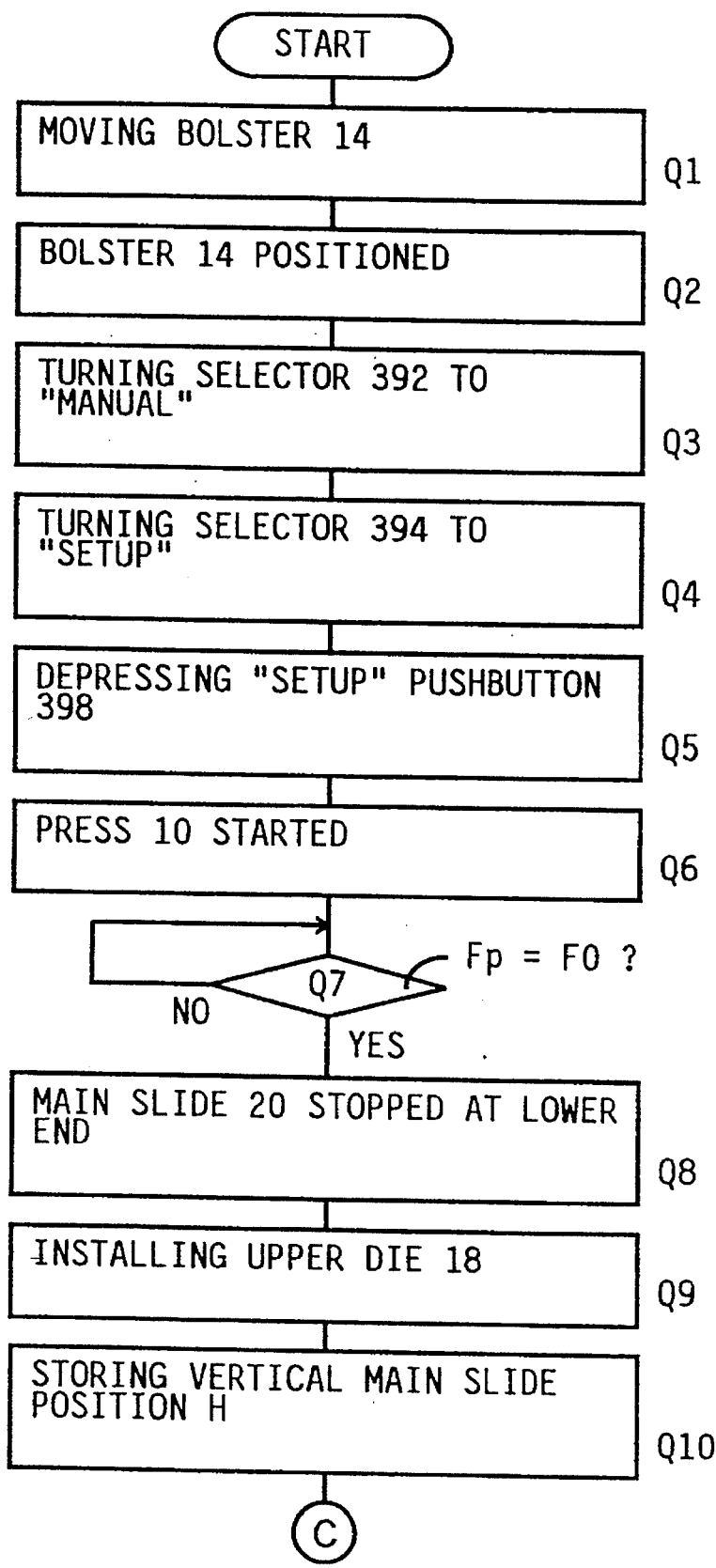
FIGS. 32–35 are flow charts illustrating an operation for effecting adjustment of the distance h on the press equipped with the operator's control panel of FIGS. 29–31.
Figure 33:
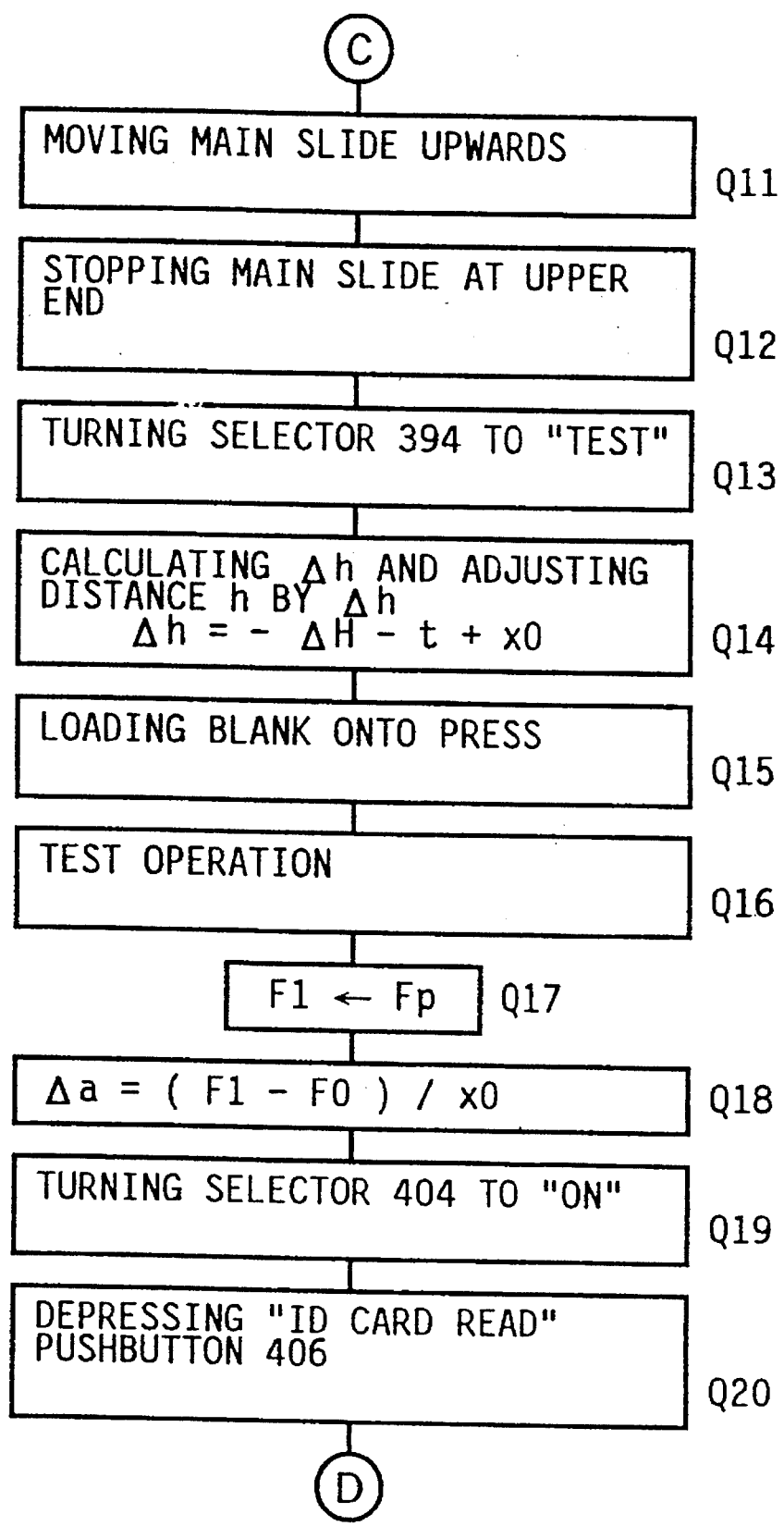

Steps W1–W3 are the same as steps Q1–Q3 of FIG. 32. In the next step W4, the selector switch 394 is turned to the TEST position. In step W5, the selector switch 404 is turned to the ON position. Then, the ID CARD COMMUNICATION pushbutton 406 is depressed in step W6. Consequently, the die set information, and the press operation data corresponding to the press 10 in question are read out from the ID card 96, and displayed on the display section 408. In the next step W8, the servomotor 60 is operated to adjust the distance h to the optimum value h*. This adjustment of the distance h may be achieved automatically under the control of the controller 90, or may be done by the operator, using the appropriate switch while observing the optimum value h* indicated on the indicator 420. Thus, the distance h is adjusted, and the same pressing conditions as established by the procedure of FIGS. 32–35 are reproduced.

In the next step W9 (FIG. 38), the main slide 20 is lowered in an inching mode by using the appropriate switch. In step W10, the downward movement of the slide 20 is stopped at its lower stroke end, by the same switch. Suppose the thickness t of the blank is about 0.6–0.7 mm, the main slide 20 comes into abutting contact with the upper die 18 placed on the pressure ring 30, before the blank is loaded on the press 10. However, there is not a risk that the motor to drive the main slide 20 is overloaded. The position at which the main slide 20 is stopped need not be the lower stroke end. In step W11, the upper die 18 is fixed to the main slide 20. In step W12, the pneumatic cylinder 42 is unlocked, and the cushion pad 28 is moved upwards. Further, the pneumatic pressure Pa is adjusted so as to obtain the optimum holding force Fso. These steps W11 and W12 are similar to steps the Q9, Q29 and Q30 described above. Then, step W13 is implemented to move the main slide 20 to its upper stroke end. The blank is loaded onto the press 10, in step W14, and the press 10 is operated in step W15, with one reciprocation of the main slide 20 as in a production pressing cycle. Step W16 is then implemented to confirm the pressing force Fp and holding force Fs indicated on the respective indicators 410, 412, and visually check the product manufactured, for reconsidering the pressing conditions for further adjustment.

In the present fourth embodiment, too, the distance h must be adjusted according to the procedure illustrated in the flow charts of FIGS. 32–35, when the die set is used for the first time on the press 10. The adjusted optimum distance h* for this specific pressing machine is stored in the ID card 96, so that the optimum distance h* can be utilized when the same die set is used again on the press 10. Thus, the adjustment of the distance h may be done using the stored optimum value h* and can be completed in a reduced time, whereby the production efficiency of the press 10 is improved and the operator's work load is considerably reduced.

Although the fourth embodiment also requires the operator's manipulation of the press 10 using the appropriate switches to perform various operations necessary to adjust the distance h, the adjustment of the distance h may be fully automated under the control of the controller 90. In this case, the automatic adjustment may be started by simply operating a suitable switch.

It will be understood that steps Q6–Q26 correspond to a step of adjusting the distance h as one of the operating conditions of the press 10, and steps Q33–Q35 correspond to a step of storing the optimum distance value h* in the ID card 96. Further, steps W5–W8 correspond to a step of reproducing or establishing the optimum distance value h* on the press 10 when the same die set is again used on the same press 10. The press operation data memory 128 of the ID card 96 functions as memory means for storing the optimum distance value h*.

Figure 39:
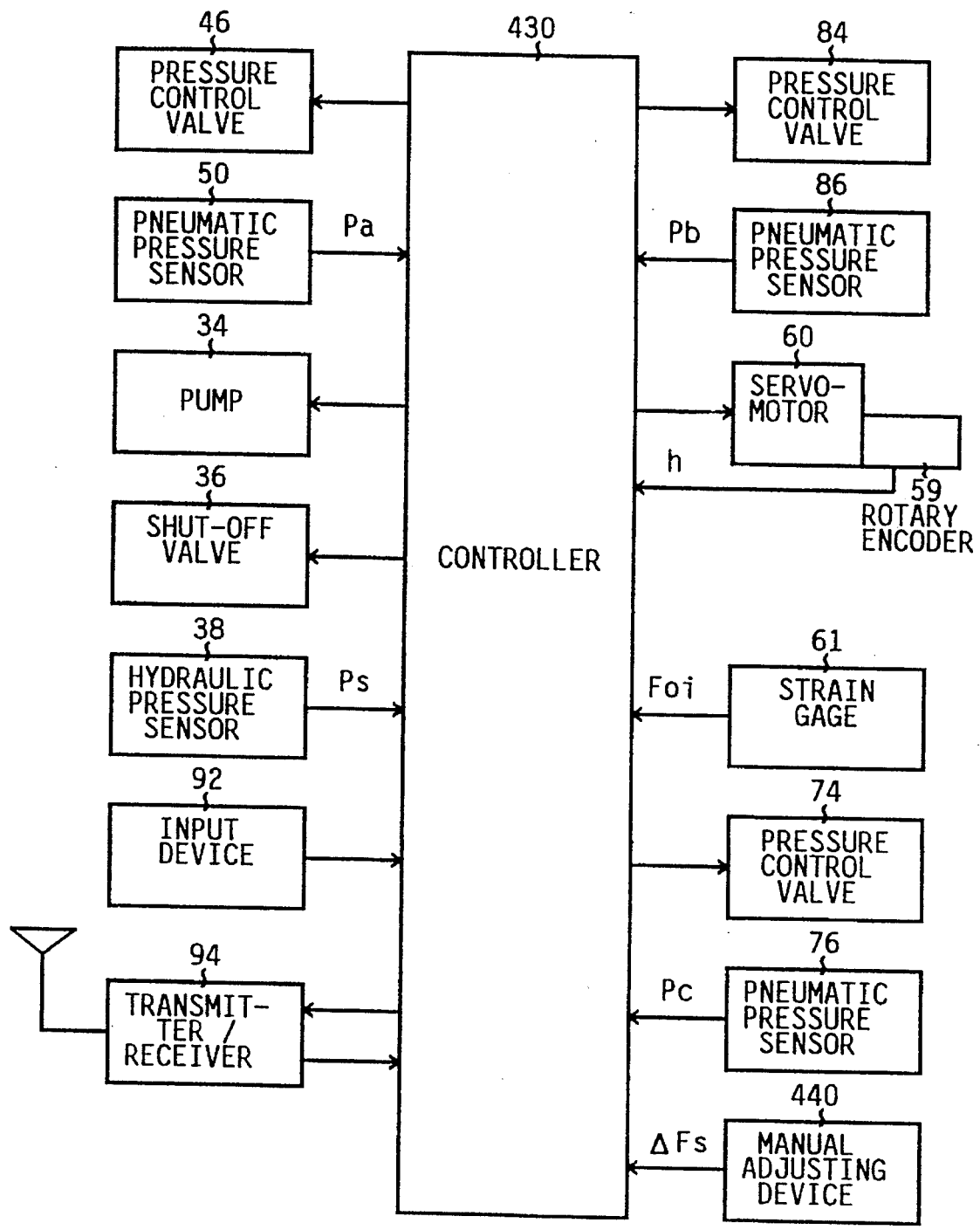
FIG. 39 is a block diagram corresponding to that of FIG. 3 of the first embodiment, showing a control system according to a fifth embodiment of the invention.
Figure 40:
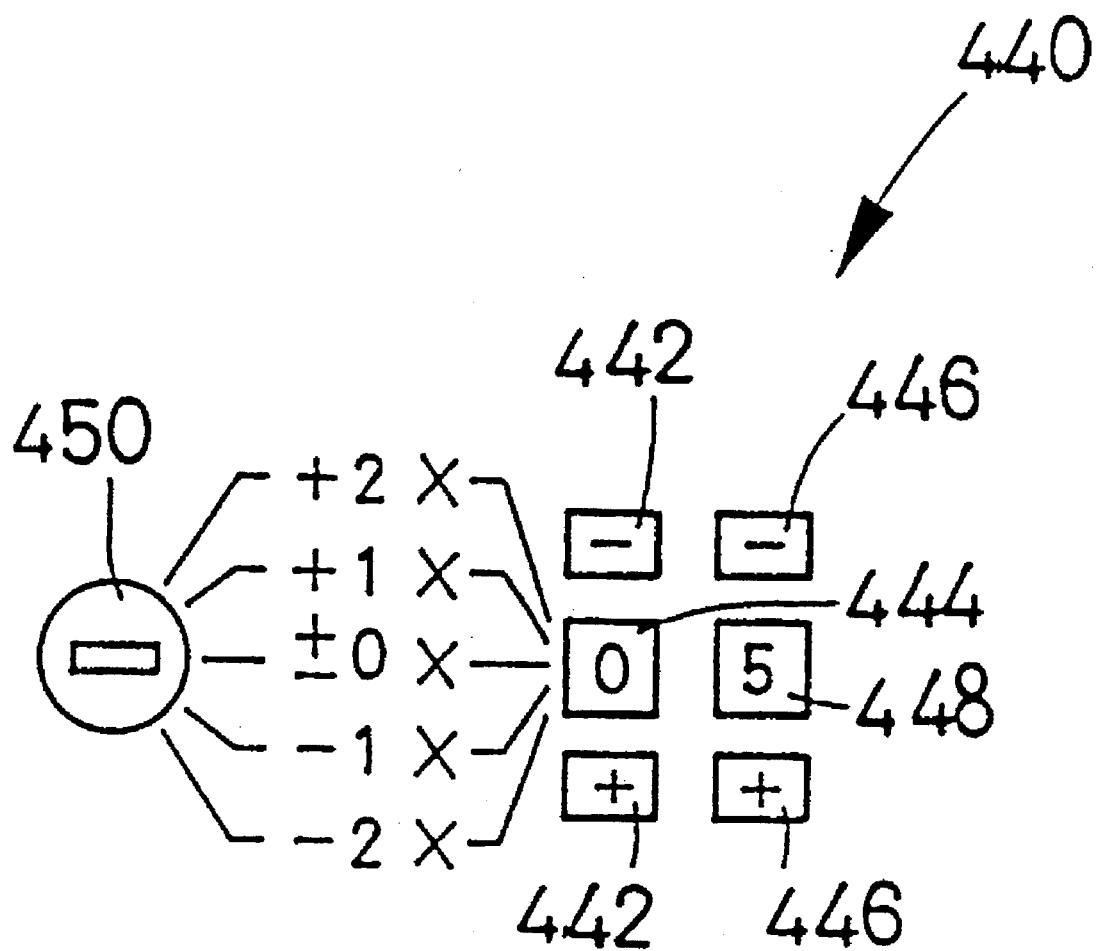
FIG. 40 is an illustration showing an arrangement of a manual adjusting device used in the fifth embodiment.
Figure 41:
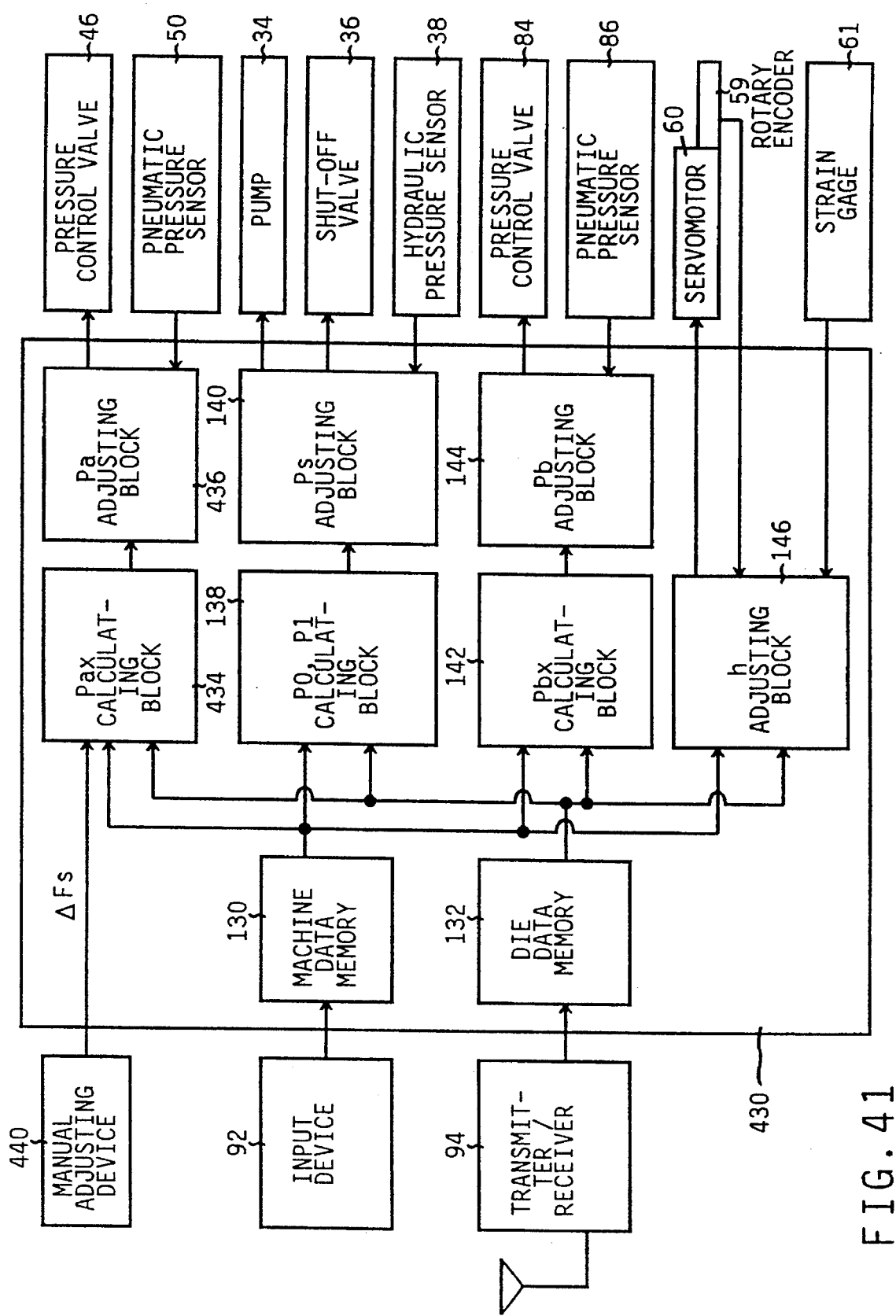
FIG. 41 is a block diagram corresponding to that of FIG. 4, showing functions of a controller used in the fifth embodiment.
Figure 42A:
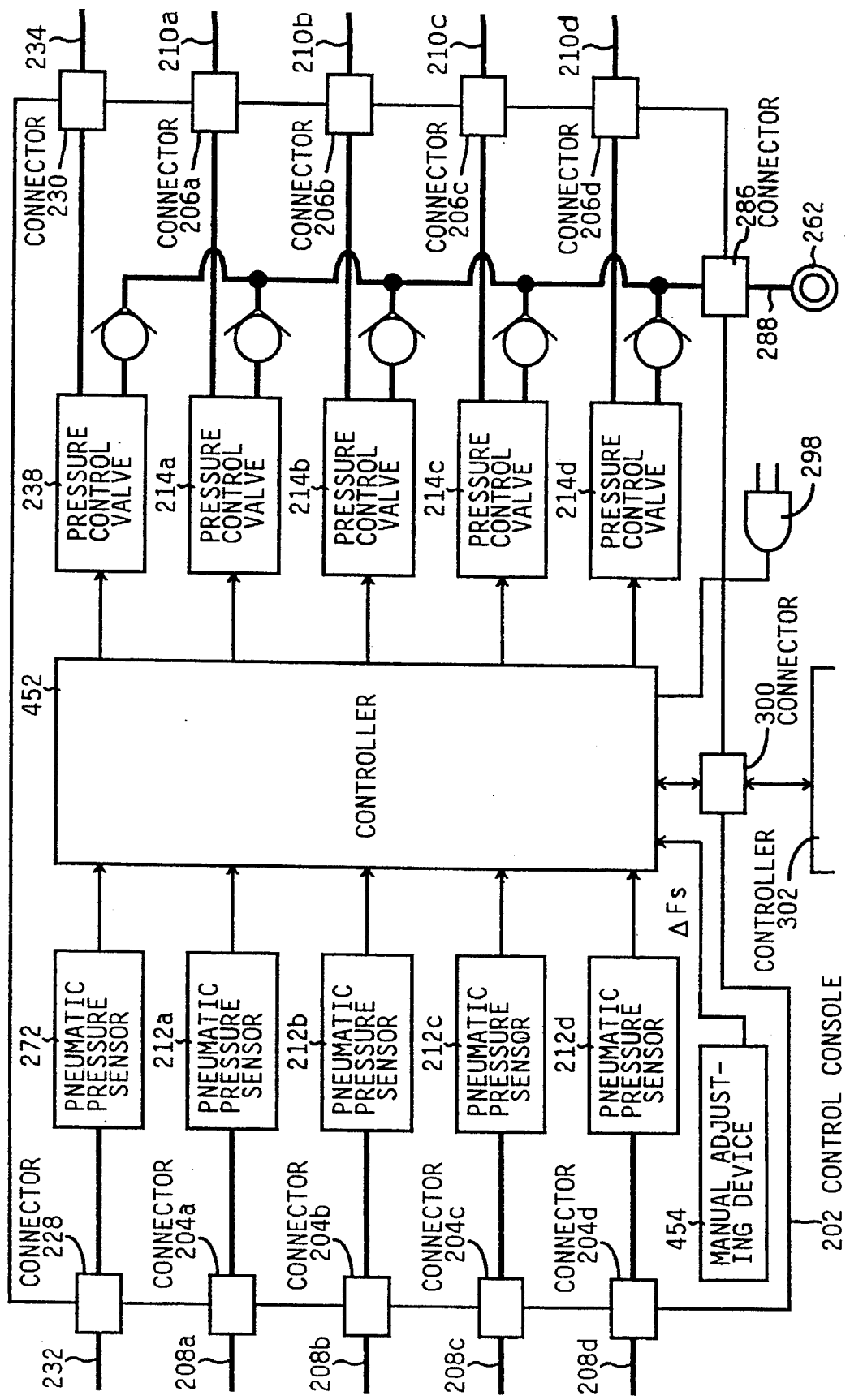
FIGS. 42A, 42B, 43, 44 and 45 are views corresponding to those of FIGS. 19, 16, 18 and 21 of the second embodiment, showing a sixth embodiment of the present invention.
Figure 42B:
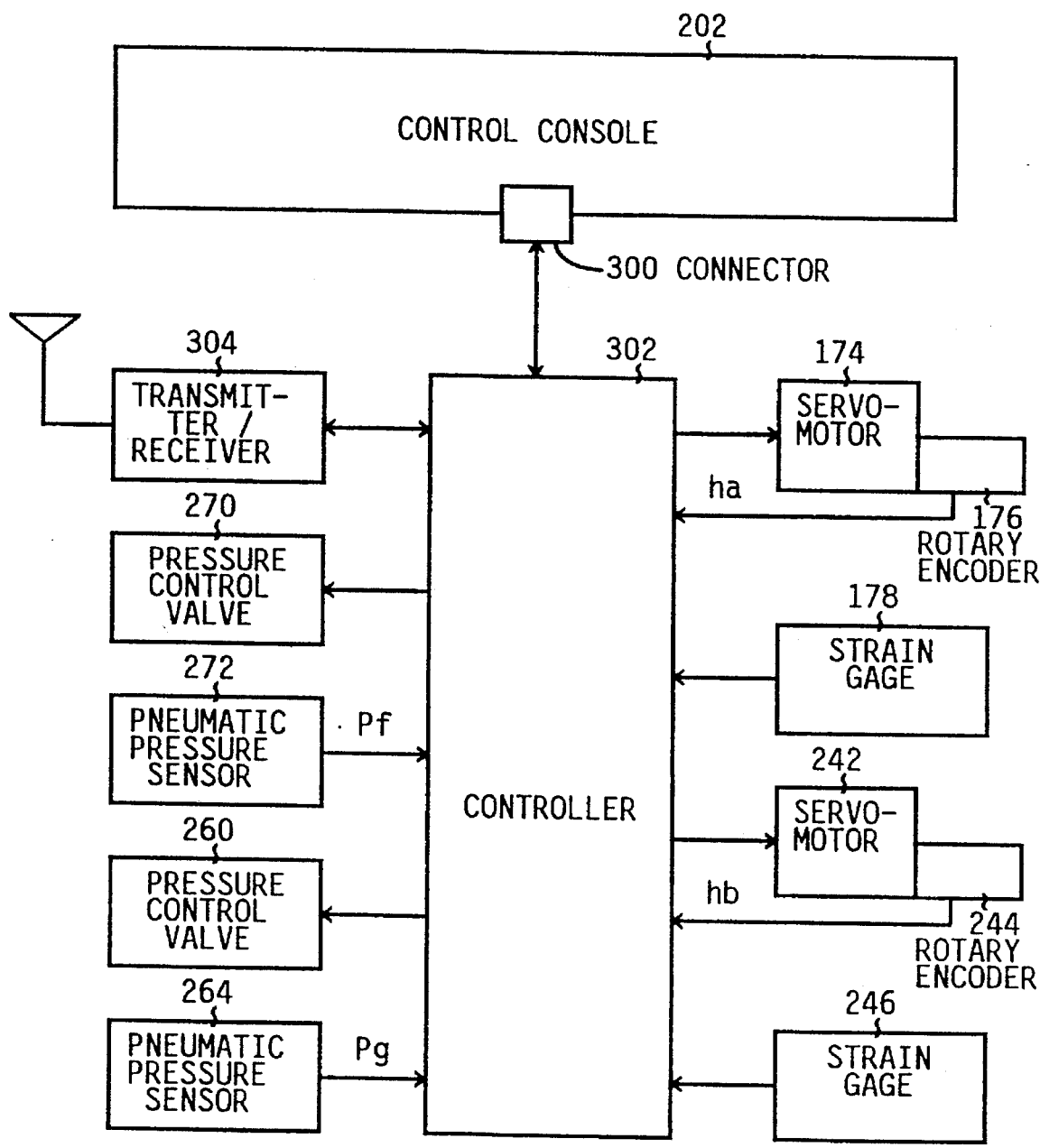

Referring next to FIGS. 39–41, there will be described a fifth embodiment of the present invention, which is identical with the first embodiment of FIGS. 1–11, except for the use of a controller 430 as shown in FIGS. 39 and 41, and a manual adjusting device 440 as shown in FIG. 40. The controller 430 has a Pax calculating block 434 and a Pa adjusting block 436 which correspond to the respective blocks 134 and 136 of the controller 90 of the first embodiment. The Pax calculating block 434 receives an output signal of the manual adjusting device 440, which represents a desired adjusting amount ΔFs for the holding force Fs. Accordingly, the Pax calculating block 334 and the Pa adjusting block 336 of the controller 430 have additional functions not achieved by the corresponding blocks 134, 136 of the controller 90.

As shown in detail in FIG. 40, the manual adjusting device 440 has two keys 442 for changing the second digit (more significant digit) of a two-digit numerical value for the adjusting amount ΔFs, and two keys 46 for changing the first digit of the numerical value. The device 440 also has two digit indicators 444 and 448 on which are indicated the second and first digits of the numerical value, respectively. The device 440 further has a selector switch 450 located to the left of the indicators 444, 448. The selector switch 450 can be turned to one of five positions, with a key inserted in the switch. The adjusting amount ΔFs by which the holding force Fs is adjusted is determined by the numerical value set by the keys 442, 446, and a multiplication coefficient which corresponds to the selected one of the five positions of the selector switch 450. Thus, the adjusting amount ΔFs is variable in five steps, for the same numerical value indicated on the indicators 444, 448. If the two-digit numerical value indicated on the indicators 444, 448 is "05", and the switch 450 is set at the uppermost position "+2X", the adjusting amount ΔFs is equal to (+2×5)="+10(tf). If the switch 450 is set at the second position "1X", the adjusting amount ΔFs is equal to (+1×5)=+5(tf). If the switch 450 is set at the intermediate position "±0X", the adjusting amount ΔFs is zero. If the switch 450 is set at the fourth position "−1X", the adjusting amount ΔFs is equal to (−1×5)=−5(tf). If the switch 450 is set at the lowermost position "−2X", the adjusting amount ΔFs is equal to (−2×5)=−10(tf).

The press 10 has a suitable operator-controlled ON-OFF switch for enabling and disabling the manual adjusting device 440. When the pneumatic pressure Pax is adjusted for the first time for a given pressing job, the ON-OFF switch is placed in the OFF position in which the manual setting device 440 is not effective. In this condition, therefore, the calculation of the optimum pneumatic pressure Pax according to the Pax calculating block 434 and the adjustment of the pressure Pa according to the Pa adjusting block 436 are effected irrespective of the adjusting amount ΔFs manually entered through the manual adjusting device 440.

If the operator finds cracking and/or wrinkling of the product obtained after the pneumatic pressure Pa is initially adjusted on the basis of the machine information and the die set information, with the ON-OFF switch set at OFF, the ON-OFF switch is turned ON, and the press 10 is test-operated with different values of the adjusting amount ΔFs entered through the manual adjusting device 440, until the pressing operation can be performed with the optimum holding force Fs, without cracking and/or wrinkling of the product which might arise from the variation in the physical properties of the blanks. Explained more particularly, when the adjusting amount ΔFs entered through the device 440 is made effective with the ON-OFF switch turned ON, the Pax calculating block 434 calculates the optimum pneumatic pressure Pax according to the following equation (11), and the Pa adjusting block 436 controls the pressure control valve 46, on the basis of the optimum pressure Pax calculated according to the equation (11).

$$Pax = (Fso + \Delta Fs + Wa + Wr + n \cdot Wp)/Aa \qquad (11)$$

The above equation (11) uses the parameter (Fso+ΔFs), in place of the parameter Fso used in the above equation (1) used for the initial adjustment of the pressure Pa (for the initial adjustment of the actual holding force Fs), where Fso is the optimum holding force as specified by the die set information. As a result, the actual holding force Fs is changed by the manually entered adjusting amount ΔFs. Since the adjusting amount ΔFs can be changed by the keys 442, 446 and/or the selector switch 450, the holding force Fs, that is, the pneumatic pressure Pa can be adjusted to an optimum value. The optimum value can be confirmed by a test operation on the press 10, which is repeated with different adjusting amounts ΔFs until the blank is drawn or pressed without cracking or wrinkling. The Pax calculating block 434 of the controller 430 functions as calculating means for calculating the optimum pneumatic pressure Pax, according to the equation (11) which includes the adjusting amount ΔFs entered through the manual adjusting device 440. The equation (11) represents a predetermined relationship between the holding force Fs produced by the force applying device 53, and the pneumatic pressure Pa of the fluid-actuated cylinder 42 of the device 53. Further, the adjusting block 436 of the controller 430 cooperates with the pressure control valve 46 and the sensor 50 to constitute pressure adjusting means for adjusting the pneumatic pressure Pa so that the holding force Fs is changed by the entered adjusting amount ΔFs.

In the present fifth embodiment, the optimum holding force Fso itself is changed by means of the manual adjusting device 440, to adjust the optimum pneumatic pressure Pax so that the pressure Pax permits the adjustment of the actual holding force Fs to the changed optimum holding force (Fso+ΔFs). Namely, the fifth embodiment is not adapted to directly change the optimum pneumatic pressure Pax, but to determine the optimum adjusting amount ΔFs of the optimum holding force Fso, while observing the quality of the products in terms of the cracking and wrinkling. The present arrangement permits fast and accurate adjustment of the pneumatic pressure Pa, without influences by a variation in the pressure-receiving area and fluid leakage of the pneumatic cylinder 42, sliding resistance values of the various components and other characteristics of the individual pressing machines. Although the amount of adjustment of the pneumatic pressure Pa required to eliminate a given degree of cracking or wrinkling of the product differs from one machine to another, the required adjusting amount (ΔFs) of the holding force Fs is substantially the same for the different machines of the press 10. Therefore, the present arrangement assures relatively easy and fast adjustment of the holding force Fs (pressure Pa) by the operator's determination of the adjusting amount ΔFs based on the experience and knowledge associated with the adjusting amount ΔFs in relation to the amount of reduction in the degree of cracking and wrinkling.

Referring next to FIGS. 42–45, there will described a sixth embodiment of this invention as applied to the double-action press 150 of FIGS. 12–14 of the second embodiment of FIGS. 12–22. The sixth embodiment uses the control system as illustrated in the block diagrams of FIGS. 42A, 42B and 43, which includes a controller 452 in place of the controller 296 of the second embodiment. The controller 452 has four Pex calculating blocks 456a–456d (only 456a and 456b being indicated in FIG. 43 by way of example) and four Pe adjusting blocks 458a–458d (only 458a and 458b being indicated in FIG. 43 by way of example), which correspond to the respective four fluid-actuated cylinders 184 associated with the four outer plungers 166 (die-height adjusting mechanisms 172) as shown in FIG. 13. As described above with respect to the second embodiment, the cylinder 180 of each mechanism 172 and the corresponding cylinder 184 and air tank 190 constitute the force applying device as generally indicated in FIG. 13, which functions to produce the holding force Fs to be applied to the blank 171 through the pressure ring 156.

Figure 43:
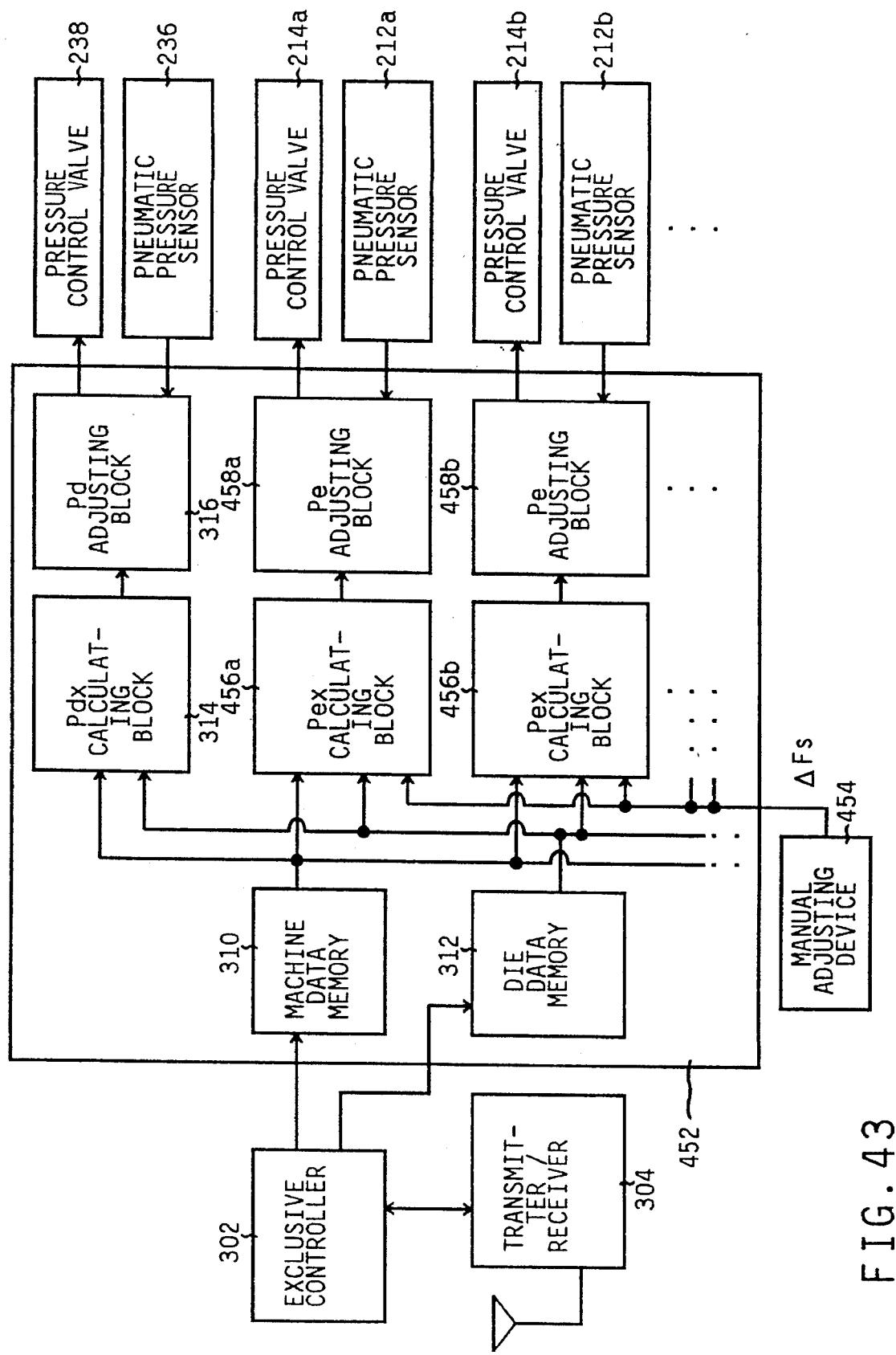
Figure 44:
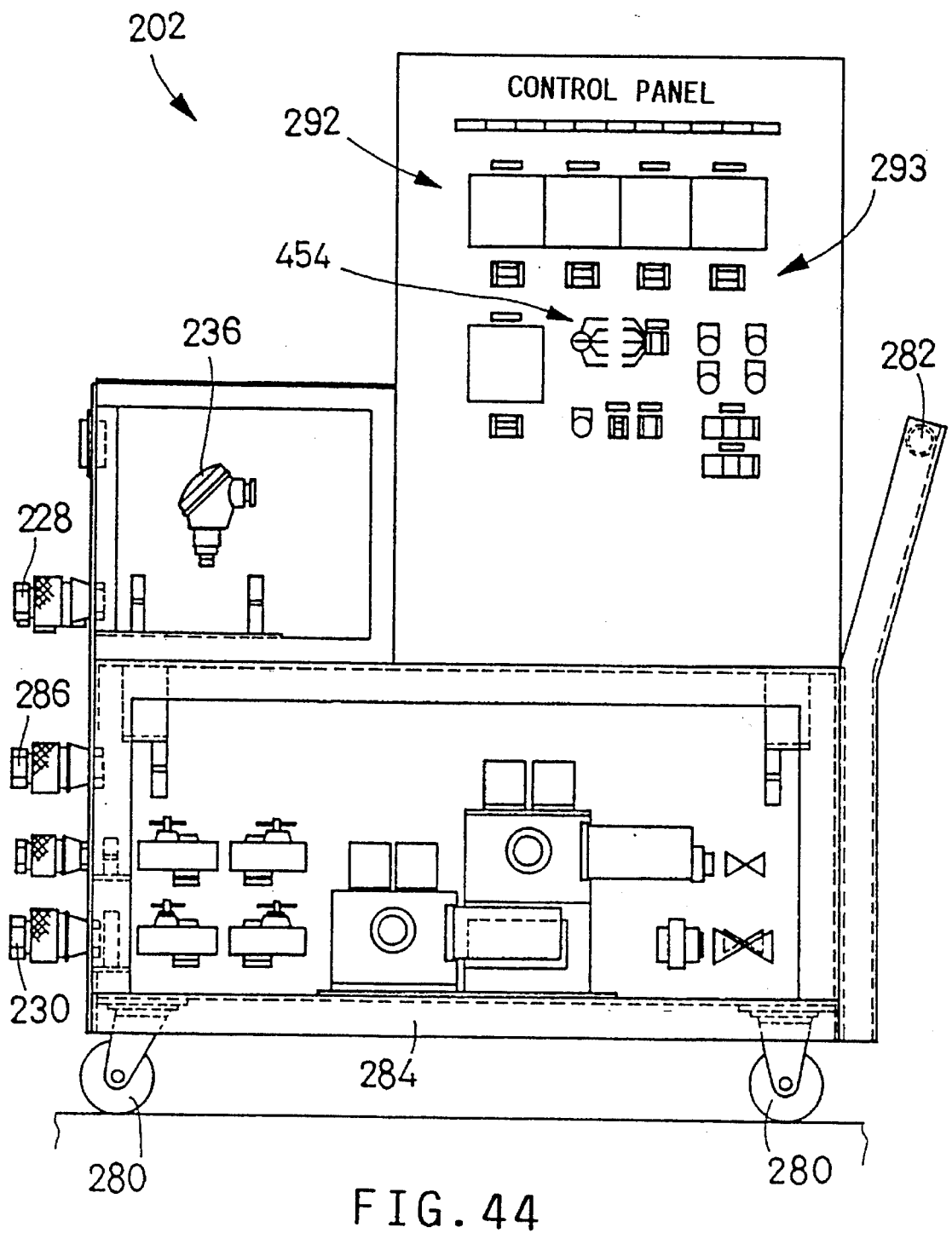

As in the second embodiment, the controller 452 is provided in the control console 202 as shown in FIG. 44. Unlike the controller 296 of the second embodiment, the controller 452 is adapted to receive an output signal of a manual adjusting device 454 similar to the device 440 of the fifth embodiment of FIGS. 39–41. The manual adjusting device 454 is provided as one of the adjusting switches 293 on the control panel of the control console 202, as shown in FIG. 44. As indicated in FIG. 43, the output signal of the manual adjusting device 454 representative of the adjusting amount ΔFs is applied to the Pex calculating blocks 456a–456d. With an appropriate ON-OFF switch turned ON, the adjusting amount ΔFs manually entered through the manual adjusting device 454 is made effective, and the Pex calculating blocks 456a–456d calculate the optimum pneumatic pressures Pex of the cylinders 184, according to the following equation (12), which includes a parameter equal to a quarter of the adjusting amount ΔFs.

$$Fsoi + \Delta Fs/4 = (Ax \cdot Az/Ay)\{(Pex + Pt)[Ve/(Ve - Az \cdot Y)] - Pt\} \qquad (12)$$

The Pe adjusting blocks 4587a–458d control the respective pressure control valves 214a–214d, according to the optimum pneumatic pressures Pex calculated by the blocks 456. As a result, the total holding force Fs (sum of the four components Fsi associated with the four cylinders 184) is changed by the amount ΔFs. Thus, the present arrangement is not adapted to adjust the individual load values Fsi by changing the distances ha, but to directly change the components Fsi as produced by the pneumatic pressures Pe, as indicated by arrows Q in the graph of FIG. 45. The optimum holding force Fs, that is, the optimum adjusting amount ΔFs manually entered through the device 454 can be found out by observing the degree of cracking and wrinkling of the products obtained in test operations with different adjusting amounts ΔFs, as explained above with respect to the fifth embodiment of FIGS. 39–41.

The present sixth embodiment also permits easy, fast and accurate adjustment of the holding force Fs by means of the pneumatic pressure values Pe of the four fluid-actuated cylinders 184 of the force applying device 191, by using the manual adjusting device 454.

Further, the pneumatic pressures Px of the four cylinders 184 are simultaneously adjusted by entering the adjusting amount ΔFs for the total holding force Fs (optimum total holding force Fso). In this respect, too, the required adjusting time for the individual cylinders 184 is considerably shortened. Although the pressure Pe of each cylinder 184 can be adjusted by observing the load value Fsi detected by the strain gages 178 (which corresponds to each of the four components of the total holding force Fs), this procedure takes a relatively long time, that is, four times that required in the present sixth embodiment in which the adjusting amount ΔFs is used for all the four cylinders 184.

While the fifth and sixth embodiments are adapted to add the manually entered adjusting amount ΔFs to the predetermined optimum holding force Fso (as specified by the die set information stored in the ID card 306) for calculating the optimum pressure Pax or optimum pressures Pex, it is possible to suitably modify the manner of adjusting the pneumatic pressure Pa or pressures Pex in relation to the adjusting amount ΔFs. For example, the fifth embodiment may be modified such that an amount of change ΔPa of the pressure Pa is calculated according to the following equation (13), on the basis of the adjusting amount ΔFs. In this case, the Pa adjusting block 436 controls the pressure control valve 46 so that the pressure Pa is changed by the calculated amount ΔPa. This modification also applies to the sixth embodiment.

$$\Delta Pa = \Delta Fs / As \quad (13)$$

In the fifth and sixth embodiments, the pneumatic pressures Pa and Pe are initially adjusted automatically under the control of the controller 430, 452. However, the principle of adjustment of the holding force Fs (pneumatic pressure Pa, Pe) according to the fifth and sixth embodiments is applicable to the initial adjustment of the pressures Pa, Pe by a trial-and-error procedure. The initially adjusted value Fs, Fsi need not be known before a production run of the press is started. In the case of initial adjustment of the pneumatic pressure Pa, for example, an amount of change ΔFs in the holding force Fs is determined by a test operation, a suitable amount of change ΔPa in the pneumatic pressure Pa is calculated according to the above equation (13), and the actual pneumatic pressure Pa is changed by the calculated amount ΔPa.

Although the manual adjusting device 440 is constructed as shown in FIG. 40 and the device 454 is similarly constructed, these devices 440, 454 may be replaced by other devices, for example, a device having ten keys corresponding to the ten digits for entering the adjusting amount ΔFs.

Figure 46:
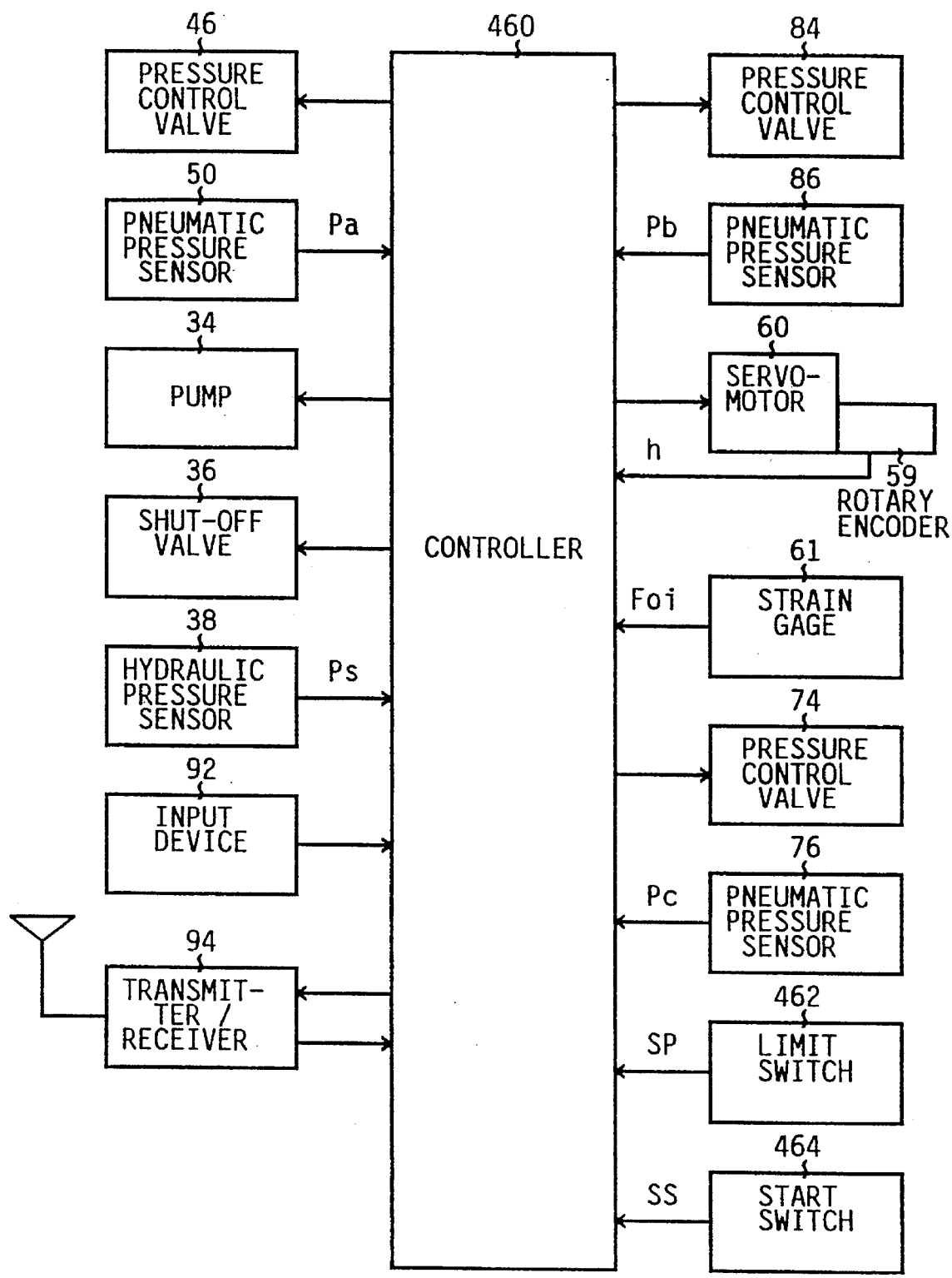
FIG. 46 is a block diagram corresponding to that of FIG. 3 of the first embodiment, showing a control system according to a seventh embodiment of the invention.
Figure 47:
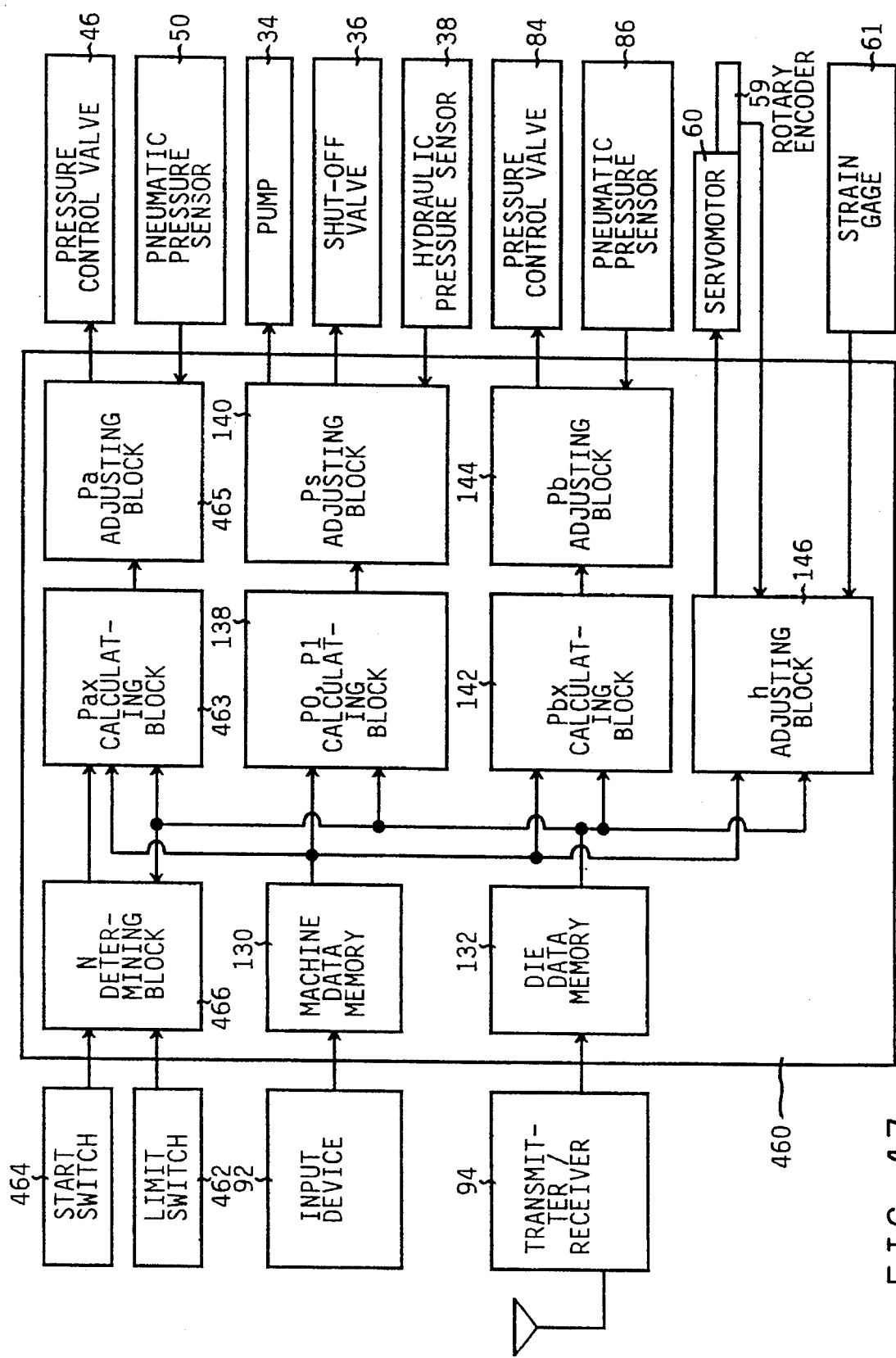
FIG. 47 is a block diagram corresponding to that of FIG. 4, showing functions of a controller used in the seventh embodiment.

Referring next to FIGS. 46–49, there will be described a seventh embodiment of the present invention, which is identical with the first embodiment of FIGS. 1–11, except for the use of a controller 460 as shown in FIGS. 46 and 47, and a limit switch 462 and a START switch 464 connected to the controller 460. The controller 460 and the switches 463, 464 will described. In the present seventh embodiment, the die set data memory 125 of the ID card 96 provided on each punch 12 available on the press 10 as shown in FIG. 1 stores data indicative of a Fso-N relationship, and data indicative of an α-T relationship.

The Fso-N relationship is a relationship between the optimum holding pressure Fso, and the number N which indicates a range of the number of successive pressing cycles which have been performed on the press 10 during each pressing job. Like the optimum pressing force Fpoi whose data are also stored in the die set data memory 125, the optimum holding force Fso is determined by a test operation on a test or trial press, so as to assure an adequate pressing operation without cracking of the product formed from the blank, such that the determined optimum holding force Fso does not include components due to the influences of the weight of the die set and the sliding resistances of the components of the press. In the present embodiment, the optimum holding force Fso is thus determined for each of different ranges of the number of the pressing cycles performed on the successively loaded blanks. The Fso-N relationship is used because the optimum holding force Fso changes, more precisely, decreases with an increase in the cumulative number of the pressing cycles performed, since the temperature of the die set (12, 18, 30) increases as the pressing job continues on the successive blanks. More specifically, the temperature of the blank holding portion of the die set gradually increases with heat generated during a continuous pressing job due to the sliding resistance μ of the blanks with respect to the upper die 18 and the pressure ring 30. A rise in the temperature of the die set causes changes in the property of the lubricating oil deposited on the blank and in the friction characteristics of the die set and blank, and leads to increased volatility of the lubricating oil and consequent increase in the sliding resistance μ, whereby the tensile force Te acting on the blank under drawing is increased. The Fso-N relationship is obtained by a test pressing operation performed under the same conditions as an actual production run on successive blanks, particularly in terms of the lubricating condition. The Fso-N relationship is determined by observing the change in the temperature of the die set and the degree of cracking of the test specimens.

An example of the Fso-N relationship is indicated in TABLE 1 below, in which the number N is incremented with an increase in the number of the pressing cycles in increments of a predetermined value Co, for example, about 100. Suppose the predetermined value Co is 100, the number N is equal to "1" when the cumulative number of the pressing cycles is 50, and equal to "2" when the number of the cycles is 160, for instance. The optimum holding force Fso is determined for each incremental value of the number N. That is, the optimum holding force Fso decreases with an increase in the number N (the number of the pressing cycles). The value Fso is the total holding force, which is the sum (Fo) of the load values Foi detected by the strain gages 61 described above with respect to the first embodiment.

TABLE 1

| N | Number of Pressing Cycles | Optimum Holding Force Fso |
|---|---|---|
| 1 | 0~Co | 100 tf |
| 2 | Co + 1~2 Co | 98 tf |
| 3 | 2 Co + 1~3 Co | 96 tf |
| 4 | 3 Co + 1~4 Co | 89 tf |
| 5 | 4 Co + 1~5 Co | 86 tf |

Figure 49:
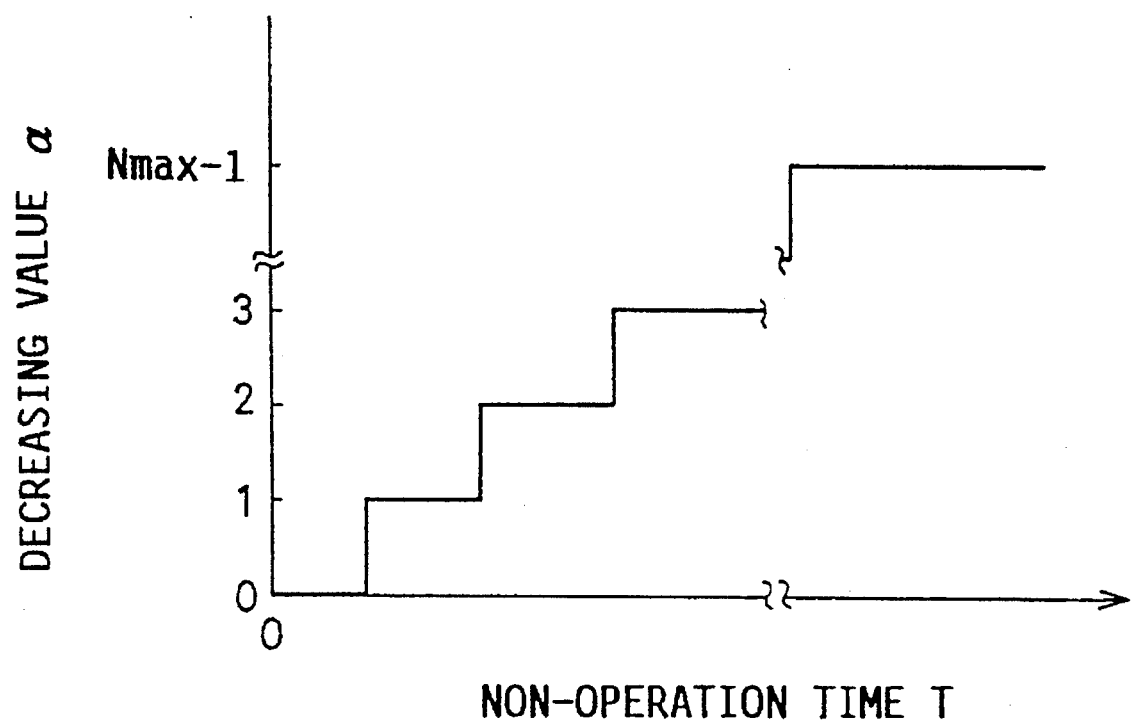
FIG. 49 is a graph indicating an example of an $\alpha$-T relationship received as one item of the die set information.

The α-T relationship is a relationship between a decreasing value α used to determine the effective number N used by an N determining block 466 (which will be described) of the controller 460, and a non-operation time T of the press 10 during which the operation of the press 10 is interrupted or temporarily stopped during a continuous pressing job on successive blanks. The decreasing value α determined by this α-T relationship is subtracted from the number N as determined by the actual number of the pressing cycles. The α-T relationship is formulated such that the decreasing value α increases with the non-operation time T, as indicated in the graph of FIG. 49 by way of example. Namely, the optimum holding force Fso increases with an increase in the non-operation time T, even with the same number of the pressing cycles.

The rationale of the α-T relationship is such that the temperature of the upper die 18 and pressure ring 30 rises during a continuous pressing job, up to a level at which the amount of heat Qs generated due to the sliding resistance is counterbalanced by the amount of heat radiation, while the temperature drops due to the heat radiation during interruption of the pressing job, depending upon the amount of heat radiated during the interruption. Thus, the change in the temperature of the die set due to the interruption of the pressing job influences the lubricating condition and the sliding resistance μ of the blank. If the pressing job is resumed with the same holding force, the tensile force acting on the blank decreases with a decrease in the sliding resistance μ, whereby the product formed by the pressing tends to suffer from wrinkling. On the other hand, if the pressing job is resumed with the initial holding force, i.e., the holding force Fso corresponding to the initial number N=1, the tensile force Te acting on the blank tends to be excessively large, causing the product to crack. In view of the above phenomenon, the α-T relationship is used to determine the effective number N (which determines the optimum holding force Fso), depending upon the non-operation time T (interruption time of the pressing job). In the graph of FIG. 9, "Nmax" appearing in (Nmax−1) corresponds to the maximum value of the number N, at which the heat generation amount Qs is almost counterbalanced by the heat radiation amount, and at which the optimum holding force Fso is the smallest. Generally, the temperature of the die set falls down to the ambient or room temperature in about one hour of interruption of the pressing job, and the decreasing value α is fixed at its maximum (Nmax−1) after the interruption or interruption time T exceeds about one hour.

Referring back to FIG. 46, the limit switch 462 is turned ON when the main slide 20 is lowered to its lower stroke end, and thus applies a signal SP to the controller 460 each time one pressing cycle is performed on the press 10, that is, each time one blank is drawn into a desired product. The START switch 464 is turned ON to start a pressing job or resume the interrupted job, and turned OFF to interrupt or terminate the pressing job. A signal SS generated by this switch 464 applied to the controller 460 indicates the operating and non-operating states of the press 10.

The functions of the controller 460 are indicated in the block diagram of FIG. 47. The controller 460 is identical in function with the controller 90 of the first embodiment, except for the addition of the N determining block 466 indicated above, and a Pax calculating block 463 and a Pa adjusting block 465. For initial adjustment of the pneumatic pressure Pa of the pneumatic cylinder 42 (initial adjustment of the holding force Fso), the Pax calculating block 463 and the Pa adjusting block 465 operate in the same manner as explained with respect to the first embodiment, i.e., adjust the initial pneumatic pressure Pa according to the optimum pneumatic pressure Pax calculated according to the equation (1) indicated above. That is, the N determining block 466 selects "1" as the effective number N, so that the holding force Fs is initially adjusted to the optimum value (e.g., 100tf in this specific embodiment) Fso corresponding to the number N=1.

The functions of the other functional blocks 138, 140, 142, 144 and 146 are the same as described above with respect to the first embodiment.

After the pneumatic pressures Pa, Pb, hydraulic pressure Ps and distance h have been initially adjusted under the control of the controller 460 on the basis of the machine and die set information (stored in the memories 130, 132), the production run of the press 10 is initiated. In this case, the pneumatic pressure Pa is adjusted depending upon the number of the pressing cycles in progress and the non-operation time T. Described in detail, the N determining block 466 determines the effective number N on the basis of the signals SP and SS received from the limit switch 462 and the START switch 464, that is, on the basis of the number of the pressing cycles) and the non-operation time T (decreasing value α), and the Pax calculating block 463 uses the optimum holding force Fso determined by the determined effective number N, to calculate the optimum pneumatic pressure Pax.

Figure 48:
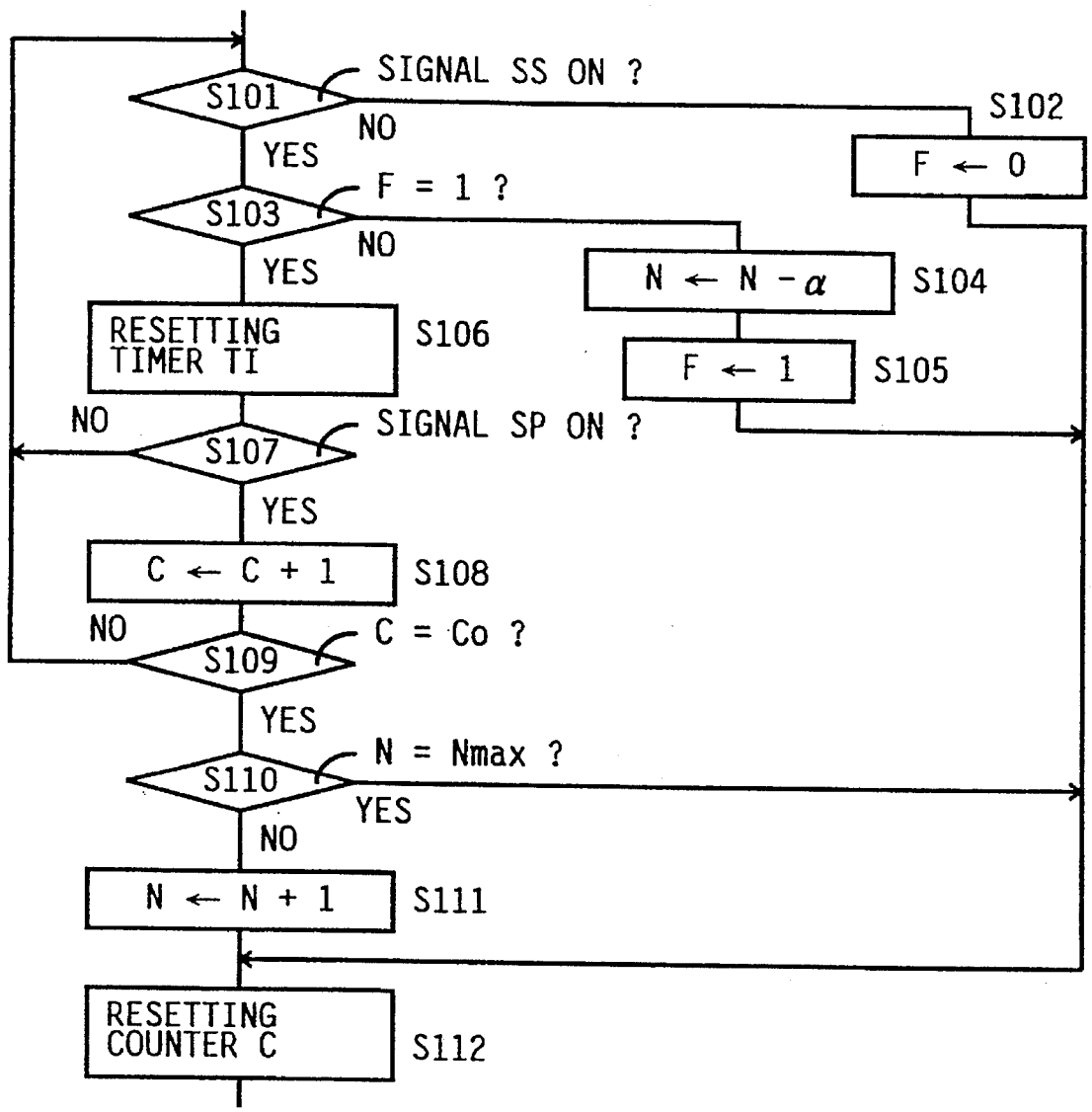
FIG. 48 is a flow chart illustrating an operation performed by functional block 466 of the controller of FIG. 47.

The details of the function of the N determining block 466 are illustrated in the flow chart of FIG. 48. The control routine of this flow chart is executed at a suitable cycle time. Initially step S101 is implemented to determine whether the signal SS is ON or not. If a negative decision (NO) is obtained in step S101, a flag F is set to "0" in step S102. When the signal SS is turned ON, step S101 is followed by step S103 to determine whether the flag F is set at "1" or not. Since the flag F is set at "0" immediately after a pressing job is started, a negative decision (NO) is obtained in step S103, and the control flow goes to step S104 to determine the effective number N on the basis of the number N determined by the current content of a counter C, and the decreasing number α determined by the current content of a timer TI. As described below, the counter C is incremented each time the signal SP is turned ON, while the timer TI is reset each time the START switch 464 is turned ON. The content of the timer TI upon implementation of step S104 represents the non-operation time T between the moment when the START switch 464 was turned OFF and the moment when the same switch 464 is turned ON to resume the interrupted pressing job. The decreasing value α is determined according to the α-T relationship of FIG. 49, and on the basis of the non-operation time T, and the determined decreasing value α is subtracted from the number N determined by the current content of the counter C. Thus, the effective number N is determined or updated. The updated effective number N is applied to the Pax calculating block 463, which in turn determines the optimum holding force Fso according to the Fso-N relationship of TABLE 1, and on the basis of the effective number N. The Pax calculating block 463 calculates the optimum pneumatic pressure Pax according to the equation (1) and on the basis of the optimum holding force Fso determined. The Pa adjusting block 465 adjusts the pneumatic pressure Pa according to the thus calculated optimum pneumatic pressure Pax. In the present embodiment, therefore, the actual holding force Fs can be suitably adjusted depending upon the number of the pressing cycles performed and the non-operation time T. The present arrangement permits pressing operations without cracking or wrinkling of the products, even in a period immediately after the interruption of the pressing job, namely, even after the pressing conditions such as the lubricating condition and the sliding resistance $\mu$ of the blank have changed due to a temperature drop of the die set (12, 18, 30) during the interruption.

It is noted that if the decreasing value $\alpha$ determined by the non-operation time T is equal to or larger than the number N as determined by the number of the pressing cycles, the effective number N is set at "1". The $\alpha$-T relationship as indicated in the graph of FIG. 49 is the relationship when the number N is at a maximum (Nmax), i.e., when the temperature of the die set is substantially constant at a highest level. Since the temperature drop characteristic of the die set varies depending upon the temperature when the pressing job is interrupted, the $\alpha$-T relationship may be desirably provided for each value of the number N as determined by the number of the pressing cycles.

Step S104 is followed by step S105 to set the flag F to "1". In the next cycle of execution of the control routine, an affirmative decision (YES) is obtained in step S103, and step S106 is implemented to reset the timer TI. Then, step S107 is implemented to determine whether the signal SP is ON or not. If the signal SP is ON, namely, each time a pressing cycle is performed with the main slide 20 lowered to its lower stroke end, the counter C is incremented in step S108. Then, the control flow goes to step S109 to determine whether the content of the counter c has become equal to the predetermined value Co or not. If an affirmative decision (YES) is obtained in step S109, step S111 is implemented to determine whether the effective number N is equal to Nmax or not. If an affirmative decision (YES) is obtained in step S110, step S112 is implemented to clear the counter C, and the control flow returns to step S101. If a negative decision (NO) is obtained in step S110, step S111 is implemented to add "1" to the effective number N to update the effective number N. It will therefore be understood that the effective number N is incremented each time the pressing cycles are performed the predetermined number of times Co. The thus determined effective number N is sent to the Pax calculating block 463, so that the Pax calculating block 463 determines the optimum holding force Fso, according to the Fso-N relationship of TABLE 1 stored in the die data memory 132, and calculates the optimum pneumatic pressure Pax according to the above equation (1) and on the basis of the determined effective number N. The Pa adjusting block 465 controls the pressure control valve 46 to adjust the pneumatic pressure Pa to the calculated optimum value Pax. Thus, the holding force Fs is adjusted depending upon the number of the pressing cycles performed, namely, depending upon the temperature of the die set, which increases as the number of the pressing cycles increases. Accordingly, the present arrangement assures a pressing job without cracking of the products formed from the blanks, even if the sliding resistance $\mu$ of the blanks is increased due to the change in the lubricating characteristic as a result of the temperature rise of the die set. The predetermined value Co and maximum value Nmax are suitably determined so as to optimize the Fso-N relationship.

According to the present seventh embodiment, the optimum holding force Fso is reduced with an increase in the number of the pressing cycles performed, according to the Fso-N relationship of TABLE 1, whereby the pneumatic pressure Pa and the actual holding force Fs are accordingly decreased as the pressing job continues. Further, the optimum holding force Fso is increased with an increase in the non-operation time T, according to the $\alpha$-T relationship of FIG. 49, whereby the pneumatic pressure Pa and the actual holding force Fs are accordingly increased. Hence, the actual holding force Fs is controlled to an optimum level, to assure adequate pressing operations without cracking of the products, irrespective of the variation in the temperature of the die set and the variation in the sliding resistance $\mu$ of the blanks. Moreover, since the pneumatic pressure Pa and the holding force Fs are reduced with the increase in the number of the pressing cycles, the die set is protected against early wearing due to the excessive tensile force Te on the blanks. Further, the amount of heat Qs generated is reduced, and the temperature of the die set at which the generated heat amount Qs is counterbalanced with the radiated heat amount, whereby the influences of the generated are reduced throughout the pressing job.

It will be understood from the above description of the seventh embodiment of the invention that the Pa adjusting block 465 of the controller 460 cooperates with the pressure control valve 46 and sensor 50 to constitute adjusting means for adjusting the actual holding force Fs. It will also be understood that the N determining block 466 (steps S107 and S108) and the limit switch 462 constitute counting means for counting the number of the pressing cycles performed, while the N determining block 466 (steps S101, S102 and S106) cooperates with the START switch 464 and the timer TI to constitute time measuring means for measuring the non-operation time T. Further, the N determining block 466 and the Pax calculating block 463 of the controller 460 constitute control means for controlling the adjusting means (465, 46, 50) so that the holding force Fs decreases with an increase in the number of the pressing cycles, and increases with an increase in the non-operation time T.

Figure 50:
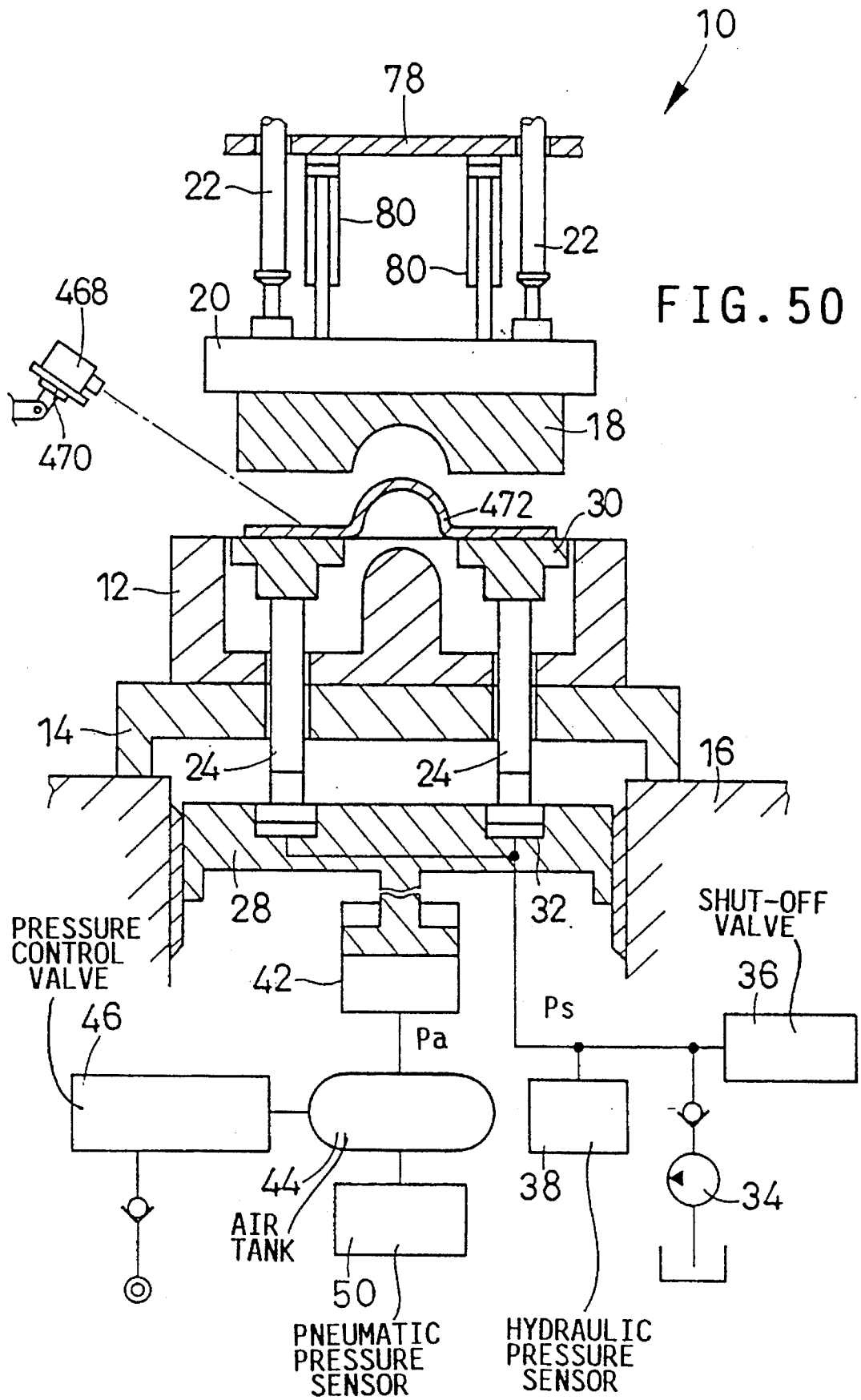
FIG. 50 is an elevational view showing a radiation thermometer used according to an eighth embodiment of the invention, to detect the temperature of a product produced on a press similar to that of FIG. 1.
Figure 51:
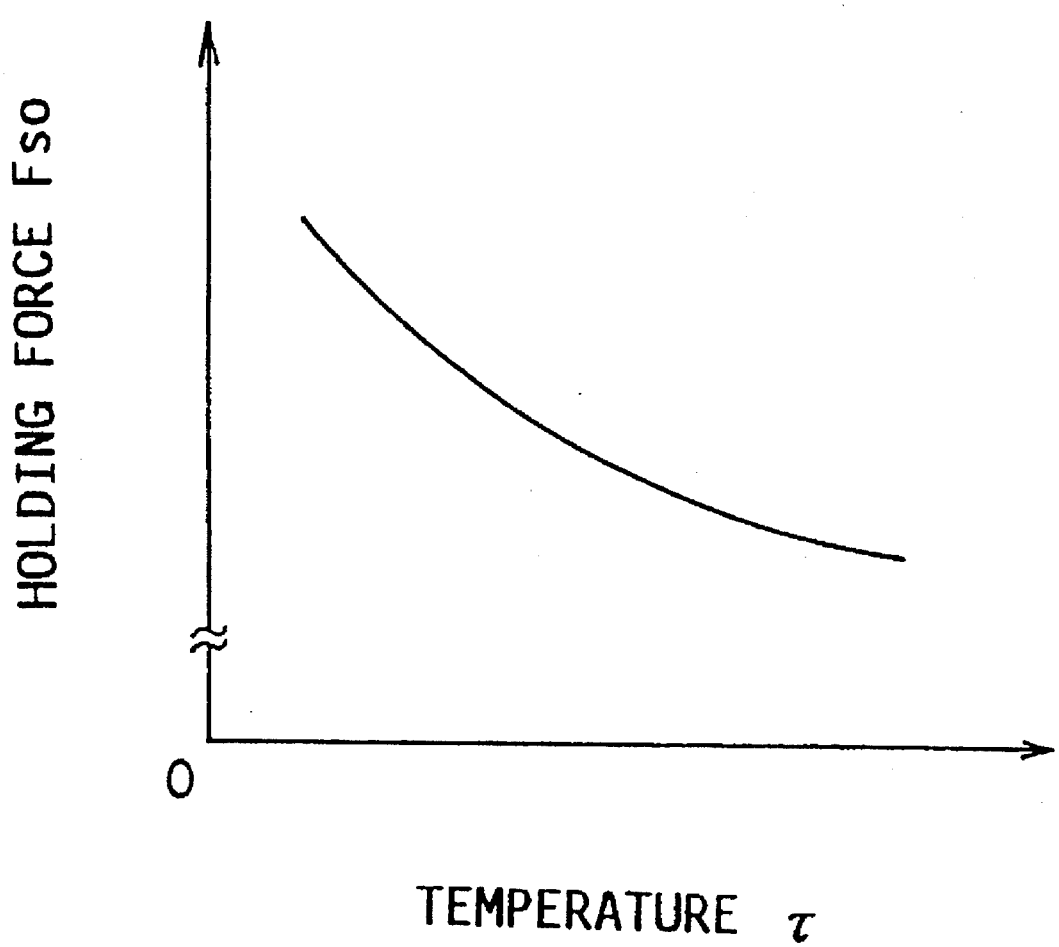
FIG. 51 is a graph indicating an example of an Fso-$\tau$ relationship received as one item of the die set information.
Figure 52:
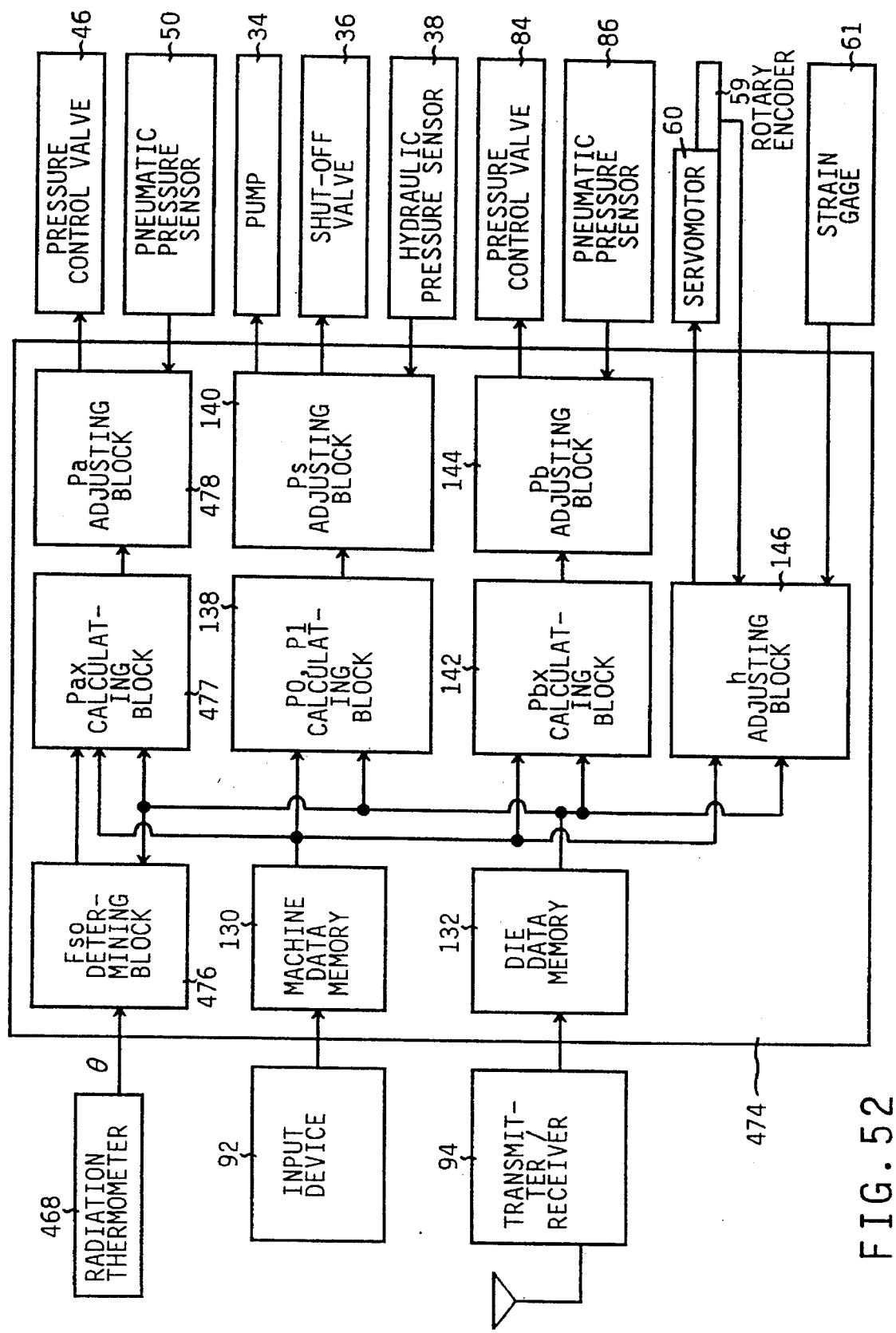
FIG. 52 is a block diagram corresponding to that of FIG. 4, showing functions of a controller used in the eighth embodiment.

Reference is now made to FIGS. 50–52, which show an eighth embodiment of the present invention, which is identical with the first and seventh embodiments, except for the use of a controller 474 as shown in FIG. 52, and a radiation thermometer 468 mounted on a bracket 470 fixed to the machine frame 78 as shown in FIG. 50. The radiation thermometer 468 is provided to detect the temperature $\theta$ of the product 472 formed from a blank as a result of a drawing operation. The thermometer 468 is a non-contact type temperature sensor capable of detecting the temperature based on an energy of radiated heat. In operation of the thermometer 468, a visible radiation is emitted to irradiate the area of the product 472 whose temperature is to be measured. The irradiated measuring area can be visually confirmed by the operator of the machine. The bracket 352 permits orientation of the radiation thermometer 468 as needed depending upon the shape of the product 472 and other factors. The thermometer 468 is oriented so as to irradiate the area in which the temperature of the product 472 is the highest, namely, to measure the temperature $\theta$ of the portion of the product 472 whose thickness has been increased to the largest extent by a drawing action on the blank and in which the temperature is most likely to rise due to the sliding resistance $\mu$ of the blank with respect to the upper die 18 and pressure ring 30. For improved accuracy of measurement of the temperature of the product 472, two more thermometers 468 are preferably used to detect the temperatures in different areas of the product 472, depending upon the shape of the product.

In the present embodiment, the die set data memory 125 of the ID card 96 stores data indicative of a Fso-θ relationship in place of the Fso-N and α-T relationships used in the preceding seventh embodiment of FIGS. 46–49. The Fso-θ relationship is a relationship between the optimum holding force Fso and the temperature θ of the product 472 as detected by the radiation thermometer 468. The optimum holding force Fso within the same meaning as described above with respect to the Fso-N relationship is determined by a test operation on a test or trial press, in relation to the temperature θ of the product 472. As described above, the optimum holding force Fso decreases with an increase in the temperature of the die set, i.e., in the temperature θ of the product 472. An example of the Fso-θ is indicated by the graph of FIG. 51. The Fso-θ relationship is used for the same reasons as described above on the Fso-N relationship. That is, the optimum holding force Fso varies with an increase in the temperature of the die set (12, 18, 30) during a continuous pressing job, due to the sliding resistance μ, and the temperature rise changes the property of the lubricating oil on the blank and the friction characteristics of the die set and blank, leading to increased volatility of the oil and consequent increase in the sliding resistance μ and the tensile force Te. Like the Fso-N relationship, the Fso-θ relationship is obtained by a test pressing operation performed under the same conditions as an actual production run.

As shown in FIG. 52, the controller 474 includes an Fso determining block 476 in place of the N determining block 466 used in the seventh embodiment of FIG. 47. The Fso determining block 476 receives an output of the radiation thermometer 468 indicative of the temperature θ of the product 472, and also receive from the die data memory 132 the data indicative of the Fso-θ relationship. In operation, the block 476 determines the optimum holding force Fso according to the Fso-θ relationship and on the basis of the temperature θ, so that the optimum holding force Fso used by a Pax calculating block 477 is updated depending upon the varying temperature θ. The thus updated optimum holding force Fso, which assures an adequate pressing operation at the temperature θ without cracking of the product 472, is applied to the Pax calculating block 477, to calculate the optimum pneumatic pressure Pax according to the equation (1) and on the basis of the optimum holding force Fso. Based on the calculated optimum pneumatic pressure Pa, a Pa adjusting block 478 operates to adjust the actual pressure Pa to the calculated optimum value Pa.

According to the present arrangement, the optimum holding force Fso is reduced to lower the pneumatic pressure Pa with an increase in the temperature θ and the sliding resistance μ, while on the other hand the optimum holding force Fso is increased to increase the pressure Pa with a decrease in the temperature θ and the sliding resistance μ. Accordingly, the tensile force Te acting on the blanks is maintained at an optimum level irrespective of the varying temperature θ and sliding resistance μ, whereby the product 472 is protected from cracking or wrinkling, and the die set is protected against early wearing due to the excessive tensile force Te. Further, the holding force Fs thus controlled to decrease with the rise of the temperature θ contributes to lowering the amount of heat Qs generated, thereby lowering the temperature θ at which the generated heat amount Qs is counterbalanced by the radiated heat amount, whereby the influences of the generated heat are reduced throughout a pressing job.

It will be understood that the Pa adjusting block 478, control valve 46 and pressure sensor 50 constitute adjusting means for adjusting the actual holding force Fs, while the Fso determining block 476 and the Pax calculating block 477 constitute control means for controlling the adjusting means to change the holding force Fs in relation to the temperature θ of the product 472.

Figure 53A:
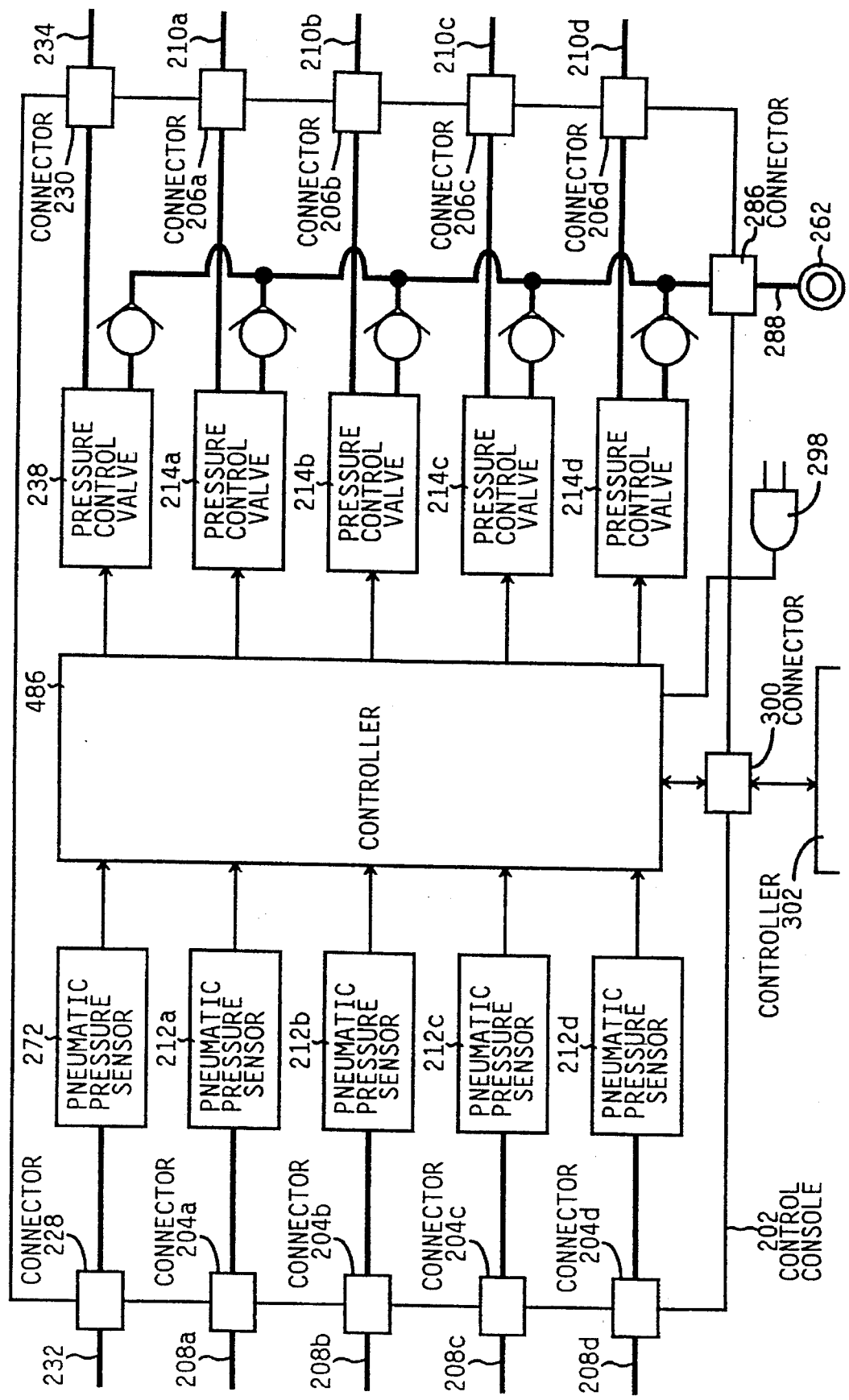
FIGS. 53A, 53B and 54 are block diagrams corresponding to those of FIGS. 15A, 15B and 16, showing a control system used in a ninth embodiment of this invention.
Figure 53B:
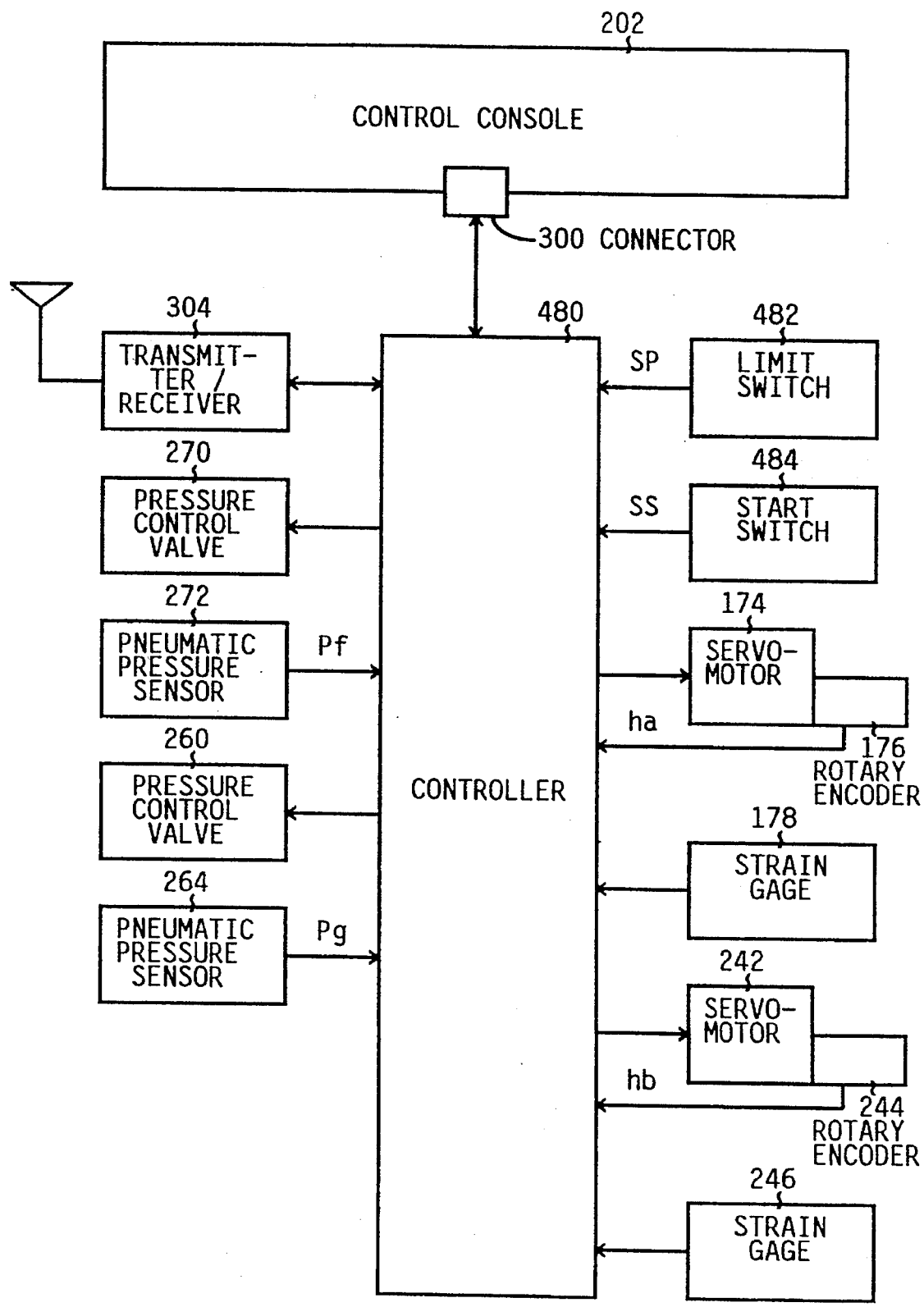
Figure 54:
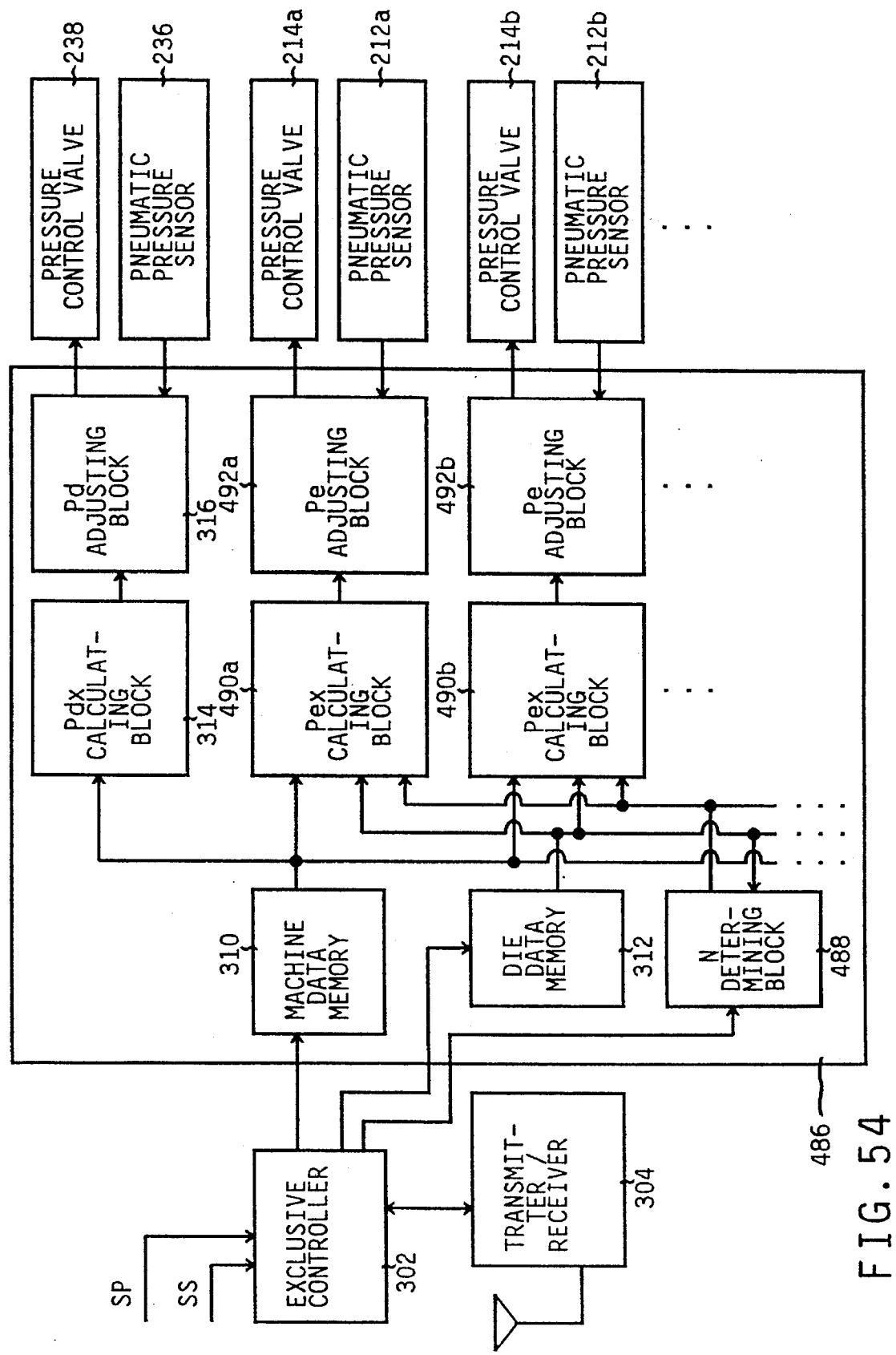

Referring next to FIGS. 53A, 53B and 54, there will be described a ninth embodiment of this invention, which is identical with the second embodiment of FIGS. 12–22, except for the use of an exclusive controller 480, a limit switch 482, a START switch 484 and a controller 486. The limit switch 482 and the START switch 484 are connected to the exclusive controller 480, and are identical in function with the switches 462, 464 used in the seventh embodiment of FIGS. 46–49. As in the second embodiment, the controller 486 is incorporated within the stand-alone control console 202 as illustrated in FIGS. 18 and 19. The controller 486 includes an N determining block 488, four Pex calculating blocks 490a–490d (only 490a and 490b indicated in FIG. 54 by way of example) corresponding to the four die-height adjusting mechanisms 172, and four Pe adjusting blocks 492a–492d (only 492a and 494b indicated in FIG. 54).

The signals SP and SS of the limit switch 482 and the START switch 484 are sent to the N determining block 488 of the controller 486. Further, the die data memory 312 is adapted to receive from the ID card 306 data indicative of a Fsoi-N relationship and data indicative of an α-T relationship similar to that of FIG. 49 used in the seventh embodiment.

The Fsoi-N relationship is determined for each of the four die-height adjusting mechanisms 172 (each of the four cylinders 184) corresponding to the four outer plungers 166 of the outer slide 160 of the double-action press 150. Each of these Fsoi-N relationships may be determined by a test operation in the same manner and is used for the same reasons as described above with respect to the Fso-N relationship used in the seventh embodiment. It is noted, however, the value Fsoi is an optimum value of the component of the optimum holding force Fso associated with the corresponding mechanism 172 (outer plunger 166). In the test operation, the load value Fai detected by the strain gages 178 is used to determine the corresponding component Fsoi in relation to the number N (number of the pressing cycles). An example of the Fsoi-N relationship is indicated in TABLE 2 below.

TABLE 2

| N | Number of Pressing Cycles | Optimum Holding Force Component Fsoi (tf) | | | |
|---|---|---|---|---|---|
| 1 | 0–Co | 25 | 25 | 25 | 25 |
| 2 | Co + 1–2 Co | 23 | 25 | 25 | 25 |
| 3 | 2 Co + 1–3 Co | 23 | 23 | 25 | 25 |
| 4 | 3 Co + 1–4 Co | 20 | 23 | 23 | 23 |
| 5 | 4 Co + 1–5 Co | 20 | 20 | 23 | 23 |

For initial adjustment of the holding force Fs, the Pex calculating blocks 490a–490d determine the optimum holding force components Fsoi which correspond to the effective number N=1, and calculate the corresponding optimum pneumatic pressure levels Pex. The corresponding pneumatic pressure levels Pe are adjusted by the Pe adjusting blocks 492a–492d based on the calculated optimum values Pex. Thus, the total holding force Fs is initially adjusted.

In a production run of the press 150, the four components Fsi of the actual holding force Fs are adjusted independently of each other, depending upon the number of the pressing cycles (effective number N) and the non-operation time T (decreasing value α), in a manner similar to that shown in the flow chart of FIG. 48. Briefly, the effective number N is determined by the N determining block 488, on the basis of the signals SP and SS, namely, the number of the pressing cycles and the non-operation time T. The optimum component Fsoi for each of the four mechanisms 172 is determined by the appropriate Pex calculating block 490, according to the corresponding Fsoi-N relationship stored in the die data memory 312 and on the basis of the determined effective number N. The Pex calculating block 490 calculates the optimum pressure Pex for each of the four cylinders 194. Finally, the appropriate Pe adjusting block 492 controls the corresponding pressure control valve 214 to adjust the pneumatic pressure Pe of the corresponding cylinder 184 according to the calculated optimum pressure Pex. Thus, each component Fsi of the holding force Fs is adjusted as indicated by arrows Q in the graph of FIG. 45.

In the present ninth embodiment, each of the four components Fsoi of the optimum holding force Fso are decreased with in increase in the number of the pressing cycles, according to the Fsoi-N relationships, whereby the corresponding pressure levels Pe are lowered as the operation time of the press 150 increases. On the other hand, the components Fsoi are increased with an increase in the non-operation or interruption time T of the press. Therefore, if the pressing job is interrupted, the pressure levels Pe are increased with the non-operation time.

In the ninth embodiment, the Pe adjusting blocks 492a–492d, pressure control valves 214a–d and pressure sensors 212a–d constitute adjusting means for adjusting the holding force Fs, while the N determining block 488 and the limit switch 482 constitute counting means for counting the number of the pressing cycles. The N determining block 488 and the START switch 484 (and the timer TI) constitute time measuring means for measuring the non-operation time T. Further, the N determining block 488 and the Pex calculating blocks 490a–d constitute control means for controlling the adjusting means to adjust the holding force Fs (components Fsi) depending upon the number of the pressing cycles performed and the non-operation time T.

Although the seventh and ninth embodiments are adapted such that the optimum holding force Fso or component Fsoi is changed each time the number of the pressing cycles increases by the predetermined value Co (e.g., about 100), the relationship between the value Fso (Fsoi) and the number of the pressing cycles may be suitably modified. For instance, if a pressing job causes a comparatively fast rise of the temperature of the die set, the value Fso, Fsoi may be changed more frequently or at a higher rate in an initial period of the pressing job, than in the following period. That is, the comparatively small values Co are used in the initial period.

In the seventh and ninth embodiments, the limit switches 462, 482 are used to detect the lower stroke end of the slide 20, 160 (plungers 22, 166), other means may be used to count the number of the pressing cycles. For example, the number of the pressing cycles may be counted based on the number of rotation or rotating angle of the crankshaft of the press 10, 150.

While the eighth embodiment is adapted to detect the temperature θ of the upper surface of the product 474, the portion whose temperature is measured may be suitably selected, depending upon the specific construction of the press and the configuration of the die set (including the surface condition of the die set, e.g., plated or non-plated surface). For instance, suitable temperature detecting means is provided to measure the temperature of the lower surface of the product 472, or the surface of the upper die 18 or pressure ring 30 which contacts the blank.

While the radiation thermometer 468 used in the eight embodiment is attached to the machine frame 78, it may be attached to the bolster 14, main slide 20, punch 12 or upper die 18.

It will be understood that the principle of the eighth embodiment using the thermometer 468 is applicable to the double-action press 150. In this case, the suitable temperature detecting means may be provided for each of the four portions corresponding to the four outer plungers 166 (four components or load values Fsi which can be adjusted independently of each other).

In the seventh, eighth and ninth embodiments, the pneumatic pressures Pa and Pe are initially adjusted automatically under the control of the controller 460, 474, 486. However, the principle of adjustment of the holding force Fs (pneumatic pressure Pa, Pe) according to the seventh, eighth and ninth embodiments is applicable to the initial adjustment of the pressures Pa, Pe by a trial-and-error procedure. In the case of initial adjustment of the pneumatic pressure Pa, for example, an amount of change ΔFa in the holding force Fs is determined by a test operation, in which the degree of cracking or wrinkling of the products is observed in relation to a change in the number of pressing cycles and a change in the die set temperature during the test pressing operation. Then, a suitable amount of change ΔPa in the pneumatic pressure Pa is calculated according to the above equation (13), and the actual pneumatic pressure Pa is changed by the calculated amount ΔPa. The initially adjusted value Fs, Fsi need not be known before a production run of the press is started.

Figure 45:
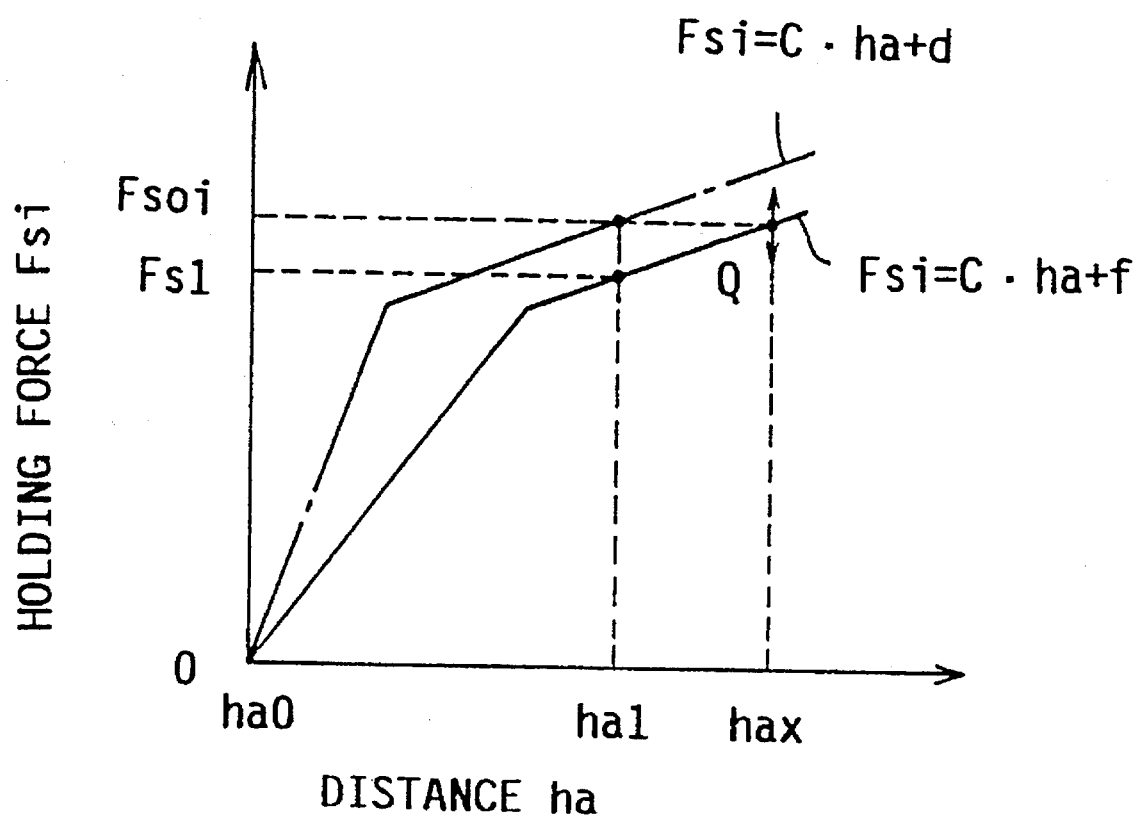

Although the ninth embodiment is adapted to adjust the pneumatic pressures Pe to adjust the components Fsi of the holding force Fs, the distances ha of the die-height adjusting mechanisms 172 may be adjusted according to the Fsi-ha relationship (Fsi=c·ha+f) of FIG. 45, to adjust the pneumatic pressures Pe depending upon the number of the pressing cycle and the non-operation time.

While the present invention has been described in detail in its preferred embodiments, it is to be understood that the invention may be otherwise embodied.

For instance, the presses 10, 150 adapted to perform a drawing operation may be modified to perform other pressing operations such as a bending operation. Although the pneumatic pressures Pa, Pe, hydraulic pressure Ps and the distances h, ha, hb are controlled as the operating conditions of the press, for example, the other operating conditions or parameters may be controlled according to the principles of the present invention as described above. In this respect, the machine information and the die set information used to control the machine operating conditions are not limited to those items described herein and may be suitably selected.

In the presses 10, 150 of FIGS. 1 and 12, the die set information stored in the ID card 96, 306 is sent to the controller 90, 296, 430, 452, 460, 474 by means of the transmitter/receiver 94, 304. However, the ID card 96, 306 may be replaced by a bar code, a magnetic tape or a floppy disk. In this case, the die set information in the form of the bar code or stored in the tape or disk is read by a suitable reader connected to the controller. Further, the die set information may be manually entered into the controller through a keyboard, for example. Where the number of the die sets used for a press is relatively small, the die set information for each die set may be stored in a random-access-memory provided in the controller 90 of the press, or in a memory device separate from the machine and the die sets. In the latter case, the die set information for each combination of a die set and a pressing machine is stored. In this case, too, a floppy disc or a magnetic tape may be used.

Although the press 10, 150 uses the common air tank 82, 218, 268 for the four counterbalancing pneumatic cylinders 80, 216, 266, the counterbalancing cylinders may be provided with respective air tanks, so that the pressures of the cylinders may be adjusted independently of each other. The present invention is applicable to the press 10, 150 as otherwise modified.

While the press 10, 150 is adapted to determine the pressing conditions such as the pneumatic pressure Pa according to the equations (1) through (13), other equations or data maps may be used to obtain the pressing conditions.

In the illustrated embodiments, the operating conditions are automatically adjusted or controlled according to the corresponding optimum values (e.g., Pax) calculated by the controller. However, the operating conditions may be manually adjusted by the operator of the machine, with the calculated optimum values displayed or otherwise indicated by suitable means such as digital indicators.

While the single-action press 10 is equipped with the cushioning device 51, the present invention is applicable to a single-action press without the cushioning pneumatic cylinders 32. Further, the pneumatic cylinder 42 may be replaced by a hydraulic cylinder whose pressure is released so as to apply the holding force to the blank.

It is to be understood that the present invention may be embodied with various other changes, modifications, and improvements, which may occur to those skilled in the art, without departing from the spirit and scope of the invention defined in the accompanying drawings.

What is claimed is:

1. A method of adjusting operating conditions of a plurality of pressing machines, depending upon a die set utilized therewith, said die set including a lower and an upper die that are both removably installed on each of said pressing machines and that are movable towards and away from each other so as to perform a pressing operation on a blank under said adjusted operating conditions, each said pressing machine comprising force applying means, which includes at least one fluid-actuated cylinder, for producing a holding force to be applied to said blank through said die set for holding said blank, and a force adjusting mechanism capable of adjusting a pressing force to be applied to said blank through said die set for pressing said blank, said method comprising:

storing machine information in a memory, said machine information including information relating to said force applying means and said force adjusting means, said machine information being necessary for determining optimum values of said operating conditions, which include at least one operating condition consisting of at least one of:
a fluid pressure in said at least one fluid-actuated cylinder, which influences said holding force, and,
at lease one operating parameter of said force adjusting mechanism, which influences said pressing force;

storing die set information in said memory, said die set information relating to said die set and necessary for determining said optimum values of said operating conditions for said die set, said die set information including at least one of an optimum value of said holding force and an optimum value of said pressing force which were obtained by test operations on a test press on which said die set was installed;

calculating said optimum value of each of said at least one operating condition, on the basis of said machine information and said die set information and in accordance with a predetermined equation which includes parameters defined by said machine information and said die set information; and automatically controlling at least one of said force applying means and said force adjusting mechanism, for adjusting each of said least one operating condition to said calculated optimum value prior to said pressing operating, and maintaining said calculated optimum value during said pressing operation.

2. A method according to claim 1, wherein said at least one fluid-actuated cylinder of said force applying means includes at least one first cylinder, and said machine information include data indicative of an effective pressure-receiving area of each of said at least one first cylinder which influences said holding force, and wherein said at least one operating condition include the pressure in each of at least one of said at least one first cylinder.

3. A method according to claim 1, wherein said force adjusting mechanism includes at least one second cylinder, and said machine information include data indicative of an effective pressure-receiving area of each of at least one second cylinder which influences said pressing force operating parameter of said force adjusting mechanism includes a pressure in each of at least one of said at least one second cylinder.

4. A method according to claim 1, wherein said die set information include data indicative of a weight of a pressure ring of said die set.

5. A method according to claim 1, wherein said die set information is stored in a data storage medium provided on said die set.

6. A method according to claim 5, wherein said die set information is transmitted from said data storage medium to a die data memory, provided on said pressing machine, through a transmitter/receiver disposed on said pressing machine so as to face said data storage medium.

7. A method according to claim 1, wherein said at least one operating parameter of said force adjusting mechanism includes a relative position between a slide on which one of said lower and upper dies is fixed, and the other of said lower and upper dies, in a direction of movement of said slide to perform said pressing operation.

8. A method according to claim 7, wherein said force adjusting mechanism includes a die-height adjusting mechanism associated with said slide to adjust a lower stroke end of said slide for adjusting said pressing force.

9. A method according to claim 1, further comprising the steps of:

storing in memory means press operation data indicative of said calculated optimum value of said each of said at least one operating condition, in relation to the die set used on said pressing machine; and establishing the calculated optimum value of said each of said at least one operating condition, according to said press operation data stored in said memory means, when said die set once used on said machine is used again on said machine.

10. A method according to claim 1 further comprising automatically performing a test operation to adjust said operating conditions of said pressing machine to optimum values for a particular die set in a feedback manner with said particular die set installed on said pressing machine prior to said pressing operation;

storing, in a press operation data memory, press operation data indicative of at least one of said optimum values of said operating conditions of said pressing machine, in relation to said die set installed on said pressing machine during said test operation; and after said press operation data is stored in said press operation data memory and when said particular die set is used on said pressing machine for the pressing operation, establishing each of said at least one of said optimum values, according to said press operation data stored in said press operation data memory without performing said step of automatically performing a test operation.

11. A method according to claim 10, wherein said operating conditions include a relative position between a slide on which one of said lower and upper dies is fixed, and the other of said lower and upper dies, in a direction of movement of said slide to perform said pressing operation, said at least one of said optimum values whose data are stored in said press operation data memory including an optimum value of said relative position.

12. A method according to claim 10, wherein said at least one fluid-actuated cylinder of said force applying means includes a hydraulic cylinder which influences said holding force, and said at least one of said optimum values whose data are stored in said press operation data memory includes an optimum value of an initial hydraulic pressure of said hydraulic cylinder.

13. A method according to claim 10, wherein said press operation data are transmitted from a controller to said press operation data memory provided on a member of said die set, after said operating conditions are adjusted to said determined optimum values.

14. A method according to claim 10, further comprising a step of indicating on a display panel said at least one of said optimum values of said operating conditions whose data are stored in said press operation data memory.

15. A method according to claim 10, further comprising a step of determining whether said press operation data indicative of said at least one of said optimum values are already stored in said press operation data memory.

16. A method according to claim 1 further comprising:
determining a desired adjusting amount by which said holding force is changed;
storing in a memory a predetermined relationship between said holding force and said fluid pressure of said at least one fluid-actuated cylinder, said predetermined relationship reflecting characteristics of said pressing machine, wherein said predetermined relationship includes, as a parameter, said desired adjusting amount;
calculating an optimum value of said fluid pressure of said at least one fluid-actuated cylinder on the basis of said desired adjusting amount and in accordance with said predetermined relationship between said holding force and said fluid pressure, said relationship being formulated so that a calculated optimum value of said fluid pressure corresponds to said holding force as changed by said desired adjusting amount; and
adjusting said fluid pressure of said at least one fluid-actuated cylinder to said calculated optimum value.

17. A method according to claim 16, wherein said predetermined relationship is formulated to change a predetermined optimum value of said holding force by said desired adjusting amount determined.

18. A method according to claim 16, wherein said predetermined relationship is formulated to change said fluid pressure of said at least one fluid-actuated cylinder by an amount corresponding to said desired adjusting amount determined.

19. A method according to claim 16, wherein said desired adjusting amount is manually entered through operator-controlled manual adjusting means.

20. A method according to claim 16, wherein said pressing machine is a single-action press including a pressure ring for applying said holding force to said blank, and said force applying means includes cushion pins for supporting said pressure ring, a cushion pad movable with said cushion pins and said pressure ring, and said at least one fluid-actuated cylinder connected to said cushion pad for producing said holding force to be applied to said blank through said cushion pad, cushion pins and pressure ring.

21. A method according to claim 16, wherein said pressing machine is a double-action press including a pressure ring for applying said holding force to said blank, an outer slide to which said pressure ring is fixed, an outer plunger connected to said outer slide, and said at least one fluid-actuated cylinder whose fluid pressure influences a relative position between said outer plunger and said main slide to thereby change said holding force to be applied to said blank through said pressure ring.

22. A pressing system having a plurality of pressing machines and an apparatus provided for each of said pressing machines for adjusting operating conditions of each said pressing machine, depending upon a die set utilized therewith, said die set including a lower and an upper die that are both removably installed on each said pressing machine and that are movable towards and away from each other so as to perform a pressing operation on a blank under said adjusted operating conditions, each said pressing machine comprising force applying means, which includes at least one fluid-actuated cylinder for producing a holding force to be applied to said blank through said die set for holding said blank, and a force adjusting mechanism capable of adjusting a pressing force to be applied to said blank through said die set for pressing said blank, said apparatus comprising:
machine data memory means for storing machine information including information relating to said force applying means and said force adjusting mechanism, said machine information being necessary for determining optimum values of said operating conditions, which include at least one operating condition consisting of at least one of:
a fluid pressure in said at least one fluid-actuated cylinder, which influences said holding force, and
at least one operating parameter of said force adjusting mechanism which influences said pressing force;
die data memory means for storing die set information relating to said die set and necessary for determining said optimum values of said operating conditions for said die set, said die set information including at least one of an optimum value of said holding force and an optimum value of said pressing force which were obtained by test operations on a test press on which said die set was installed;
calculating means for calculating said optimum value of each of said at least one operating condition for said die set, on the basis of said machine information and said die set information and in accordance with a predetermined equation which includes parameters defined by said machine information and said die set information; and
adjusting means for controlling at least one of said force applying means and said force adjusting mechanism, for adjusting each of said at least one operating condition to said calculated optimum value prior to said pressing operation, and maintaining said calculated optimum value during said pressing operation.

23. A system according to claim 22, further comprising a data input device through which said machine information are entered and stored in said machine data memory means.

24. A system according to claim 22, wherein said die data memory means for storing said die set information comprises a die data memory provided on said pressing machine.

25. A system according to claim 24, wherein said die data memory means further comprises a data transmitter through which said die set information is stored into said die data memory, said data transmitter being disposed on said pressing machine.

26. A system according to claim 25, where said die data memory means further comprises a data storage medium in which said die set information is stored, said data storage medium being disposed on a member of said die set.

27. A system according to claim 26, wherein said data transmitter consists of a transmitter/receiver disposed on said pressing machine so as to face said data storage medium, said transmitter/receiver receiving said die set information from said data storage medium and transmitting said received die set information to said die data memory.

28. A system according to claim 22, wherein said at least one fluid-actuated cylinder of said force applying means includes at least one first cylinder whose pressure influences said holding force, and wherein said adjusting means includes pressure adjusting means for adjusting the pressure in each of at least one of said at least one first cylinder.

29. A system according to claim 22, wherein said force adjusting mechanism includes at least one second cylinder whose pressure influences said pressing force, and wherein said adjusting means includes pressure adjusting means for adjusting the pressure in each of at least one of said at least one second cylinder.

30. A system according to claim 22, wherein said pressing machine has a slide on which one of said lower and upper dies is fixed, and wherein said force adjusting mechanism includes positioning means for adjusting a relative position between said slide and the other of said lower and upper dies, in a direction of movement of said slide to perform said pressing operation, said adjusting means including an actuator for operating said positioning means to adjust said relative position.

31. A system according to claim 30, wherein said positioning means includes a die-height adjusting mechanism associated with said slide to adjust a lower stroke end of said slide for adjusting said pressing force.

32. A system according to claim 22, further comprising a stand-alone control console which incorporates at least a portion of said calculating means and at least a portion of said adjusting means.

33. A system according to claim 22, further comprising a load-measuring apparatus which is installed on said pressing machine, in place of said die set, said load measuring apparatus including sensing means for detecting load values which act on said sensing means, to thereby obtain at least one item of said machine information and die set information.

34. A system according to claim 33, wherein said die set includes a pressure ring disposed below said upper die, and said pressing machine includes a plurality of cushion pins which support at upper ends thereof said pressure ring, and a cushion pad associated with lower ends of said cushion pins, said cushion pad being movable towards and away from said pressure ring, to thereby adjust a holding force to be applied to said blank through said pressure ring and said upper die, said machine data memory means storing data indicative of an effective weight of said cushion pad as determined on the basis of said load values detected by said sensing means.

35. A system according to claim 22, further comprising:

press operation data memory means for storing data indicative of said calculated optimum value of said each of said at least one operating condition, in relation to said die set used on said pressing machine; and reproducing means for establishing the calculated optimum value of said each of said at least one operating condition, according to said press operation data stored in said press operation data memory means, when said die set once used on said machine is used again on said machine.

36. A system according to claim 22 further comprising:

means for automatically performing a test operation to adjust said operating conditions of said pressing machine to optimum values for a particular die set used on said pressing machine, in a feedback manner with said particular die set installed on said pressing machine prior to said pressing operation;

press operation data memory for storing press operation data indicative of at least one of said optimum values of said operating conditions of said pressing machine, in relation to said die set installed on said pressing machine during said test operation; and reproducing means for establishing each of said at least one of said optimum values, according to said press operation data stored in said press operation data memory, without operating said adjusting means to perform said test operation, when said die set is used on said pressing machine for said pressing operation after said press operation data is stored in said press operation data memory.

37. A system according to claim 36, wherein said pressing machine has a slide on which one of said lower and upper dies is fixed, and positioning means for adjusting a relative position between said slide and the other of said lower and upper dies, in a direction of movement of said slide to perform said pressing operation, said adjusting means activating said positioning means to adjust said relative position as one of said operating conditions, said at least one of said optimum values whose data are stored in said press operation data memory including an optimum value of said relative position.

38. A system according to claim 36, wherein said at least one fluid-actuated cylinder of said force applying means includes a hydraulic cylinder which influences said holding force, said means for automatically performing a test operation including means for adjusting an initial hydraulic pressure of said hydraulic cylinder as one of said operating conditions, said at least one of said optimum values whose data are stored in said press operation data memory including an optimum value of said initial hydraulic pressure of said hydraulic cylinder.

39. A system according to 36, wherein said adjusting means includes a controller for controlling said pressing machine, said press operation data memory being provided on a member of said die set, and receiving said press operation data transmitted from said controller, after said operating conditions are adjusted to said determined optimum values.

40. A system according to claim 36, further comprising a display panel for indicating said at least one of said optimum values of said operating conditions whose data are stored in said press operation data memory.

41. A system according to claim 36, further comprising means for determining whether said press operation data indicative of said at least one of said optimum values are already stored in said press operation data memory.

42. A system according to claim 22 further comprising:

operator-controlled manual adjusting means for manually specifying a desired adjusting amount by which said holding force is changed;

relationship memory means for storing a predetermined relationship between said holding force and said fluid pressure of said at least one fluid-actuated cylinder, said predetermined relationship reflecting characteristics of said pressing machine, wherein said predetermined relationship includes, as a parameter, said desired adjusting amount; and second calculating means for calculating an optimum value of said fluid pressure of said at least one fluid-actuated cylinder on the basis of said desired adjusting amount and in accordance with said predetermined relationship between said holding force and said fluid pressure, said relationship being formulated so that said calculated optimum value of said fluid pressure corresponds to said holding force as changed by said desired adjusting amount specified by said manual adjusting means; and said adjusting means controlling said at least one fluid-actuated cylinder for adjusting fluid pressure to said calculated optimum value thereof as calculated by said second calculating means.

43. A system according to claim 42, wherein said second calculating means calculates said optimum value of said fluid pressure according to said predetermined relationship formulated to change a predetermined optimum value of said holding force by said desired adjusting amount determined.

44. A system according to claim 42, wherein said second calculating means calculates said optimum value of said fluid pressure according to said predetermined relationship formulated to change said fluid pressure of at least one said fluid-actuated cylinder by an amount corresponding to said desired adjusting amount determined.

45. A system according to claim 42, wherein said pressing machine is a single-action press including a pressure ring for applying said holding force to said blank, and said force applying means includes cushion pins for supporting said pressure ring, a cushion pad movable with said cushion pins and said pressure ring, and said at least one fluid-actuated cylinder connected to said cushion pad for producing said holding force to be applied to said blank through said cushion pad, cushion pins, and pressure ring.

46. A system according to claim 42, wherein said pressing machine is a double-action press including a pressure ring for applying said holding force to said blank, an outer slide to which said pressure ring is fixed, an outer plunger connected to said outer slide, and said at least one fluid-actuated cylinder whose fluid pressure influences a relative position between said outer plunger and said outer slide to thereby change said holding force to be applied to said blank through said pressure ring.

* * * * *